(12) United States Patent
Tanaka

(10) Patent No.: US 12,133,546 B2
(45) Date of Patent: *Nov. 5, 2024

(54) MOISTURE CONTROL APPARATUS, MOISTURE CONTROL METHOD, PROGRAM, STORAGE MEDIUM, PRODUCED OBJECT, PRODUCT, APPARATUS, AND FACILITY

(71) Applicant: EVERTRON HOLDINGS PTE LTD., Tokyo (JP)

(72) Inventor: Hisao Tanaka, Tokyo (JP)

(73) Assignee: EVERTRON HOLDINGS PTE LTD., Tokyo (JP)

( * ) Notice: Subject to any disclaimer, the term of this patent is extended or adjusted under 35 U.S.C. 154(b) by 738 days.

This patent is subject to a terminal disclaimer.

(21) Appl. No.: 16/958,744

(22) PCT Filed: Dec. 31, 2018

(86) PCT No.: PCT/JP2018/048626
§ 371 (c)(1),
(2) Date: Jun. 29, 2020

(87) PCT Pub. No.: WO2019/132046
PCT Pub. Date: Jul. 4, 2019

(65) Prior Publication Data
US 2020/0329742 A1    Oct. 22, 2020

(30) Foreign Application Priority Data

Dec. 31, 2017 (JP) ................................ 2017-255302
Feb. 9, 2018 (JP) ................................ 2018-021666
(Continued)

(51) Int. Cl.
*A23L 3/26* (2006.01)
*A23L 3/30* (2006.01)
(Continued)

(52) U.S. Cl.
CPC ................ *A23L 3/26* (2013.01); *A23L 3/30* (2013.01); *A23L 3/32* (2013.01); *A23L 5/15* (2016.08);
(Continued)

(58) Field of Classification Search
CPC .. A47J 37/1257–1271; A23L 5/30; A23L 5/32
See application file for complete search history.

(56) References Cited

U.S. PATENT DOCUMENTS 3,540,994 A    11/1970 Napier
4,333,521 A     6/1982 Stottman et al.
(Continued)

FOREIGN PATENT DOCUMENTS

CN    102264883 A    11/2011
CN    204698314 U    10/2015
(Continued)

OTHER PUBLICATIONS

JP2016129672 translation (Year: 2016).*
(Continued)

*Primary Examiner* — Nicholas A Smith
(74) *Attorney, Agent, or Firm* — HAUPTMAN HAM, LLP

(57) ABSTRACT

Provided are a moisture control apparatus, a moisture control method, a program, a storage medium, a produced object, a product, an apparatus, and a facility that can improve the characteristics of an object through moisture control. In a moisture control apparatus according to one aspect of the present invention, a predetermined voltage or current including a DC component and/or an AC component is applied to at least one electrode that generates at least one of an electric field, a magnetic field, an electromagnetic field, electromagnetic waves, sound waves, and ultrasonic waves to achieve a bonded state of moisture elements in an (Continued)

object disposed to face the electrode, so that a property of the object is able to be improved.

50 Claims, 22 Drawing Sheets

(30) Foreign Application Priority Data

Jul. 30, 2018 (JP) ................ 2018-143020
Jul. 31, 2018 (JP) ................ 2018-144637

(51) Int. Cl.
A23L 3/32 (2006.01)
A23L 5/10 (2016.01)
A23L 5/30 (2016.01)
A47J 37/12 (2006.01)
B01J 19/08 (2006.01)
B01J 19/10 (2006.01)
B01J 19/12 (2006.01)
C02F 1/48 (2023.01)
C02F 103/20 (2006.01)

(52) U.S. Cl.
CPC ............... *A23L 5/30* (2016.08); *A23L 5/32* (2016.08); *A47J 37/1271* (2013.01); *B01J 19/088* (2013.01); *B01J 19/10* (2013.01); *B01J 19/122* (2013.01); *C02F 1/48* (2013.01); B01J 2219/0805 (2013.01); B01J 2219/0854 (2013.01); B01J 2219/089 (2013.01); B01J 2219/1203 (2013.01); C02F 2103/20 (2013.01); C02F 2303/20 (2013.01)

(56) References Cited

U.S. PATENT DOCUMENTS

| | | | |
|---|---|---|---|
| 4,731,227 A | 3/1988 | Pulvari | |
| 6,193,878 B1 | 2/2001 | Morse et al. | |
| 6,451,364 B1 | 9/2002 | Ito | |
| 6,482,327 B1 | 11/2002 | Mori et al. | |
| 6,881,314 B1 | 4/2005 | Wang et al. | |
| 7,654,196 B2 | 2/2010 | Uchikawa et al. | |
| 10,757,960 B2 * | 9/2020 | Tanaka | A47J 37/1271 |
| 2002/0047009 A1 | 4/2002 | Flugstad et al. | |
| 2003/0205571 A1 | 11/2003 | Flugstad et al. | |
| 2006/0112699 A1 | 6/2006 | Sato et al. | |
| 2006/0130674 A1 | 6/2006 | Uchikawa et al. | |
| 2007/0254080 A1 | 11/2007 | Schackmuth et al. | |
| 2009/0199570 A1 | 8/2009 | Fujisaki et al. | |
| 2009/0243635 A1 | 10/2009 | Bhattacharjee et al. | |
| 2009/0252842 A1 | 10/2009 | Wang et al. | |
| 2010/0215961 A1 | 8/2010 | Aubry et al. | |
| 2011/0248189 A1 | 10/2011 | Fukamachi et al. | |
| 2014/0064712 A1 | 3/2014 | Grega | |
| 2014/0287150 A1 | 9/2014 | Miljkovic et al. | |
| 2015/0237683 A1 | 8/2015 | Polato et al. | |
| 2015/0291456 A1 | 10/2015 | Findikoglu | |
| 2016/0015076 A1 | 1/2016 | Goto et al. | |
| 2016/0350715 A1 | 12/2016 | Minvielle | |
| 2017/0055774 A1 * | 3/2017 | Grimaldi | A23L 5/11 |
| 2017/0181455 A1 | 6/2017 | Bullo et al. | |
| 2019/0038077 A1 | 2/2019 | Tanaka | |
| 2019/0038998 A1 | 2/2019 | Leitner et al. | |
| 2019/0364933 A1 * | 12/2019 | Jung | A23B 5/015 |

FOREIGN PATENT DOCUMENTS

| | | | | |
|---|---|---|---|---|
| DK | 174056 B1 | | 5/2002 | |
| EA | 009630 B1 | | 2/2008 | |
| GB | 2506905 A | * | 4/2014 | ............ A47J 27/002 |
| JP | S4823044 A | | 3/1973 | |
| JP | S51-037271 B | | 10/1976 | |
| JP | H1160472 A | | 6/1989 | |
| JP | H3-258218 A | | 11/1991 | |
| JP | H4260751 A | | 9/1992 | |
| JP | H6230325 A | | 8/1994 | |
| JP | H7155154 A | | 6/1995 | |
| JP | H11-113761 A | | 4/1999 | |
| JP | 2001-86967 A | | 4/2001 | |
| JP | 2002-136430 A | | 5/2002 | |
| JP | 2002-204754 A | | 7/2002 | |
| JP | 2003-142248 A | | 5/2003 | |
| JP | 2003343961 A | | 12/2003 | |
| JP | 2004-41531 A | | 2/2004 | |
| JP | 2006-102447 A | | 4/2006 | |
| JP | 2006-109816 A | | 4/2006 | |
| JP | 2007-82678 A | | 4/2007 | |
| JP | 2012-223119 A | | 11/2012 | |
| JP | 2015-27443 A | | 2/2015 | |
| JP | 5727104 B1 | | 6/2015 | |
| JP | 2016-112205 A | | 6/2016 | |
| JP | 2016129672 A | | 7/2016 | |
| JP | 2017-12684 A | | 1/2017 | |
| JP | 6095087 B1 | | 3/2017 | |
| KR | 10-2016-0032952 A | | 3/2016 | |
| KR | 10-2017-0086129 A | | 7/2017 | |
| KR | 10-2071529 B1 | | 1/2020 | |
| SU | 1324629 A1 | | 7/1987 | |
| TW | M416753 U1 | | 11/2011 | |
| WO | 2005013730 A1 | | 2/2005 | |
| WO | 2006/054348 A1 | | 5/2006 | |
| WO | 2008117341 A1 | | 10/2008 | |
| WO | 2010/073572 A1 | | 7/2010 | |
| WO | 2012144129 A1 | | 10/2012 | |
| WO | 2013161508 A1 | | 10/2013 | |
| WO | 2014208658 A1 | | 12/2014 | |
| WO | 2015122070 A1 | | 8/2015 | |
| WO | 2017/179752 A1 | | 10/2017 | |
| WO | 2017183586 A1 | | 10/2017 | |

OTHER PUBLICATIONS

WO2014208658A1 translation (Year: 2014).*
Trial and Appeal Decision in JP application No. 2019-536612, maile Jan. 25, 2022, 44pp.
Office Action in CN application No. 201880058728.6, dated Aug. 24, 2021, 31pp.
Office Action in JP application No. 2019-536612, mailed Feb. 2, 2021, 12pp.
Office Action in CN application No. 201880058728.6, dated Jun. 6, 2022, 32pp.
Zhang Jian, "Oil field mine separation technology and equipment", China University of Petroleum Press, Jun. 2011, pp. 246-253, 25pp.
Office Action in U.S. Appl. No. 15/893,060, dated Jun. 28, 2023, 31pp.
Office Action in JP application No. 2021-064495, dated Jul. 13, 2021, 10pp.
"Freshness is the crucial factor!, Amazing technology", broadcast on Oct. 24, 2017, TV Tokyo, 787th episode, URL;https://www.tv-tokyo.co.jp/gaia/backnumber4/preview_20171024.html. Japan, 6pp.
International Search Report in PCT/JP2018/048626, mailed Apr. 2, 2019. 5pp.
"Freshness is life! Amazing technology!", Oct. 24, 2017, Dawn of Gaia, URL;https://lovely-lovely.net/business/evertron. Japan, 116pp.
Japanese Office Action for the Japanese Patent Application No. 2019-536612 mailed Sep. 2, 2019, 16pp.
Satoshi Nishimura et al. "Electrocapillary Phenomena at Edible Oil/Saline Interfaces", Journal of Oleo Science, 2017, 235p-249p, Japan Oil Chemists' Society, 15pp.
Michael Von Domaros et al., "Dynamics at a Janus Interface", The Journal of Physical Chemistry, vol. 117, No. 9, Mar. 7, 2013, ACS Publications, 4561-4567, 7pp.
Extended European search report in EP application No. 18895338.4, dated Aug. 26, 2021, 10pp.
Office Action in SG application No. 11202004928P, dated Jan. 3, 2022, 7pp.

(56) References Cited

OTHER PUBLICATIONS

Interview Summary in U.S. Appl. No. 16/053,739, dated Mar. 20, 2023, 11pp.
Office Action in KR application No. 10-2018-0016338, dated Mar. 28, 2023, 16pp.
Erik Gregersen, "supersonic flight", Encyclopaedia Britannica, Jul. 27, 2018, Encyclopaedia Britannica, Inc., https://www.britannica.com/technology/supersonic-flight, 2pp.
https://evertron.jp/foodasset/?lang=ja, Evertron Official Site, Mar. 2023, web, 16pp.
Liu Kejian, "Vocational Education Excellence Planning Teaching Materials Fan Hang and Electronic Skills Practical Training", Beijing University of Technology Press, Nov. 2015, http://www.bitpress.com.cn, 12pp.
Misono Takeshi, "Interfacial Tension Between Water and Oil", Measurement Techniques and Practices of Colloid and Interface Phenomena, Springer, Singapore, pp. 39-44, https://doi.org/10.1007/978-981-13-5931-6_6, 2019, 145pp.
Office Action in JP application No. 2014-124173, dated Apr. 13, 2017, 7pp.
Office Action in IN application No. 202017027205, dated Jul. 14, 2021, 8pp.
Examination Report in EP Application No. 18895338.4, dated Aug. 9, 2022. 6pp.
Michael Von Domaros et al., "Supporting information for: Dynamics at a Janus interface", The Journal of Physical Chemistry C, vol. 117, No. 9, Mar. 7, 2013, pp. 4561-4567, 10pp.

\* cited by examiner

FIG. 1
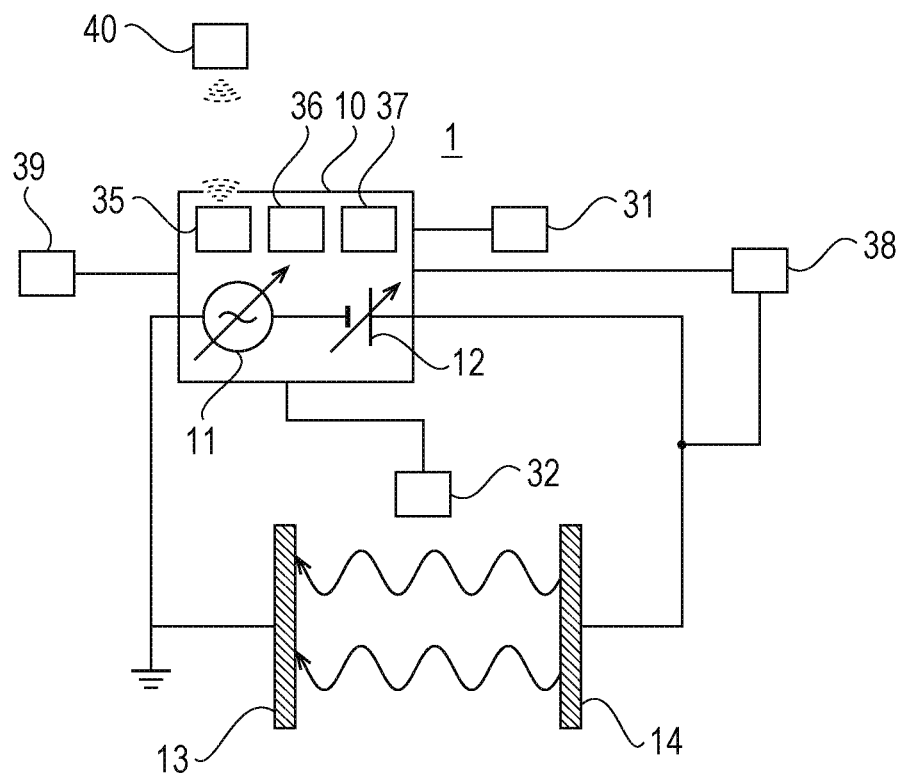
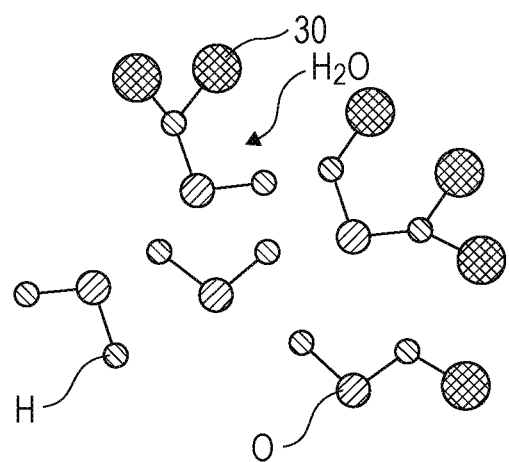
FIG. 2A
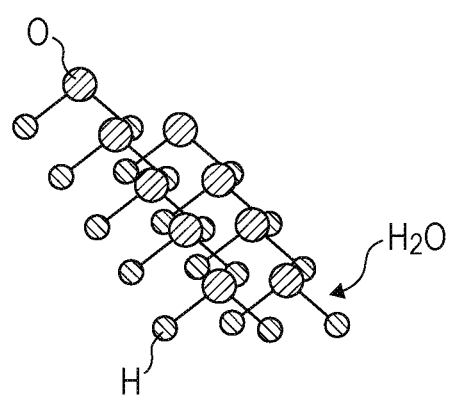
FIG. 2B

Day 14

FIG. 30
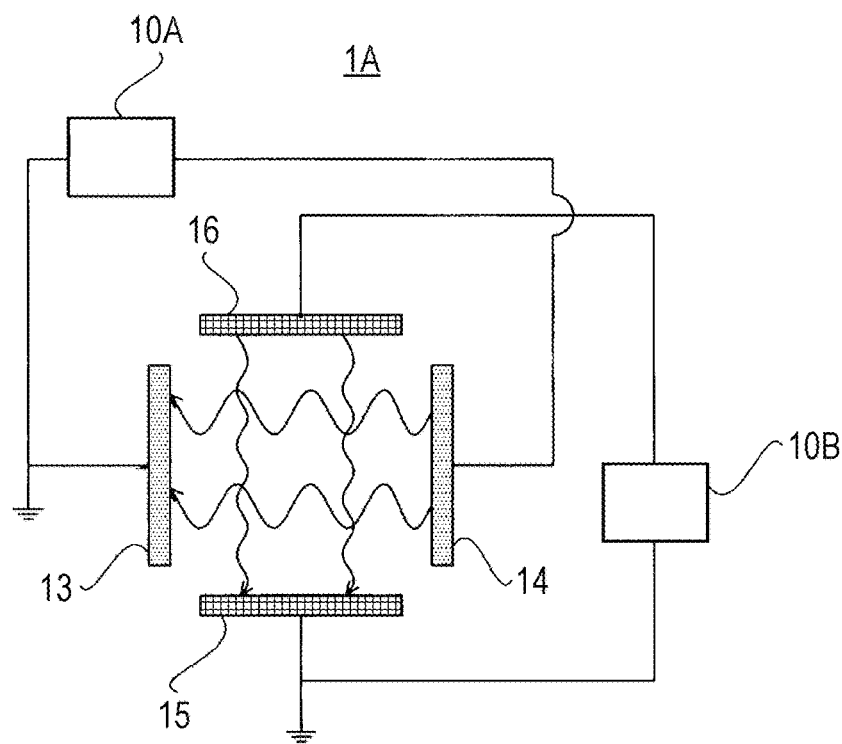
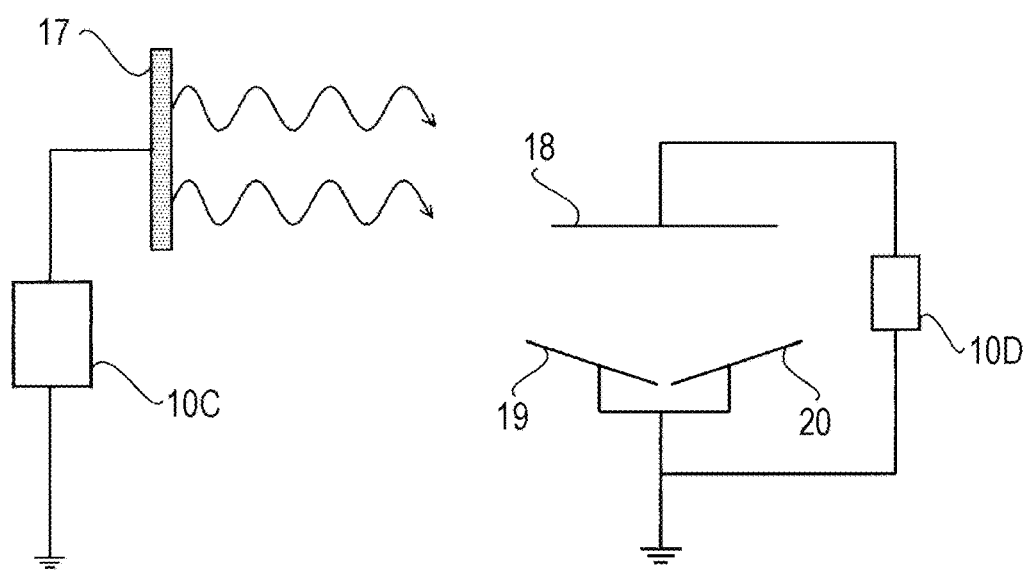
FIG. 31A
FIG. 31B

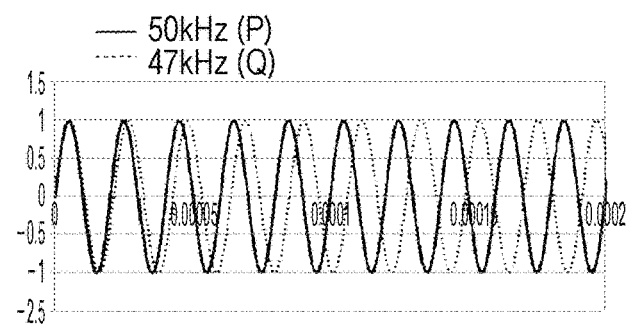
FIG. 32B
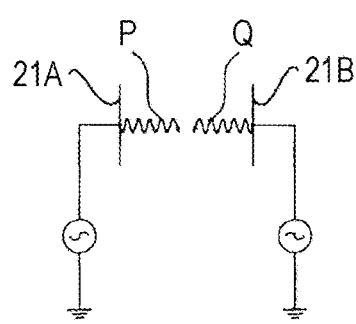
FIG. 32A
FIG. 32C
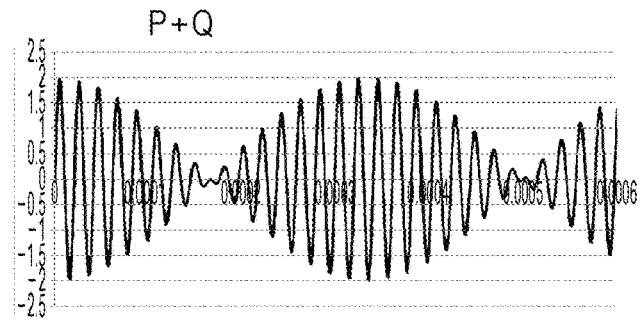
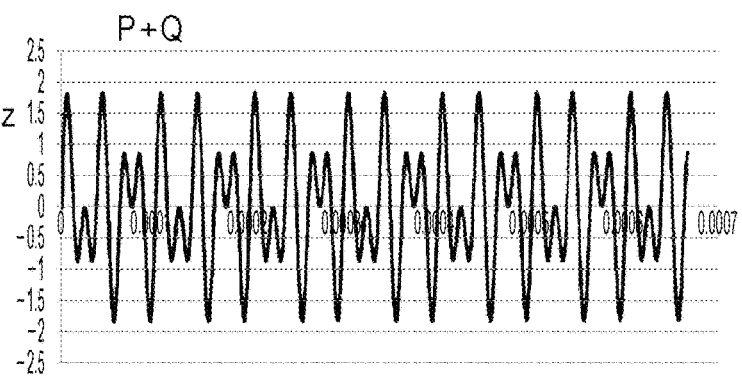
FIG. 33B
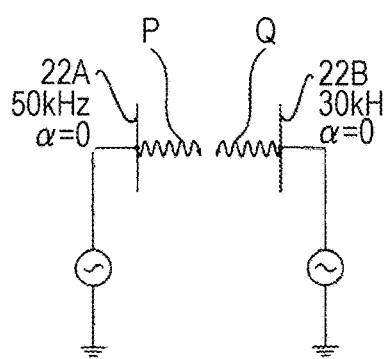
FIG. 33A
FIG. 33D
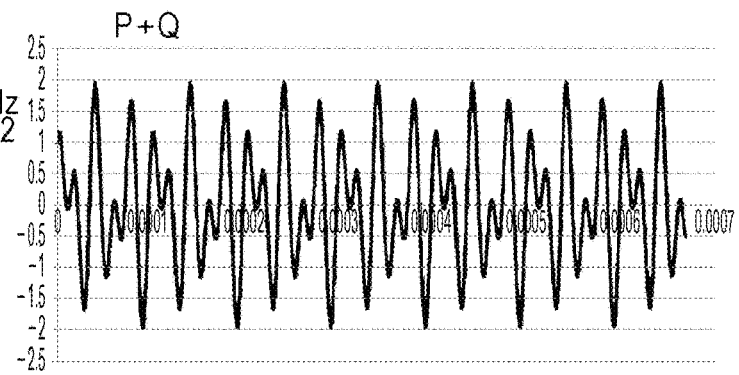
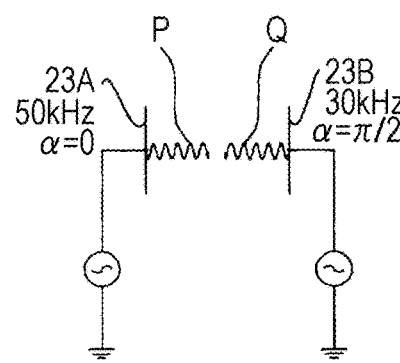
FIG. 33C

MOISTURE CONTROL APPARATUS, MOISTURE CONTROL METHOD, PROGRAM, STORAGE MEDIUM, PRODUCED OBJECT, PRODUCT, APPARATUS, AND FACILITY

RELATED APPLICATIONS

The present application is a National Phase of International Application Number PCT/JP2018/048626, filed Dec. 31, 2018, and claims priority to Japanese Application numbers 2017-255302, filed Dec. 31, 2017, 2018-021666, filed Feb. 9, 2018, 2018-143020, filed Jul. 30, 2018, 2018-144637, Jul. 31, 2018.

FIELD

The present invention relates to a moisture control apparatus that controls moisture in an object, a moisture control method, a program, a storage medium, a produced object, a product, an apparatus, and a facility.

BACKGROUND

Fryers have been known that can cook exquisitely tasty food. Such fryers cook food using heat within a space in which electromagnetic waves within a predetermined frequency range are generated (see Patent Literature 1). The entirety of the specification, claims, and drawings of Patent Literature 1 are incorporated herein by reference. The cooking of food within the space in which electromagnetic waves within a predetermined frequency range are generated are known to have highly advantageous effects such as prevention of oxidation/deterioration of cooking oil, and improvement in the taste of the food cooked.

CITATION LIST

Patent Literature

Patent Literature 1: JP-A-2016-129672

SUMMARY

Technical Problem

However, the fryer and the heat cooking method disclosed in Patent Literature 1 are made based on insufficient consideration on the mechanism of the taste improvement. Thus, the technique is difficult to apply to all kinds of foods, to other styles of cooking, or to objects other than food.

In view of this, the present inventors have analyzed the impact of the electromagnetic waves within a predetermined frequency range on food from various perspectives. As a result, the present inventors have found out that control on moisture (including free water) contained in food is the key, and thus has come up with a method for the moisture control. Furthermore, the present inventors have also found out that the moisture control is important for objects other than food, and thus completed a moisture control apparatus and a moisture control method according to the present invention.

In view of the above, an object of the present invention is to provide a moisture control apparatus that can improve the characteristics of an object through moisture control, a moisture control method, a program, a storage medium, a produced object, a product, an apparatus, and a facility.

Solution to Problem

The above-described object of the present invention can be achieved by:

a moisture control apparatus, in which a predetermined voltage or current including a DC component and/or an AC component is applied to at least one electrode that generates at least one of an electric field, a magnetic field, an electromagnetic field, electromagnetic waves, sound waves, and ultrasonic waves to achieve a bonded state of moisture elements in an object disposed to face the electrode, so that a property of the object is able to be improved;

a moisture control method, including applying a predetermined voltage or current including a DC component and/or an AC component to at least one electrode that generates at least one of an electric field, a magnetic field, an electromagnetic field, electromagnetic waves, sound waves, and ultrasonic waves to achieve a bonded state of moisture elements in an object disposed to face the electrode, so that a property of the object is able to be improved;

a program for executing the moisture control method;

a storage medium storing the program;

an object made into a bonded state of moisture elements in the object by the moisture control apparatus; or a product, an apparatus, or a facility including the moisture control apparatus.

The free water as the moisture is water other than the bonded water. The free water is in a normal state and can move freely, whereas the bonded water is in a bonded state which could be of various levels chemically. In a food product, the free water is water exhibiting characteristics of normal water, and exists between tissues while being mechanically held (references: *Encyclopedia Nipponica, digital Daijisen, Eiyo Seikagaku Jiten* (Dictionary of Nutrition and Biochemistry)).

Advantageous Effects of Invention

With the moisture control apparatus, the moisture control method, the program, the storage medium, the produced object, the product, the apparatus, and the facility according to the present invention, characteristics of an object can be improved through moisture control.

BRIEF DESCRIPTION OF DRAWINGS

FIG. 1 is a conceptual view of an electrode according to a first embodiment.

FIGS. 2A and 2B are schematic views of water molecules, FIG. 2A illustrates water molecules in a freely moving state, and FIG. 2B illustrates water molecules in a pearl-chain structure.

FIG. 30 is a conceptual view of electrodes according to a second embodiment.

FIGS. 31A and 31B are conceptual views of an electrode according to a modification of the second embodiment, FIG. 31A illustrates an example where a single electrode is used, and FIG. 31B illustrates an example where a single electrode and two electrodes facing the electrode are used.

FIGS. 32A to 32C are diagrams illustrating waveforms according to a third embodiment in cases where voltage with different frequencies are used.

FIGS. 33A to 33D are diagrams illustrating waveforms according to the third embodiment in cases where voltage with different phases are used.

DESCRIPTION OF EMBODIMENTS

Figure 3A:
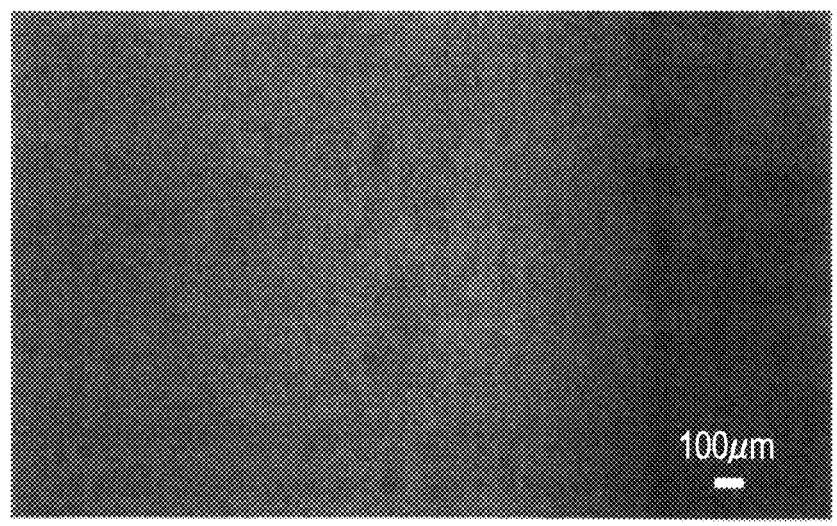
FIGS. 3A and 3B are photomicrographs of free water, FIG. 3A showing a state of the free water before application of an electric field and FIG. 3B showing a state of the free water after the application of the electric field.

The following describes a moisture control apparatus, a moisture control method, a program, a storage medium, and a produced object according to some embodiments of the present invention with reference to the accompanying drawings. The following embodiments are intended to illustrate a moisture control apparatus, a moisture control method, a program, a storage medium, and a produced object for embodying the technical concept of the present invention, and are not intended to limit the present invention to these embodiments. The present invention is equally applicable to any other embodiments within the scope of the appended claims. While the following embodiments illustrate free water serving as moisture included in an object, examples of the moisture included in an object according to the present invention are not limited to free water, but may include a solution, water, micro water droplets included in an emulsion, and other like applications.

First Embodiment

A moisture control apparatus, a moisture control method, a program, a storage medium, a produced object, a product, an apparatus, and a facility according to a first embodiment will be described with reference to FIG. 1 to FIG. 9.

FIG. 1 is a conceptual view of a moisture control apparatus 1. The moisture control apparatus 1 includes a controller 10 and a pair of electrodes 13 and 14. The controller 10 includes an AC component voltage generation unit 11 and a DC component voltage generation unit 12. In the actual circuit configuration of the controller 10, the AC component voltage generation unit 11 and the DC component voltage generation unit 12 may not be separately provided, and thus the circuit configuration having the functions of both units may be employed.

The controller 10 is provided with a communication unit 35, a central processing unit (CPU) 36, and a storage unit 37. The communication unit 35 communicates with a server 40 to receive a control parameter and/or a control value from the server 40. The storage unit 37 stores a program, and the CPU 36 uses the program stored in the storage unit 37 to control the AC component voltage generation unit 11 and the DC component voltage generation unit 12 incorporated in the controller 10 based on the control parameter and/or the control value received from the server, to control output voltage and/or output current. The program can be rewritten from the server 40 via the communication unit 35. The program may be stored in a removable memory such as a flash memory, so that the program for the controller 10 can be rewritten by using the removable memory.

The controller 10 is connected to an object detection sensor 32 configured to detect the type and/or the state of an object disposed between the electrodes. Thus, the controller 10 recognizes the type and/or the state of the object and controls the AC component voltage generation unit 11 and the DC component voltage generation unit 12 incorporated therein, to achieve output voltage and/or output current suitable for the type and/or the state of the object. The AC component voltage generation unit 11 and the DC component voltage generation unit 12 incorporated in the controller 10 has a function that is at least one of DC-DC conversion, DC-AC conversion, AC-DC conversion, and AC-AC conversion as described later.

The controller 10 is further connected to a man-machine interface 31, and thus can be operated by an operator. Examples of the man-machine interface 31 include a display, a touch panel, a keyboard, and a mouse. When the controller 10 is operated by a smartphone, a tablet terminal, a personal computer (hereinafter, referred to as PC) such as a laptop PC, and the like, the smartphone and the like can have the functions of the man-machine interface 31, the communication unit 35, and the like.

The controller 10 is connected to an external power supply 39. The external power supply 39 may be an AC power supply or a DC power supply. The DC power supply may be a battery including a primary cell, a secondary cell, and the like. If the moisture control apparatus 1 can be moved, conveyed, or carried around, it is convenient to use a battery as the external power supply 39 in terms of securing power supply.

The controller 10 performs feedback control on at least one of values of current and/or voltage applied to the electrode, their frequencies, and their phases based on a detection signal from a detector 38 described later.

A processing target object is disposed between the electrodes 13 and 14. The processing target object is not particularly limited as long as the object is at least one of solid, liquid, and gas. Various objects can be the processing target as will be described later.

[Electrode]

In FIG. 1, the pair of electrodes 13 and 14 are illustrated as electrodes in a form of a plate as an example. However, the electrodes 13 and 14 are not limited to the plate form, and may be in a form of a foil, a film, or a layer, and can also have various shapes such as a rod shape, a spherical shape, a semi-spherical shape, a cylindrical shape, a semi-cylindrical shape, a conical shape, a semi-conical shape, a substantially L shape, a substantially rectangular U shape, a polygonal shape, a polygonal columnar shape, a polygonal pyramid shape, a curved shape, or a bent shape (see FIG. 34 to FIG. 41 and the like referenced later). The electrodes 13 and 14 in a form of a foil and a film can have an extremely small thickness, and thus are space saving. Furthermore, such electrodes 13 and 14 can have a shape freely designed and are light weight. Thus, such electrodes 13 and 14 can be easily installed. The electrode of a layer form includes a thin-film electrode provided to be stacked on a predetermined substrate, for example.

The shape of the electrodes 13 and 14 is not limited to a flat plate shape, and may be any shape. When the electrodes 13 and 14 in a form of a foil are used, the electrodes can be shaped as desired to conform to the shape of their installed locations. For example, the electrodes can be in a form of a curved surface.

The electrodes 13 and 14 may be provided with a plurality of through holes. With the plurality of through holes provided, the electrodes can have improved characteristics for generating electromagnetic waves and air permeability, and can also ensure visibility through the electrodes. The holes can have various shapes such as a circular shape, an elliptical shape, a polygonal shape, a slit shape, a linear shape, or a combination of these. For example, hexagonal holes may be provided.

The material of the electrodes 13 and 14 is not particularly limited as long as the material has conductivity. For example, conductive metal such as copper, iron, stainless steel, aluminum, titanium, gold, silver, and platinum, an alloy of these metals, a conductive material such as a conductive oxide or a conductive glass, or the like is used. The electrodes 13 and 14 may have surfaces coated with an insulated material. For example, when the electrodes are provided to a fryer, an inner surface of the fryer and the electrodes are insulated from each other. For example, when the electrodes are provided on an inner surface of a container, the inner surface of the container and the electrodes are preferably insulated from each other. The pair of electrodes 13 and 14 may be made of different materials. For example, the material of the electrode 13 may be stainless steel and the material of the electrode 14 may be titanium. Furthermore, combinations between stainless steel and aluminum, between stainless steel and copper, and the like may be employed. By changing the materials of the electrodes 13 and 14, the characteristics of the electromagnetic waves generated from the electrodes can be adjusted. In such a case, the characteristics of the electromagnetic waves can also be adjusted by exchanging the materials of the electrode 13 and the electrode 14. As will be described later, the number of electrodes is not limited to one pair, and may be set as appropriate to be one, three or more, two pairs or more, or the like. Also in these cases, the characteristics of the electromagnetic waves generated from the electrodes can be adjusted by appropriately selecting the material of each electrode. For example, the characteristics of the electromagnetic waves generated from two pairs of electrodes can be adjusted with one pair of electrodes made of stainless steel and the other pair of electrodes made of copper. The electrodes 13 and 14 generate at least one of an electric field, a magnetic field, an electromagnetic field, electromagnetic waves, sound waves, and ultrasonic waves. When only the sound waves or the ultrasonic waves are generated, the material of the electrodes 13 and 14 is not limited to a conductive material. For example, non-conductive material such as resin may be used.

A dedicated housing may be provided for installation of the moisture control apparatus 1. However, this should not be construed in a limiting sense, and the moisture control apparatus 1 may be installed in an existing housing, for example. The existing housing in which the moisture control apparatus 1 can be installed can be selected from various housings including: a refrigerator, a freezer, a refrigerating warehouse, a freezer warehouse, a storage house, a warehouse, a refrigerator car, a freezing car, a cooler box, a container for transport, a container for storage, a showcase, a shelf, a drawer, a fryer, a cultivation container (for hydroponics, etc.), a fuel tank, a PC, a mobile phone, a chair bed, furniture, bedding, home appliances, various manufacturing equipment in a factory, processing equipment, medical equipment, health equipment, beauty equipment, cooking equipment, polishing equipment, vehicles, semiconductor cleaning equipment, and equipment for controlling vapor resulting from cooling during a refining step, a baking step, and a drying step.

In a case of the refrigerator, for example, the pair of electrodes 13 and 14 can be arranged along a ceiling surface and a bottom surface, along side wall surfaces facing each other, along the ceiling surface, a tray, and the bottom surface, along the ceiling surface, the bottom surface, and the side surface, or along an inner surface of the door and a back side surface. In a case of the fryer, for example, the electrodes are provided along both inner side surfaces of an oil container. Thus, the pair of electrodes 13 and 14 may be in any arrangement as long as they face each other. The pair of electrodes do not need to be arranged in parallel, and may be in an orthogonal positional relationship. Thus, the electrodes can be in any arrangement as long as the space to accommodate the processing target object can be provided between the electrodes. The number, arrangement, and shape of the electrodes are not particularly limited. The number of electrodes is not limited to one pair, and may be one, three or more, or two pairs or more, as can be seen in FIGS. 30 to 41 described later, for example.

The moisture control apparatus 1 is not limited to the installation in a housing, and can be disposed at any location as long as the pair of electrodes 13 and 14 can be disposed. For example, any location such a shelf or a wall can be used as long as the pair of electrodes 13 and 14 can be disposed to face each other. Furthermore, a screen shaped member can be used to fix the electrodes 13 and 14, for example. For example, a chopping board may be used. The number of electrodes is not limited to one pair, and may be one, three or more, or two pairs or more, as can be seen in FIGS. 30 to 41 described later, for example.

[Voltage Applied to Electrode]

The controller 10 can apply, to the pair of electrodes 13 and 14, at least the DC component voltage and can additionally apply the AC component voltage. The DC component voltage is not particularly limited, and can be adjusted between 0 V and 2000 V, for example, can be adjusted between 0 V and 500 V, for example, can be adjusted between 0 V and 200 V, for example, can be adjusted between 0 V and 100 V, for example, can be adjusted between 5 V and 20 V, for example, and can be adjusted between 10 V and 15 V, for example. The polarity may be positive or negative. Thus, when both positive and negative polarities are taken into consideration in the example of the adjustment between 0 V and 200 V, the voltage can be adjusted between −200 V and +200 V. A DC power supply or an AC power supply may be used for the power supply voltage. When the DC power supply is used, a battery featuring excellent portability can be used as the power supply, for example. On the other hand, when the AC power supply is used, a commercial power supply can be used, for example, meaning that the power supply can easily be ensured. The power supply voltage may be AC voltage of 100 V to 400 V, for example, DC voltage of 5 V to 20 V, for example, and DC voltage of 10 V to 15 V, for example.

At least the DC component voltage is applied to the pair of electrodes 13 and 14. Thus, only the DC component voltage may be applied with the AC component voltage set to be 0 V, for example.

The orientation of the DC component voltage may be positive (+) or negative (−). In the present embodiment, the orientation of the DC component voltage is + when the potential of the electrode 14 is higher than the potential of the electrode 13 (ground potential), and is − when the potential of the electrode 14 is lower than the potential of the electrode 13. The effect of improving the property of the object is obtained with the positive DC component voltage and with the minus DC component voltage.

To the pair of electrodes 13 and 14, the AC component voltage can be applied in addition to the DC component voltage. The frequency of the AC component voltage is not particularly limited, and can be adjusted between 0 and 1 MHz, for example, can be adjusted between 50 Hz and 500 Hz, for example, can be adjusted between 5 Hz and 200 Hz, for example, and can be adjusted between 50 Hz and 100 Hz, for example.

The voltage of the AC component voltage is not particularly limited, and the spatial electric field/cm between peaks is adjustable between 0 and 2000 Vpp/cm, for example, between 50 and 500 Vpp/cm, for example, and between 100 and 250 Vpp/cm, for example. Furthermore, the voltage of 0 to 2000 Vpp can be supplied to an electrode, and the voltage can be adjusted between 50 and 500 Vpp, for example, and between 100 and 250 Vpp, for example. For example, for a pair of electrodes, the voltage between the electrodes is adjusted between 0 and 2000 Vpp, for example, between 50 and 500 Vpp, for example, and between 100 and 250 Vpp, for example.

Note that the application of the DC component voltage results in high effect of improving the property of the object. Still, such an effect can be obtained also with the application of the AC component voltage only (with the DC component voltage being 0 V).

As described above, the voltage of the external power supply may be DC voltage or AC voltage, and the external power supply may be an AC power supply or a DC power supply. For example, a commercial power supply can be used as the AC power supply. For example, the DC power supply may be a battery including a primary cell and a secondary cell. Furthermore, various batteries such as 12-V battery and a dry cell can be used.

For adjusting the voltage value of the DC component voltage in the controller 10, a method of performing voltage control on the DC power supply by a DC-DC converter, a method of performing the voltage control by the DC-DC converter when the AC power supply is rectified by an AC-DC converter or after the AC power supply has been rectified, and the like can be employed. The voltage value and the frequency of the AC component voltage can be controlled in the controller 10 with methods including: a method of controlling the DC power supply with a DC-AC converter (inverter); a method of rectifying the AC power supply with an AC-DC converter and then controlling the resultant power supply with a DC-AC converter (inverter); and a method of controlling the AC power supply with an AC-AC converter.

When the target voltage value of the DC component voltage is equal to the power supply voltage of the DC power supply, the power supply voltage of the DC power supply may be directly used as the DC component voltage. Similarly, when the target voltage and the target frequency of the AC component voltage are equal to the power supply voltage of the AC power supply, the power supply voltage of the AC power supply may be directly used as the AC component voltage.

The DC component voltage and the AC component voltage are added, that is, the DC component voltage is added as offset voltage to the AC component voltage, and the resultant voltage is applied between the pair of electrodes 13 and 14. For example, when the AC component voltage is controlled through power conversion using the DC-AC converter, the DC component voltage may also be controlled.

The AC component of voltage applied to an electrode includes sinusoidal voltage. However, the AC voltage component according to the present embodiment is not limited to sinusoidal voltage, and includes voltage of any waveform such as rectangular waveforms or PWM waveforms. The sinusoidal wave and the rectangular wave are not limited to the sinusoidal wave and the rectangular wave in a strict sense, and indicate waveforms taking noise, distortion, and the like into consideration. The DC component of the voltage applied to the electrode is not limited to constant voltage, and DC component voltage varying over time may also be used.

A voltage controlling unit in the controller 10 may be any of an analog circuit, a digital circuit, and a circuit obtained by combining analog and digital circuits. For example, sinusoidal voltage may be generated by the analog circuit, or equivalent sinusoidal waves can be generated with the PWM waveform. For example, as a circuit that generates voltage with a rectangular waveform, a digital circuit may be used, and an analog circuit can also be used.

The voltage or current generated by the controller 10 is at least one voltage or current selected from the group consisting of:

(1) voltage or current that reduces an interfacial tension of an object;

(2) voltage or current that prevents food and drink or a liquid from becoming rotten;

(3) voltage or current that contributes to at least one of fresh flower preservation, drinking water preservation, hydroponic cultivation promotion or environmental improvement, germination rate improvement, hatching rate improvement, aquarium antifouling or purification, water quality improvement, rock sugar growth promotion, fuel reforming, or fuel efficiency improvement;

(4) voltage or current that contributes to at least one of preservation of blood or blood components, improvement in symptoms of diabetes, improvement in symptoms of chronic kidney disease, improvement in artificial dialysis, improvement of blood flow, revascularization, improvement in symptoms of peripheral neuropathy, improvement in symptoms of arthropathy or rheumatism, organ preservation, antitumor effect, improvement in symptoms of ischemia, improvement in symptoms of lymphatic edema, improvement in symptoms of bed sores, necrosis prevention or improvement, improvement in symptoms of circulatory diseases, or infection control;

(5) voltage or current that improves efficiency of at least one of charging or discharging of a capacitor, a generator, or a power transmission facility;

(6) voltage that promotes emulsification or generation of an emulsion or voltage or current that achieves a longer emulsion state maintained period;

(7) voltage or current that increases the effect of an air purifier or an ionizer;

(8) voltage or current that separates atoms or molecules into types;

(9) voltage for controlling temperature or humidity in a space;

(10) voltage or current that separates moisture from at least one of bacteria, germs, viruses, or microorganisms; and

(11) voltage or current that facilitates chemical polishing, mechanical polishing, chemical-mechanical polishing, or magnetic polishing.

[Control by Controller]

The moisture control apparatus 1 is driven by the controller 10 and an electric field is generated between the pair of electrodes 13 and 14. In this case, the electrodes 13 and 14 functions as an antenna, and an electromagnetic field is generated with electromagnetic waves radiated between the electrodes 13 and 14. The electrodes 13 and 14 may also be vibrated by an electric, magnetic, or mechanical unit, so that sound waves and/or ultrasonic waves can be generated between the electrodes. An example of the unit that can be used for generating the sound waves and/or ultrasonic waves between the electrodes includes a piezoelectric element. Thus, at least one of an electric field, a magnetic field, an electromagnetic field, electromagnetic waves, sound waves, and ultrasonic waves is generated between the electrodes 13 and 14. With the sound waves and/or ultrasonic waves used in addition to the electric field, magnetic field, electromagnetic field, or electromagnetic waves, a higher effect of improving the characteristics of an object can be achieved.

The controller 10 performs feedback control on at least one of the values of the current and/or the voltage applied to the electrode, the frequency of the current and/or the voltage, and the phase of the current and/or the voltage, based on a detection signal from the detector 38. The detector 38 includes at least one of a voltage sensor configured to detect the voltage applied to the electrode, a current sensor configured to detect the current applied to the electrode, a frequency sensor configured to detect the frequency of the voltage and/or current applied to the electrode, a phase sensor configured to detect the phase of the voltage and/or current applied to the electrode, a magnetic field sensor configured to detect a magnetic field between the electrodes 13 and 14, an electric field sensor configured to detect an electric field between the electrodes 13 and 14, a sound wave sensor configured to detect the magnitude and/or the frequency of the sound waves between the electrodes 13 and 14, and an ultrasonic wave sensor configured to detect the magnitude and/or the frequency of the ultrasonic waves between the electrodes 13 and 14.

The electrode may be provided with the sensor. The electrode itself can be used as the sensor. When the electrode is provided with a sensor, wires (for example, two wires) for the sensor are required in addition to the power supply line for supplying power to the electrode. The number of wires between the controller 10 and the electrode is smaller the better. In this context, the power supply line and the sensor lines may be combined into a single cord. The single cord used in such a case is at least covered with an insulating material. Furthermore, the cord preferably also has durability and heat resisting property. Furthermore, considering the application in a freezer chamber, the cord is preferably capable of withstanding cold temperatures. For example, considering the application in a fryer, the cord is required to have durability and heat resisting property in addition to insulating property, and thus may be coated using a material such as fluorine resin, for example. When a pair of electrodes are provided, only one of the electrodes may be provided with the sensor. Alternatively, both electrodes may be provided with sensors, so that the sensor provided to one of the electrodes can detect a physical quantity generated by the other electrode. When three or more electrodes are provided, the sensor may be provided to at least one of the electrodes. However, this should not be construed in a limited sense, and the sensor may be provided to a plurality of electrodes or to all of the electrodes.

At least one of the control target values in the controller 10, which is the current value, the voltage value, their frequencies, and their phases, is set in accordance with the type and/or the state of the target object. The control target value may be remotely set through an unillustrated communication device. The control parameters and/or the control amount of the controller 10 can also be remotely controlled. Thus, the controllers 10 of a plurality of the moisture control apparatuses 1 can be collectively managed by the server 40 at a remote location, whereby the controllers 10 can be appropriately controlled. However, the control mode for the controller 10 is not limited to the remote control from the server 40. The controller 10 of each moisture control apparatus 1 can be individually controlled with the control target value and/or the control parameter directly set to each controller 10, for example.

The controller 10 is provided with the storage unit 37 storing a control program. The controller 10 is controlled based on this control program. The control program is rewritable through communications or the storage medium, and thus a program version can be upgraded by updating the program as appropriate. The controller 10 and the server 40 can communicate with each other. Thus, the storage unit 37 stores the control parameter, the control amount, the control program, or various setting values transmitted from the server 40. The control program can be stored in any appropriate storage medium.

FIGS. 2A and 2B is a schematic view of water molecules. FIG. 2A illustrates water molecules in a freely moving state, and FIG. 2B illustrates water molecules in a pearl-chain structure.

The target object (a food product such as meat, fish, and vegetable, beverage, animal/plant cells, oil, and the like, for example) contains water molecules as moisture such as free water.

Generally, water molecules ($H_2O$) are randomly arranged as illustrated in FIG. 2A. Thus, hydrogen atoms H may take in active oxygen 30 or cause hydrogen bond. This results in larger and thus less active water molecules. Then, oxidation of the water molecules starts.

The electric field generated between the pair of electrodes 13 and 14 causes the water molecules to be arranged in a single orientation. This is because, in the water molecules, oxygen atoms O with strong attractive force for electrons become slightly negative and hydrogen atoms H, which are likely to emit electrons, become slightly positive, and thus the atoms are oriented in the respective directions toward the electric field between the pair of electrodes 13 and 14.

When the controller 10 causes the AC component voltage to be generated, the water molecules changes their orientation in an alternating manner. Specifically, the water molecules change their orientations at a frequency that is the same as that of the AC component voltage to be in a state as if they are vibrating. As the water molecules repeatedly vibrate, as illustrated in FIG. 2B, the hydrogen bonding with the active oxygen 30 or other components is released. Thus, the water molecules are gradually finely grained and arranged.

The same applies to water particles (fine water drops) as moisture such as free water in the object. Thus, the electric field between the pair of electrodes 13 and 14 causes the water particles to be attracted to each other, whereby the pearl-chain structure is achieved.

The DC component voltage applied between the pair of electrodes 13 and 14 involves a force component causing the water molecules to be arranged along the orientation of the electric field generated by the DC component voltage. Thus, the regular arrangement of the water molecules can also be achieved by applying only the DC component voltage between the pair of electrodes 13 and 14. Application of the AC component voltage to the DC component voltage results in the water molecules changing their orientation at a frequency that is the same as that of the AC component voltage, and involves the force component causing the water molecules to be arranged in a single direction. Thus, the movement of the water molecules to be regularly arranged is facilitated. The same applies to the state of water particles. Specifically, the electric field between the pair of electrodes 13 and 14 causes the water particles as the moisture such as free water to be attracted to each other, whereby the pearl-chain structure is achieved.

When the voltage applied between the pair of electrodes 13 and 14 includes no DC component voltage, the water molecules change their orientation at a frequency that is the same as that of the AC component voltage to be in the vibrating state. As the water molecules repeatedly vibrate, the hydrogen bonding with the active oxygen 30 or other components is released. Thus, the water molecules are gradually finely grained and arranged. This effect of the AC component voltage in the case where the voltage applied between the pair of electrodes 13 and 14 includes no DC component voltage similarly applies to the state of the water particles. Specifically, the electric field between the pair of electrodes 13 and 14 causes the water particles as the moisture such as free water to be attracted to each other, whereby the pearl-chain structure is achieved.

The sound waves or the ultrasonic waves have an effect of vibrating the water molecules. Thus, application of DC component voltage and/or AC component voltage between the pair of electrodes 13 and 14 with the sound waves and/or ultrasonic waves at a predetermined frequency and with a predetermined intensity generated between the electrodes increases the effect of facilitating the movement of the water molecules to be arranged. When the water molecules are vibrated by the predetermined sound waves and/or ultrasonic waves, the water molecules can be aligned even if no voltage is applied between the electrodes.

Water can be classified into "bonded water" and "free water". The bonded water is in a stable state due to hydrogen bonding with other components. On the other hand, the free water is in a freely movable state corresponding to a fresh and moist state when the object is a food product. However, molecules of the free water are likely to bond with other components, meaning that the food containing free water is perishable. Specifically, the food product is perishable as a result of free water bonding with germs, viruses, microorganisms, or active enzyme. Also in the bonded water state, the food product could be perishable, because bonded water turns into free water due to elapse of time, temperature rise, and dry environment and cell components that has been hydrogen-bonded may partly be picked up by the food product. In view of this, a bonded state where free water is in the pearl-chain structure (this is distinguished from the "bonded water state" described above) or a state of bonding to other cell and the like is achieved to enable the freshness to be maintained.

The moisture control apparatus 1 according to the present embodiment is expected to enable the water molecules to be in the pearl-chain structure so that free water bonding is achieved to establish a structure as stable as that of the bonded water. Specifically, the water molecules regularly arranged by the moisture control apparatus 1 according to the present embodiment do not bond with other components while being held in the object, whereby a food product can be maintained to be in a fresh and moist state.

Thus, with the moisture control apparatus 1 according to the present embodiment installed in a container, the arrangement of free water in an object in the container can be controlled. Thus, when the object is a food product, a medicine, or a cell, the freshness of the food product, the medicine, or the cell can be maintained. For example, the moisture control apparatus 1 may be used as a transportation container, so that a food product can be transported for a longer distance with the freshness maintained compared with conventional cases. The container may be a styrofoam container or the like, and a transportation container can be formed by attaching the moisture control apparatus 1 according to the present embodiment to an existing styrofoam container.

Once the water molecules are regularly arranged by the moisture control apparatus 1 according to the present embodiment, the water molecules are maintained to be in the regularly arranged state for few days. Thus, when the object is a food product, a medicine, or a cell, the freshness of the food product, the medicine, or the cell can be maintained even when the object is relocated and stored in a different container after the pearl-chain structure state of free water has been achieved by the moisture control apparatus 1 according to the present embodiment.

When predetermined voltage is applied to the electrodes 13 and 14, the water molecules in moisture of an object are electrically aligned, to be oriented in substantially the same direction (orientation of the electric field). With the water molecules aligned, the conductivity of the object increases. The water molecules can be aligned also when the object is liquid. Thus, the conductivity can be increased even when the object is pure water, for example. The water molecules slightly vibrate at a predetermined frequency in an electric field, and thus do not crystallize at a temperature close to 0° C.

When predetermined voltage is applied to the electrodes 13 and 14, the hydrogen bonding between water molecules in the object is suppressed (reduced), and thus physiological water can be obtained, for example. Fine bubbles such as microbubbles, micro-nano bubbles, nanobubbles, or the like may be added to this water, so that more functional water can be obtained. Such improvement of the function of liquid achieved by an electric field and fine bubbles is not limited to water, and can be achieved for a solution, emulsion, oil, and the like, for example.

When predetermined voltage is applied to the electrodes 13 and 14, hydration of water molecules in the moisture in the object is promoted. For example, deterioration of the object can be suppressed with proteins and the like included in the object hydrated to result in a state where the proteins and the like bond with the water molecules to be surrounded by the water molecules.

Figure 3B:
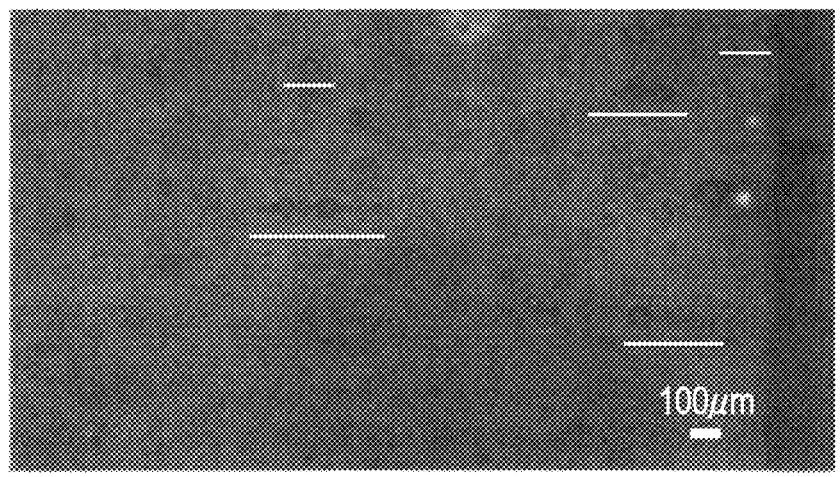

FIGS. 3A and 3B are photomicrographs of free water. FIG. 3A shows a state of the free water before application of an electric field. FIG. 3B shows a state of the free water after the application of the electric field. As illustrated in FIG. 3B, with free electrons after the application of the electric field, the pearl-chain structure of the water particles can be seen in portions marked with white underlines. On the other hand, as illustrated in FIG. 3A, in the free water before the application of the electric field, no pearl-chain structure of the water particles can be found. Thus, it is confirmed in FIGS. 3A and 3B that the moisture control apparatus 1 according to the present embodiment can achieve the pearl-chain structure state of the free water.

Figures 4A, 4B:
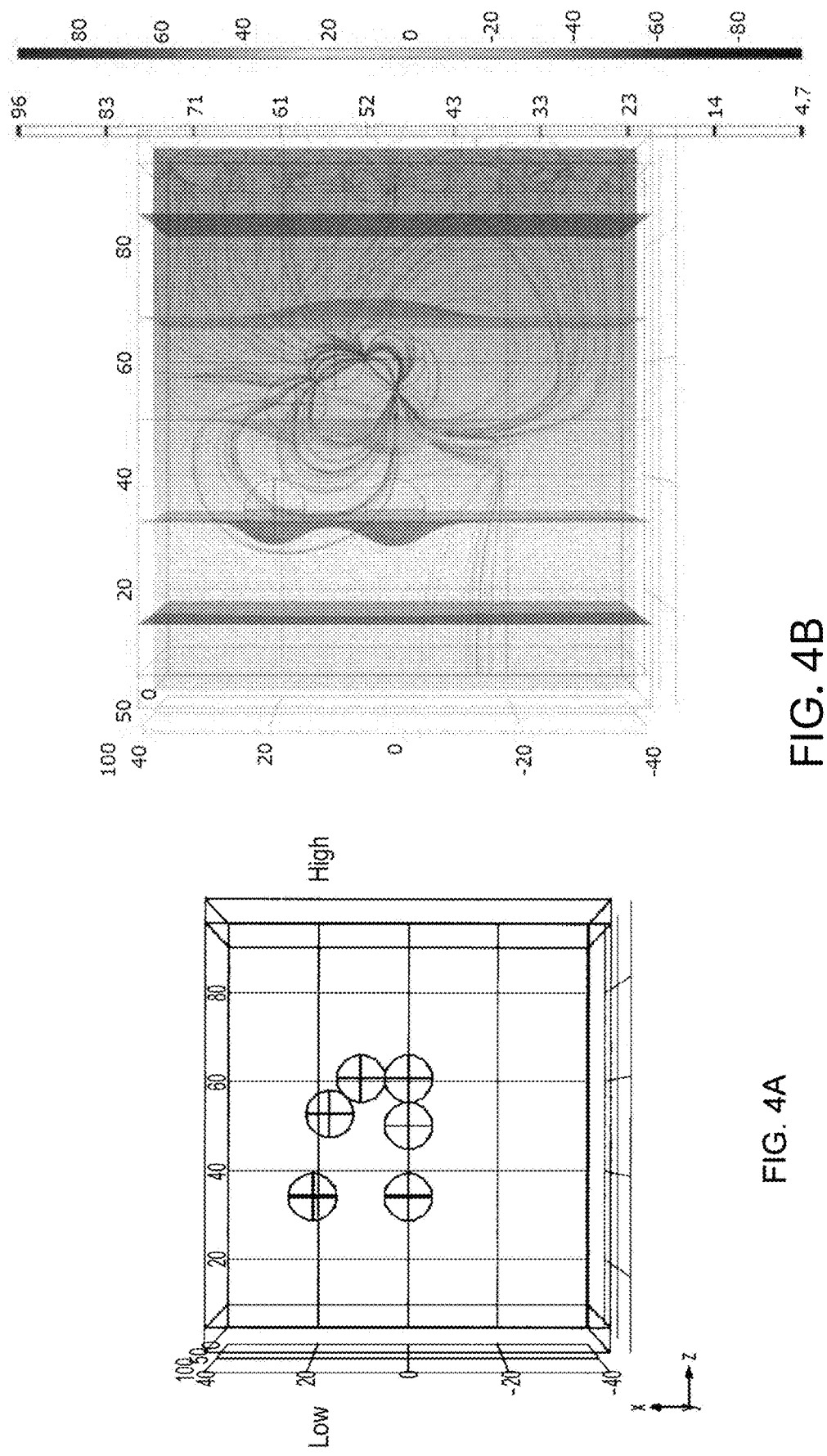
FIGS. 4A and 4B illustrate potential simulation results of water particles FIG. 4A being a diagram illustrating a simulation model and FIG. 4B illustrating a potential simulation result.

FIGS. 4A and 4B illustrate potential simulation results of water particles. FIG. 4A is a diagram illustrating a simulation model. FIG. 4B illustrates a potential simulation result. As illustrated in FIGS. 4A and 4B, free water in the simulation model includes four water particles in the pearl-chain structure in a center portion, and two independent water particles on the left side thereof.

FIG. 4B illustrates three portions of equipotential regions in a cross section in a vertical direction along a longitudinal direction of the water particles. In the rightmost cross section, it is indicated that in a portion where the water particles are in the pearl-chain structure, equipotential water particles are in the pearl-chain structure. The region with the four water particles in the pearl-chain structure, in the center portion in the figure, is substantially uniformly colored. Thus, it can be seen that the potential is substantially uniform in the region with the four water particles in the pearl-chain structure.

Electric field lines running among the four water particles in the pearl-chain structure indicate that these four water particles are attracted to each other. Electric field lines can also be found between the four water particles in the pearl-chain structure and the two independent water particles separated from and on the left side of the four water particles in the pearl-chain structure. Thus, it is expected that force in a direction to be attracted to the four water particles in the pearl-chain structure is also acting on the two independent water particles. Thus, the two independent water particles may join the pearl-chain structure of the four particles.

Figure 5:
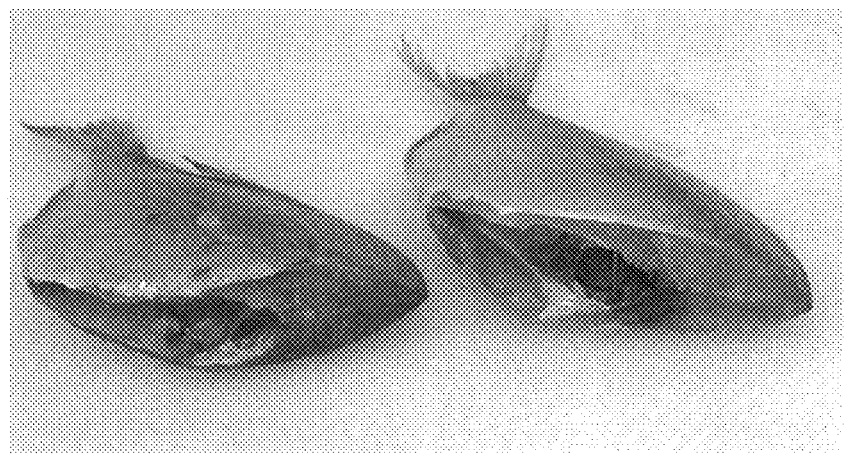
FIG. 5 is a photograph showing a result of preserving sea bream for 5 days.

FIG. 5 is a photograph showing a result of preserving a sea bream for five days. The left photograph shows a result of preserving the sea bream in an ordinary refrigerator. The right photograph shows a case where an electromagnetic field is applied by the moisture control apparatus 1 according to the present embodiment. In the left photograph, the sea bream is rotten due to the free water bonding with germ, virus, or active enzyme. On the other hand, in the right photograph, rotting is suppressed because the water particles as free water is in the pearl-chain structure to be separated from the germ, virus, or active enzyme.

Comparison between a sea bream preserved in an ordinary refrigerator for 48 hours and a sea bream preserved for 47 hours after one-hour-application of the electromagnetic field by the moisture control apparatus 1 according to the present embodiment indicates that the rotting of the latter was further suppressed. All things considered, there is an advantageous effect that once the pearl-chain structure of the water particles as the free water in an object is achieved due to the application of the electromagnetic field to the object by the moisture control apparatus 1 according to the present embodiment, the pearl-chain structure of the water particles is maintained for a predetermined period of time even after the object has been removed from the electromagnetic field.

Figure 6:
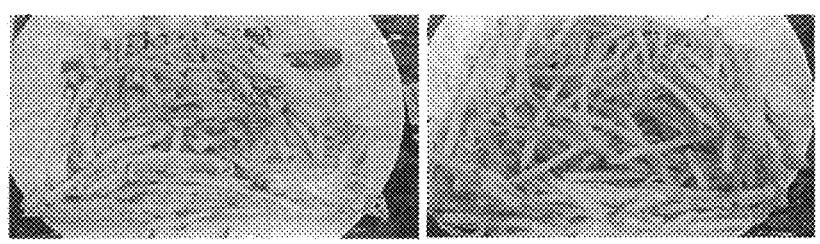
FIG. 6 includes photographs showing a result of preserving bean sprouts for 10 days.

FIG. 6 includes photographs showing a result of preserving bean sprouts for 10 days. The left photograph shows a result of preserving the bean sprouts in an ordinary refrigerator. The right photograph shows a case where an electromagnetic field is applied by the moisture control apparatus 1 according to the present embodiment. In the left photograph, free water contained in the bean sprouts leaked, resulting in a moisture drip amount of 27 g. On the other hand, in the right photograph, the moisture drip amount was 1 g, due to the water particles as the free water contained in the bean sprouts being in the pearl-chain structure to be in a state of being held inside the bean sprouts.

Figure 7:
FIG. 7 includes photographs showing a result of preserving pea sprouts for 35 days.

FIG. 7 includes photographs showing a result of preserving pea sprouts for 35 days. The left photograph shows a result of preserving the pea sprouts in an ordinary refrigerator. The right photograph shows a case where an electromagnetic field is applied by the moisture control apparatus 1 according to the present embodiment. In the left photograph, freshness is compromised due to free water contained in the pea sprouts escaping, and the weight decreased by 15% due to moisture evaporation. In the right photograph, freshness is maintained due to the water particles as free water contained in the pea sprouts being in the pearl-chain structure to be in a mutually bonded state, meaning that the free water is less likely to evaporate. In the right photograph, the reduction of weight was suppressed to 8%.

Figure 8:
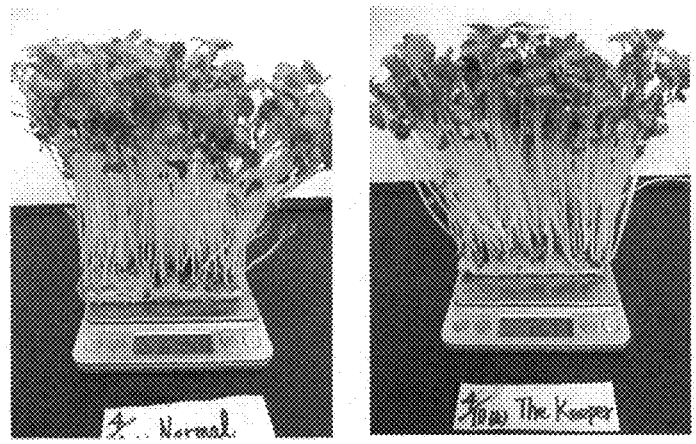
FIG. 8 includes photographs showing a result of preserving white radish sprouts for 10 days.

FIG. 8 includes photographs showing a result of preserving white radish sprouts for 10 days. The left photograph shows a result of preserving the white radish sprouts in an ordinary refrigerator. The right photograph shows a case where an electromagnetic field is applied by the moisture control apparatus 1 according to the present embodiment. In the left photograph, the freshness is compromised and leaves are decolored, due to the free water contained in the pea sprouts escaping. In the right photograph, the freshness is maintained and the leaves are hardly decolored due to the water particles as free water contained in the pea sprouts being in the pearl-chain structure to be in a mutually bonded state, meaning that the free water is less likely to evaporate.

Figure 9:
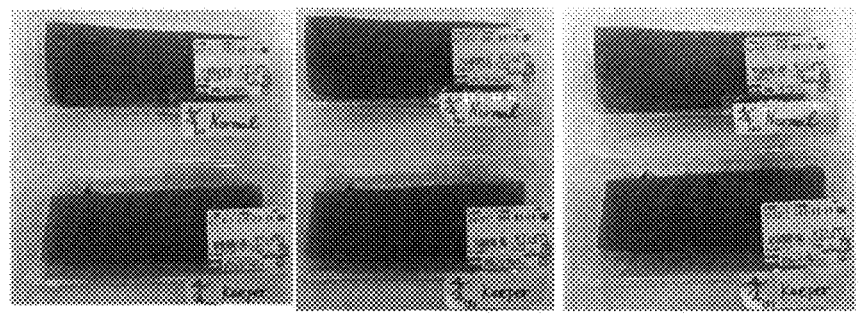
FIG. 9 includes photographs showing a result of preserving a tuna fillet for 10 days.

FIG. 9 includes photographs showing a result of preserving a tuna fillet for 10 days. In FIG. 9, the upper photograph shows a result of preserving the tuna fillet in an ordinary refrigerator. The lower shows the tuna fillet preserved in the refrigerator under application of an electric field by the moisture control apparatus 1 according to the present embodiment. The left one shows a result of preservation at day 1, the center one shows a result of preservation at day 5, and the right one shows a result of preservation at day 10. In the upper photograph, the surface largely decolored as the preservation days went by. On the other hand, almost no decoloring is found in the lower-side photograph, indicating that the freshness of the tuna fillet was maintained by the moisture control apparatus 1 according to the embodiment.

Figure 10:
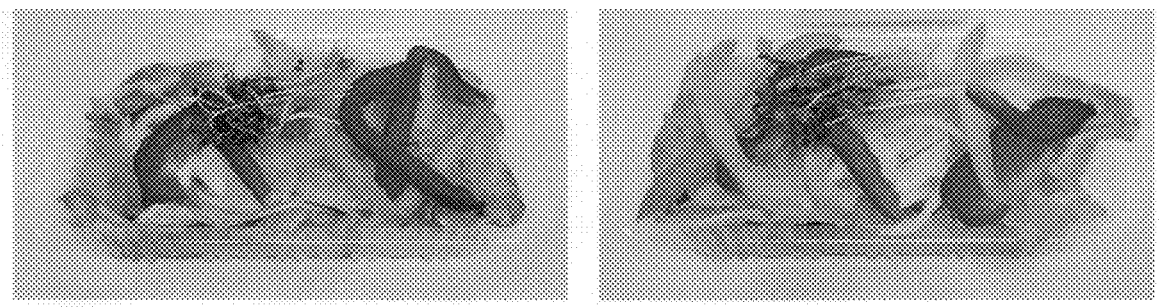
FIG. 10 includes photographs showing a result of preserving a salad for six days.

FIG. 10 includes photographs showing a result of preserving a salad for six days. In FIG. 10, the left photograph shows a result of preserving the salad in an ordinary refrigerator. The right photograph shows the salad preserved in the refrigerator under application of an electric field by the moisture control apparatus 1 according to the present embodiment. In the left photograph, sprouts are rotten and lettuce is decolored. This salad is limp as a whole, and emits rotten odor indicating it is inedible. In the right photograph, the freshness of the vegetable is maintained with rotting prevented, with the water particles as free water contained in the vegetables being in the pearl-chain structure to be in the bonded state, so that the free water is less likely to evaporate and is prevented from bonding with bacteria. Furthermore, in the right photograph, the crispiness of the vegetables was maintained, and sprouts which are relatively perishable hardly changed. One who ate this salad still felt freshness.

Figure 11:
FIG. 11 is a photograph showing a result of preserving a Chinese cabbage for 79 days.

FIG. 11 is a photograph showing a result of preserving a Chinese cabbage for 79 days. The electromagnetic field was applied by the moisture control apparatus 1 according to the present embodiment during the preservation. After the preservation for 79 days, the surface was slightly decolored but the cross section on a cut surface was still in a clean state. A leaf portion that is likely to be spoilt did not rot, or largely change. Generally, a Chinese cabbage keeps growing even after being cut and thus consumes energy to compromise the freshness. On the other hand, the freshness was maintained with the electromagnetic field applied by the moisture control apparatus 1 according to the present embodiment.

Figure 12:
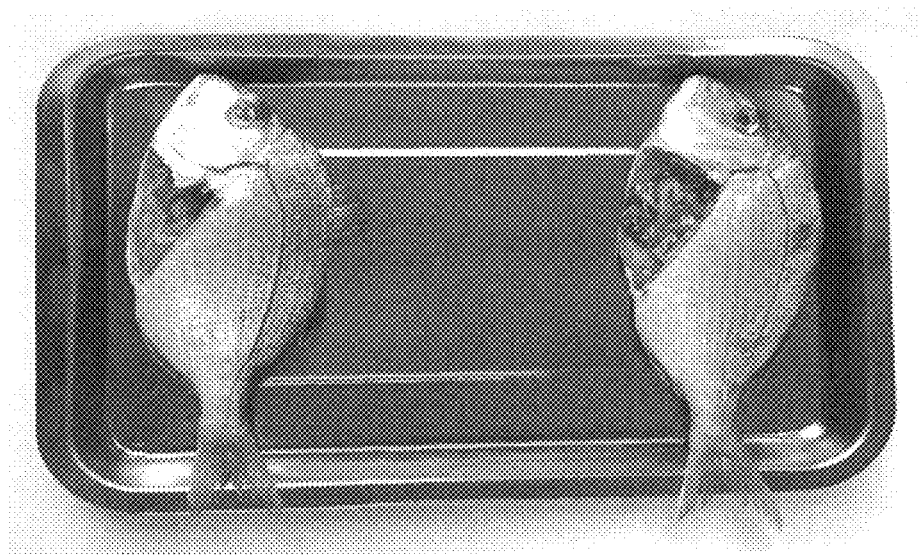
FIG. 12 is a photograph showing a result of processing a sea bream for an hour with an apparatus according to the present embodiment.

FIG. 12 is a photograph showing a result of processing a sea bream for an hour with the moisture control apparatus 1 according to the present embodiment. The right photograph shows a result of preserving the sea bream in an ordinary refrigerator for 48 hours. The left photograph shows a result preserving the sea bream in an ordinary refrigerator for 47 hours, after one-hour-application of the electromagnetic field by the moisture control apparatus 1 according to the present embodiment. In the right photograph, the guts are largely decolored and the freshness is compromised. In the left photograph, the guts are hardly decolored, and the freshness is maintained. Thus, it can be seen that despite the fact that the electromagnetic field was applied to the sea bream for only the first one hour by the moisture control apparatus 1 according to the present embodiment, the freshness maintaining effect lasted in the subsequent state with no application of the electromagnetic field. The initial electromagnetic field application period is not limited to one hour. The effect can be obtained when the period is from 20 minutes to 60 minutes, for example, and can also be obtained when the period is about 10 to 20 minutes. Of course, the application of electromagnetic waves for more than 60 minutes can achieve the effect, and the application period can be determined within a range between 60 minutes and 120 minutes.

Figure 13:
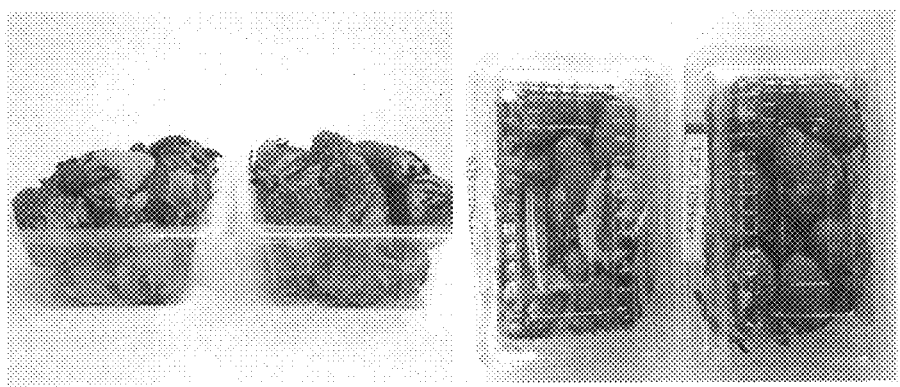
FIG. 13 includes photographs showing a result of processing strawberries for an hour with the apparatus according to the present embodiment.

FIG. 13 includes photographs showing a result of processing strawberries for an hour with the apparatus according to the present embodiment. The left photograph shows a result of preserving the strawberries in an ordinary refrigerator for 33 days. The right photograph shows a result preserving the strawberries in an ordinary refrigerator for 33 days, after one-hour-application of the electromagnetic field by the moisture control apparatus 1 according to the present embodiment. In the left photograph, molds were generated in a plurality of portions, and thus the conditions on their surfaces indicate that the freshness was largely compromised. In the right photograph, a fresh appearance was maintained, and no molds were generated. Thus, it can be seen that despite the fact that the electromagnetic field was applied to the strawberries for only a first one hour by the moisture control apparatus 1 according to the present embodiment, the freshness maintaining effect lasted in the subsequent state with no application of the electromagnetic field. The initial electromagnetic field application period is not limited to one hour. The effect can be obtained when the period is from 20 minutes to 60 minutes, for example, and can also be obtained when the period is about 10 to 20 minutes. Of course, the application of electromagnetic waves for more than 60 minutes can achieve the effect, and the application period can be determined within a range between 60 minutes and 120 minutes.

Figure 14:
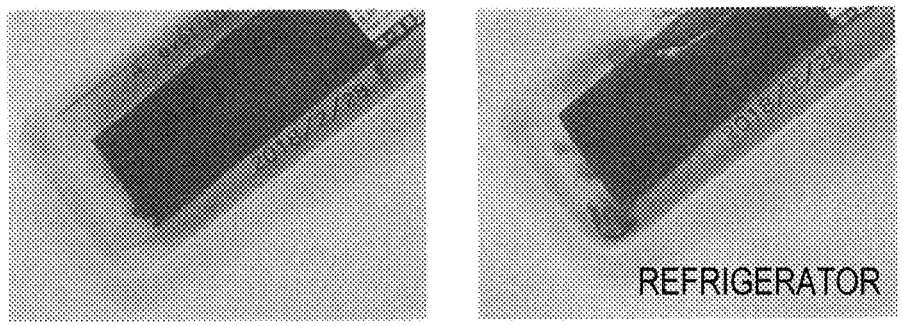
FIG. 14 includes photographs showing a result of thawing a piece of tuna.

FIG. 14 includes photographs showing a result of thawing a piece of tuna. The right photograph shows a result of thawing a piece of frozen tuna in an ordinary refrigerator. The left photograph shows a result of thawing the piece of tuna while applying the electromagnetic field by the moisture control apparatus 1 according to the present embodiment. Dripping can be seen in the right photograph. Specifically, frozen moisture in cells in a frozen state turned into liquid, resulting in a change of volume in the cells, whereby the cell membranes were destroyed and the moisture dripped out. On the other hand, in the left photograph, almost no dripping is found after the thawing. As a result of applying the electromagnetic field by the moisture control apparatus 1 according to the present embodiment, the water particles as free water in the cells were in the pearl-chain structure to be in a state of being bonded to each other. Thus, a change in volume due to thawing can be prevented. Thus, the cell membranes are prevented from being destroyed, and thus there is almost no dripping after thawing.

Table 1 lists results of inspecting the bacteria count in sliced tuna. Commercially available frozen sliced tuna was preserved in a refrigerator at 5° C., and the bacteria inspection was performed thereon once in every predetermined elapsed time. The sliced tuna preserved in the refrigerator under application of the electromagnetic field by the moisture control apparatus 1 according to the present embodiment was compared with that preserved in the refrigerator in an unprocessed state. Generally, in the unprocessed state, the general bacteria count increases with the elapse of time. However, the bacteria count hardly changed when the electromagnetic field was applied by the moisture control apparatus 1 according to the present embodiment.

TABLE 1

General bacteria count (Frozen sliced tuna purchased at a supermarket was preserved in a refrigerator at 5° C., and the bacteria inspection was performed thereon.)

|  | Initial bacteria count | | After 24 hours | | After 48 hours | | After 72 hours | |
| --- | --- | --- | --- | --- | --- | --- | --- | --- |
|  | Present embodiment | Control | Present embodiment | Control | Present embodiment | Control | Present embodiment | Control |
| General bacteria count | 300> | 300> | 300> | 2,000> | 300> | 40,000< | 300> | 100,000< |

[Reduction of Interfacial Tension]

In W/O emulsion (micro-water droplets in cooking oil, for example), interfacial tension can be reduced by applying the electromagnetic field with the moisture control apparatus 1 according to the present embodiment. In such a case, the interfacial tension can be reduced by 10% or more, or by 20% or more depending on the condition of the electromagnetic field. Furthermore, the interfacial tension can be reduced by 60% or more, by appropriately controlling the DC component voltage and the AC component voltage, for example. This effect is expected to be attributable to the increase in interfacial polarization as a result of the electromagnetic field application.

When food is cooked in cooking oil, for example, water droplets separated from the food to be in the cooking oil as a result of the moisture in the food turning into water vapor in the cooking oil are micro water droplets. If the interfacial polarization in the micro water droplets is sufficient for reducing the interfacial tension, the pearl-chain structure of the micro water droplets is achieved with attraction between dipoles.

When the food is fried with cooking oil by using a fryer, the interfacial tension of the oil/water interface cab be reduced with the pair of electrodes 13 and 14 of the moisture control apparatus 1 according to the present embodiment installed in the fryer. Generally, when food is cooked by heating, the moisture in the food turns into water vapor in the cooking oil, resulting in bumping. With the moisture control apparatus 1 according to the present embodiment, a predetermined electromagnetic field is generated, so that surface tension between the oil/water interface can be reduced. Thus, when moisture contained in the food is separated, the moisture turns into dispersible micro water droplets with a small particle diameter in the cooking oil. Thus, vaporization of the micro water droplets into water vapor in the heating cooking oil involves only small bumping. Application of the electromagnetic field results in the free water, contained in food, being in pearl-chain structure to be less likely to be separated from the food. With the moisture contained in food thus controlled to suppress the bumping, an effect of suppressing penetration of oil into the food can be obtained. With this effect, the cooked food can have superb mouthfeel and taste.

Figure 15:
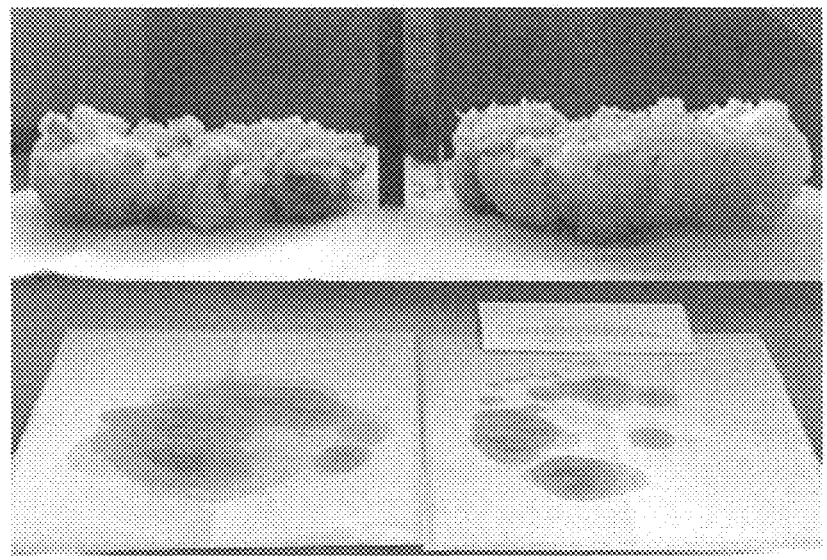
FIG. 15 includes photographs showing a state of food cooked in cooking oil.

FIG. 15 includes photographs showing a state of oil in food cooked in cooking oil. The upper left photograph shows a state of food cooked with a conventional fryer. The upper right photograph shows a state of food cooked with the pair of electrodes 13 and 14 of the moisture control apparatus 1 according to the present embodiment provided to the fryer. The lower photographs show states of an oil filter laid under the food cooked. In the lower right photograph, the trace of oil is smaller than that in the lower left photograph. This indicates that the food cooked using the moisture control apparatus 1 according to the present embodiment (upper right) absorbed a smaller amount of oil compared with the food cooked with a conventional fryer (upper left). The amount of oil absorbed by the food cooked using the moisture control apparatus 1 according to the present embodiment was approximately 50% of that absorbed by the food cooked with the conventional fryer. Thus, by using the moisture control apparatus 1 according to the embodiment, the food cooked in cooking oil can offer excellent mouthfeel for a long period of time after the cooking, the amount of oil used can be reduced, and the oil intake can be suppressed for the sake of health.

Figure 16:
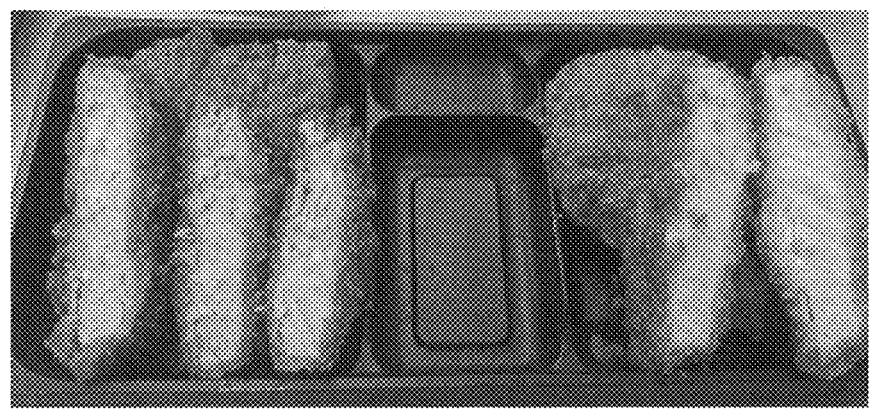
FIG. 16 is a photograph showing a state of pork cutlets cooked in cooking oil.

FIG. 16 is a photograph showing a state of frozen pork cutlet cooked in cooking oil. The left photograph shows a result of cooking with a conventional fryer. The right photograph shows a state of cooking under application of an electromagnetic field with the pair of electrodes 13 and 14 of the moisture control apparatus 1 according to the present embodiment provided to the fryer. In the left photograph, dryness is evident on the cross section, indicating that the juiciness is lost. On the other hand, the cross section in the right photograph looks good, indicating that the juiciness is maintained. Cooking under application of the electromagnetic field with the pair of electrodes 13 and 14 of the moisture control apparatus 1 according to the present embodiment provided to the fryer provides various advantageous effects including suppressing oil intake and maintaining juiciness. Furthermore, it has been confirmed that with the electromagnetic field applied for a predetermined period of time, the excellent state of the fryer can be maintained in the subsequent state without the electromagnetic field. For example, in a state without the electromagnetic waves due to the moisture control apparatus 1 turned OFF after applying the electromagnetic waves for about 30 minutes to two hours, the fryer can maintain the effect.

Table 2 lists results of measuring cooking time using the fryer. Frying time required for the core temperature in food to rise to 65° C. is compared between a case where the food was cooked with the electromagnetic field applied with the pair of electrodes 13 and 14 of the moisture control apparatus 1 according to the present embodiment installed to the fryer and a case where the food was cooked with an ordinary fryer. A shorter cooking time was achieved for all kinds of food listed in Table 1, when the cooking is performed with the electromagnetic field applied with the moisture control apparatus 1 according to the present embodiment.

TABLE 2

Frying time required for the core temperature in food to rise to 65° C.

|  | Total per frying | Total per day | Present embodiment Cooking time | Cont. Cooking time |  |
| --- | --- | --- | --- | --- | --- |
| Fried chicken | 4 pieces | 15 pieces | 5 min. | 5 min. 30 sec. | 30 sec. earlier |
| Deep-fried chicken | 12 pieces | 25 pieces | 2 min. 00 sec. | 3 min. 00 sec. | 1 min. earlier |
| Skewered chicken meatball | 5 pieces | 5 pieces | 2 min. 30 sec. | 3 min. 00 sec. | 30 sec. earlier |
| Fried potato | 500 g | 1,000 g | 3 min. 00 sec. | 4 min. 00 sec. | 1 min. earlier |
| Corndog | 5 pieces | 5 pieces | 2 min. 30 sec. | 3 min. 00 sec. | 30 sec. earlier |
| Beef croquette | 4 pieces | 7 pieces | 3 min. 00 sec. | 4 min. 30 sec. | 1 min. 30 sec. earlier |
| Fried minced meat | 4 pieces | 5 pieces | 4 min. 00 sec. | 4 min. 30 sec. | 30 sec. earlier |

Table 3 lists results of measuring the calorie of a food product cooked with a fryer. The calorie of the cooked food product was compared between a case where the food was cooked with the electromagnetic field applied with the pair of electrodes 13 and 14 of the moisture control apparatus 1 according to the present embodiment installed to the fryer and a case where the food was cooked with an ordinary fryer. The results show that the calorie of fried potatoes and croquette were lower in the case where the electromagnetic field was applied by the moisture control apparatus 1 according to the present embodiment.

TABLE 3

(kcal/100 g)

| Item | Present embodiment | Cont. | Rate |
| --- | --- | --- | --- |
| Fried potato (80 g) | 203 kcal | 229 kcal | 113% |
| Croquette (60 g) | 304 kcal | 316 kcal | 104% |

Table 4 lists results of measuring the moisture content in the food product cooked with a fryer. The moisture content in the cooked food product was compared between a case where the food was cooked with the electromagnetic field applied with the pair of electrodes 13 and 14 of the moisture control apparatus 1 according to the present embodiment installed to the fryer and a case where the food was cooked with an ordinary fryer. The results show that the moisture content in fried potatoes and croquette was larger in the case where the electromagnetic field was applied by the moisture control apparatus 1 according to the present embodiment.

TABLE 4

Moisture content (average of five tests)

| Item | Present embodiment | Cont. | Rate |
| --- | --- | --- | --- |
| Fried potato (80 g) | 61.2 g | 57.0 g | 93% |
| Croquette (60 g) | 48.4 g | 46.8 g | 97% |

Table 5 lists results of measuring degradation of oil in a fryer. A value indicating the oil oxidation level obtained by a TPM oil degradation measurement apparatus was compared between a case where the food was cooked with the electromagnetic field applied with the pair of electrodes 13 and 14 of the moisture control apparatus 1 according to the present embodiment installed to the fryer and a case where the food was cooked with an ordinary fryer. A larger TPM value indicates a higher level of oil oxidation. The TPM value was measured using a TESTO digital cooking oil tester with the following specification:

Measurement range: 0.5 to 40%

Accuracy ±1 digit: ±2.0% TPM (+40 to +190° C.)

Temperature range: +40 to +190° C.

Resolution: 0.5%

The TPM value was measured after all the frying operation has been completed each day (the values was adjusted to correspond to the same volume). Smaller TPM values were obtained after three to five days in the case where the electromagnetic field was applied by the moisture control apparatus 1 according to the present embodiment.

TABLE 5

| Accumulated (mL) | After day 1 | After 2 days | After 3 days | After 4 days | After 5 days |
|---|---|---|---|---|---|
| Cont. | 8 | 11.5 | 9 | 11 | 12.5 |
| Present embodiment | 8.8 | 11.5 | 7.7 | 9.6 | 10.4 |
| Rate | 109.9% | 100% | 86.0% | 87.7% | 83.6% |

Figure 17:
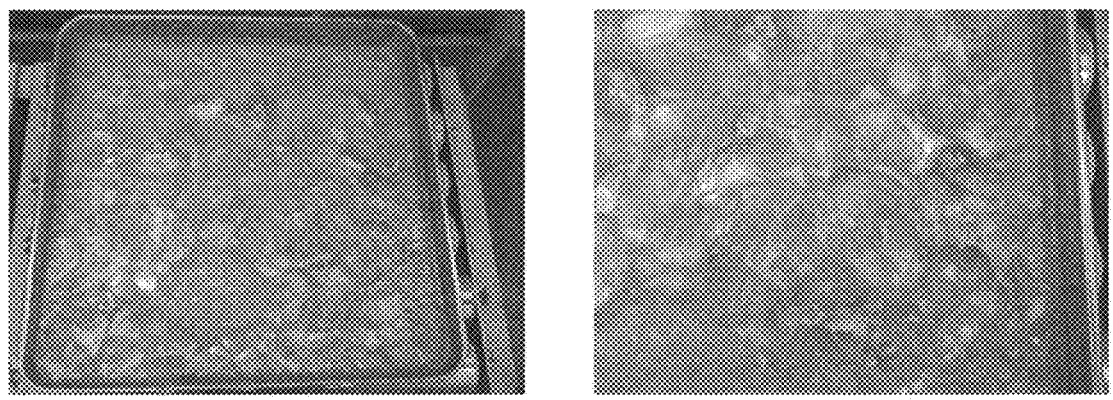
FIG. 17 includes photographs showing a result of producing rock sugar.

FIG. 17 includes photographs showing a result of producing rock sugar. Approximately eight liters of mother liquor was poured into a stainless container, and stored at 70° C. in a constant temperature tank. The pair of electrodes 13 and 14 of the moisture control apparatus 1 according to the present embodiment were provided to apply the electromagnetic field to the resultant object for a predetermined period of time. Thereafter, crystal growth on a crystal dish was implemented through a normal procedure. The crystal growth on the uppermost one of a plurality of stages of crystal dishes was compared between a case where the processing using the moisture control apparatus 1 according to the present embodiment was performed and a case where the processing was not performed. The result of the comparison indicated that with the present embodiment, the crystallization progressed at a higher rate (earlier by a day or two) compared with the case where the processing was not performed, with the graining started on the third day of the growth period. The quality of the rock sugar made was the same as that in the case where the processing was not performed.

Table 6 lists results of a sensory taste test on wine. The sensory taste test was performed on wine to which the electromagnetic field had been applied for 10 minutes with the electrodes of the moisture control apparatus 1 according to the present embodiment and wine not processed by the apparatus. The test was performed with a commercially available low cost wine (sold by Lawson at 380 yen, 10 minutes after the bottle opening) tasted by 100 people, and in the scale of 1 to 6 (6: very good, 5: good, 4: not bad, 3: not so good, 2: bad, 1: awful). In any of the first to the third days, the wine processed by the electrodes of the moisture control apparatus 1 according to the present embodiment was evaluated with high scores in smell and taste, and with a high overall score. In this test, the electric field was applied for 10 minutes. However, this time is not particularly limited, and may be about 3 to 20 minutes. The effect can be obtained with even longer time. For example, the electrodes used may be that illustrated in FIG. 41 described later.

TABLE 6

Wine (sold by Lawson at 380 yen, 10 minutes after the bottle opening)
Sensory taste test, 100 people

| | First day | | Second day | | Third day | |
|---|---|---|---|---|---|---|
| | Present embodiment | Cont. | Present embodiment | Cont. | Present embodiment | Cont. |
| Smell | 5.2 | 3.1 | 5.4 | 3.8 | 5.1 | 4.0 |
| Taste | 5.4 | 3.7 | 5.0 | 3.7 | 4.8 | 3.9 |
| Total | 5.3 | 3.4 | 5.2 | 3.8 | 5.0 | 4.0 |

Evaluated in the scale of 1 to 6 (6: very good, 5: good, 4: not bad, 3: not so good, 2: bad, 1: awful).

Table 7 lists results of a sensory taste test on soy sauce. The sensory taste test was performed on soy sauce to which the electromagnetic field had been applied for 10 minutes with the electrodes of the moisture control apparatus 1 according to the present embodiment and soy sauce not processed by the apparatus. The test was performed with a commercially available soy sauce (manufactured by Kikkoman, 10 minutes after the bottle opening) tasted by 100 people, and with evaluation in the scale of 1 to 6 (6: very good, 5: good, 4: not bad, 3: not so good, 2: bad, 1: awful). In any of the first to the third days, the soy sauce processed by the electrodes of the moisture control apparatus 1 according to the present embodiment was evaluated with high scores in smell and taste, and with a high overall score. As in the case of Table 1, the electric field was applied for 10 minutes in this test. However, this time is not particularly limited, and may be about 3 to 20 minutes. The effect can be obtained with even longer time. For example, the electrodes used may be that illustrated in FIG. 41 described later.

TABLE 7

Soy sauce (manufactured by Kikkoman, 10 minutes after the bottle opening)
Sensory taste test, 100 people

| | First day Present embodiment | Second day Cont. | Third day Present embodiment | First day Present embodiment | Second day Cont. | Third day Present embodiment |
|---|---|---|---|---|---|---|
| Smell | 5.7 | 5.1 | 5.8 | 5.2 | 5.5 | 5.4 |
| Taste | 5.8 | 5.2 | 5.6 | 5.2 | 5.4 | 5.1 |
| Total | 5.8 | 5.2 | 5.7 | 5.2 | 5.5 | 5.3 |

Evaluated in the scale of 1 to 6 (6: very good, 5: good, 4: not bad, 3: not so good, 2: bad, 1: awful).

Table 8 lists results of a sensory taste test on lemon. The sensory taste test was performed on lemon to which the electromagnetic field had been applied for 10 minutes with the electrodes of the moisture control apparatus 1 according to the present embodiment and lemon not processed by the apparatus. The test was performed with commercially available lemon 10 minutes after cutting tasted by 100 people, and with evaluation in the scale of 1 to 6 (6: very good, 5: good, 4: not bad, 3: not so good, 2: bad, 1: awful). In any of the first to the third days, the lemon processed by the electrodes of the moisture control apparatus 1 according to the present embodiment was evaluated with a high score in taste. The electric field was applied for 10 minutes in this test. However, this time is not particularly limited, and may be about 3 to 20 minutes or even longer. For example, lemon in a container may be placed on the electrodes that are a pair of flat plate electrodes adjacently arranged side by side on a single plane.

TABLE 8

Lemon (purchased at a supermarket, 10 minutes after cutting)
Sensory taste test, 100 people

| | First day | | Second day | | Third day | |
|---|---|---|---|---|---|---|
| | Present embodiment | Cont. | Present embodiment | Cont. | Present embodiment | Cont. |
| Taste | 5.6 | 4.4 | 5.6 | 4.1 | 5.2 | 3.9 |

Evaluated in the scale of 1 to 6 (6: very good, 5: good, 4: not bad, 3: not so good, 2: bad, 1: awful).

Table 9 lists results of a sensory taste test on a rice ball stored in a warm storage. The sensory taste test was performed on a rice ball, in the warm storage, to which the electromagnetic field has been applied for a predetermined period of time with the electrodes of the moisture control apparatus 1 according to the present embodiment and a rice ball stored in the warm storage without being processed by the apparatus. The test was performed with a commercially available pickled plum rice ball, stored in the warm storage kept at 60° C. for a predetermined period of time, tasted by 30 people, and with evaluation in the scale of 1 to 6 (6: very good, 5: good, 4: not bad, 3: not so good, 2: bad, 1: awful). In any of the first to the third days, the rice ball processed by the electrodes of the moisture control apparatus 1 according to the present embodiment was evaluated with high scores in appearance and taste, and with a high overall score. The electric field application time is not particularly limited, and may be about 10 minutes, may be about 3 to 20 minutes or even longer. For example, the electrodes may be a pair of electrodes provided on ceiling and bottom surfaces of a refrigerator. The number, arrangement, and shape of the electrodes are not particularly limited. Specifically, the number of electrodes is not limited to one pair, and may be one, three or more, or two pairs or more, as can be seen in FIGS. 30 to 41 described later, for example.

TABLE 9

Rice ball purchased at a convenience store, stored in a warm storage kept at 60° C.
Sensory taste test, 30 people

| | First day | | Second day | | Third day | |
|---|---|---|---|---|---|---|
| | Present embodiment | Cont. | Present embodiment | Cont. | Present embodiment | Cont. |
| Appearance | 5.7 | 5.5 | 5.5 | 4.2 | 5.5 | 3.5 |
| Taste | 5.8 | 5.4 | 5.6 | 4.6 | 5.4 | 2.3 |
| Total | 5.8 | 5.5 | 5.6 | 4.4 | 5.5 | 2.9 |

Evaluated in the scale of 1 to 6 (6: very good, 5: good, 4: not bad, 3: not so good, 2: bad, 1: awful).

Table 10 lists results of a sensory test as a result of a sommelier conducting tasting of wine processed by the moisture control apparatus 1 according to the present embodiment. Four types of wine each processed for 10 minutes by using three types of electrodes were analyzed by the sensory test. Whereas using pipe electrodes produced some effect, a higher effect was achieved with mesh or frame electrodes. Of these three types, the mesh electrodes were the most effective. The moisture control apparatus 1 has the effect of improving the taste and smell of not only wine, but also other beverages such as cocktails, Japanese sake, Japanese distilled beverages, and whiskey. The emulsion effect contributes to the improvement of the taste and smell of beverages and promotion of maturation with the moisture control apparatus 1. As the electrodes, for example, the one illustrated in FIG. 41 described later (an example of mesh electrodes) can be employed.

TABLE 10

| Electrode type | Red wine A | Red wine B | White wine C | White wine D |
|---|---|---|---|---|
| Pipe | Some effect felt. Hard. A sour taste remaining. An unpleasant taste. | Some effect felt. A sour taste remaining. | Some effect felt. A somewhat strong sour taste. | Some effect felt. Hard. |
| Mesh | No unpleasant taste. Mellow and soft. Not too strong any longer. | Mellow. A stronger fruity taste. Smooth. | As mellow as velvet. Aromatic. Not eye-watering. Soft and mild. | Aromatic. A deeper aftertaste. No unpleasant taste any longer. Mellow. |
| Frame | No unpleasant taste. Mellow and soft. Not too strong any longer. | Mellow. A stronger fruity taste. Smooth. | As mellow as velvet. Aromatic. Not eye-watering. Soft and mild. | Aromatic. A deeper aftertaste. No unpleasant taste any longer. Mellow. |

Table 10 lists results of comparing rice soaking time. Three hundred grams of unwashed rice was placed in a beaker, into which 260 g of water treated with the moisture control apparatus 1 was poured, and then the weight was measured every 10 minutes. The rice in a fine mesh bag was drained in a colander and then the weight was measured. As a processing method with the moisture control apparatus 1, bracket electrodes were placed in the water and maintained for 5 or 10 minutes. The weight after completion of soaking is usually 1.2 to 1.3 times the original weight, which means that the weight of 300 g of rice after completion of soaking is about 360 g. The rice soaking time of the rice processed for 5 minutes and for 10 minutes was improved compared with the unprocessed rice.

TABLE 11

| Experiment No. | Processing method | After 10 min. (g) | After 20 min. (g) | After 30 min. (g) | After 40 min. (g) | After 50 min. (g) |
|---|---|---|---|---|---|---|
| Control | — | 350 | 370 | 380 | 380 | 380 |
| Experiment 1 | With bracket electrodes placed in water, the rice was processed for 5 minutes. | 360 | 380 | 390 | 390 | — |
| Experiment 2 | With bracket electrodes placed in water, the rice was processed for 10 minutes. | 360 | 380 | 390 | 390 | — |

[Scope of Application]

The effect of controlling the free water arrangement is not limited to food products. For example, the target object may be at least one object selected from the group consisting of:
(1) agricultural products, fresh flowers, livestock products, fishery products, processed food products, health food products, beverages, alcoholic beverages, dry food products, broth, soup, seasonings, or other food items,
(2) resin, rubber, glass, lenses, pottery, wooden materials, cement, concrete, minerals, paper, inks, dyes, fibers, ceramics, abrasives, cleaners, additives, printed circuit boards, plating products, refining products, paints, India ink, water-repellent products, chemical products, fertilizers, animal feeds, microorganisms, water, cloth, gunpowder, or other like products,
(3) gasoline, light oil, heavy oil, kerosene, petroleum, or other fuels,
(4) blood, vaccines, medicines, organs, cells, ointments, dialysis machines, therapy equipment, or other medical products,
(5) cosmetics, detergents, soap, shampoo, hair-care products, or other commodities,
(6) apparatuses for power generation, power storage, power transmission, or combustion,
(7) quality-maintained, dried, preserved, frozen, or thawed products,
(8) emulsions, objects resulting from oxidation or reduction, water absorption, or extraction,
(9) abrasives or abrasive grains used for polishing including at least one of chemical polishing, mechanical polishing, chemical-mechanical polishing, or magnetic polishing, and
(10) equipment including health appliances, exercise machines, muscle-building machines, or playground equipment. However, the object is not particularly limited, and the effect is applicable to any object containing moisture (free water for example).

The moisture control apparatus 1 according to the present embodiment achieves excellent effects for agricultural products, fresh flowers (see FIG. 19), livestock products, and fishery products. Examples of such effects include germination promotion for seeds and bulbs, improvement of germination rate, growth promotion and growing environment improvement for plants (see FIG. 18), hatching rate improvement and hatching promotion for eggs, promotion of fry growth, improvement of productivity of aquaculture products, and improvement in aquaculture environment.

With the moisture control apparatus 1 according to the present embodiment, extraction of beverage, soup stock, soup, and the like is improved, whereby effects such as improvement of taste and reduction of extraction time can be achieved. For example, the beverage may be any beverage including coffee, tea, and Japanese tea. For coffee among these, the moisture control apparatus 1 according to the present embodiment can be used for achieving advantageous effects in various stages including: drying/storage of raw coffee beans; roasting of raw coffee beans; dripping of coffee; and keeping the coffee warm. Thus, flavorful coffee can be offered. For wine, the moisture control apparatus 1 according to the present embodiment can be used for achieving advantageous effects in various stages including: grape juice extraction; wine brewing; wine aging; preservation of bottled wine; and at the time of bottle opening (see FIG. 41. With a wine bottle at the time of opening or an open wine bottle provided between the electrodes, wine can have improved flavor, taste, and smell). Thus, flavor, taste, and smell of wine can be improved. For soup stocks and soup, the moisture control apparatus 1 according to the present embodiment can be used for achieving various effects such as shorter extraction time, increased extraction amount, and flavor improvement. The apparatus further achieves effects for extraction of medicine such as an herbal medicine.

The moisture control apparatus 1 according to the present embodiment can achieve effects of improving quality and taste of food and drink. For example, the moisture control apparatus 1 can be used for a steak meat being preserved. In such a case, dripping from the meat during cooking with heat is suppressed, whereby the flavor can be kept inside the meat. As a result, tender meat can be obtained by various cooking styles such as grilling, boiling, and steaming, with meat juice prevented from dripping. Furthermore, the moisture control apparatus 1 according to the present embodiment can be used during the cooking with heat. Furthermore, pasta, soba, ramen, and the like may be processed by the moisture control apparatus 1 according to the present embodiment before being formed into noodles. As a result, glossy, chewy, and well-flavored noodles can be produced. The moisture control apparatus 1 according to the present embodiment can further be applied to a cutting board, cooking table, sink, and the like.

For example, free water contained in a pottery can be in the pearl-chain structure due to the electromagnetic field applied. Thus, the free water is stored in the pottery, so that cracking of the pottery can be suppressed. Similarly, when the free water in the pearl-chain structure is contained in an object as a result of applying the electromagnetic field, cement and concrete can have higher strength, resulting in a lower risk of cracking. With inherent moisture in a mineral such as iron ore kept therein, leakage of the moisture during transportation can be suppressed.

For example, when the electromagnetic field is applied to fuels such a gasoline and light oil, the surface tension of the W/O emulsion can be reduced. As a result, the water particles turn into dispersible micro water droplets with small particle diameters. Furthermore, the water particles are in the pearl-chain structure. Thus, fuel reforming and fuel efficiency can be improved.

For example, blood, vaccine, medicine, organs, cell, and the like can have the free water in the pearl-chain structure contained therein with the electromagnetic field applied, and thus can be in an excellent state and can be stored for a longer period of time.

Furthermore, for example, the electromagnetic field can be applied to cosmetics and the like. As a result, the water particles contained turns into dispersible micro water droplets with small particle diameters. Furthermore, the micro water droplets can be in the pearl-chain structure. Thus, the cosmetics and the like can have excellent characteristics.

Furthermore, with the moisture control apparatus 1 according to the present embodiment, efficiency of apparatuses for power generation, power storage, power transmission, or combustion can be improved. For example, chemical reaction related to charging/discharging of a power storage apparatus can be improved, whereby efficiency of a power system can be improved and the power storage apparatus and the like can have a longer service life. In a combustion system, for example, liquid reformation in a cooling unit and heat exchanger can be achieved in addition to the improvement of the combustion efficiency. Thus, further efficiency improvement can be achieved, and a longer maintenance interval can be achieved.

With the moisture control apparatus 1 according to the present embodiment, emulsification or generation of emulsion can be promoted, and a longer emulsion state maintained period can be achieved. The moisture control apparatus 1 according to the present embodiment can reduce the interfacial tension, so that liquid in the emulsion can be fine particles. Thus, the emulsification or generation of emulsion can be promoted, and a longer emulsion state maintained period can be achieved The moisture control apparatus 1 according to the present embodiment can improve the effectiveness of an air purifier or an ionizer. The moisture control apparatus 1 according to the present embodiment can also provide an anti-mold effect, can improve a catalyst effect for a catalyst operating with moisture, and can also be applied to water molecules in the ionizer. Furthermore, the moisture control apparatus 1 according to the present embodiment can separate atoms or molecules into types, for example.

The electromagnetic field may be applied with a pair of electrodes of the moisture control apparatus 1 according to the present embodiment installed to provide an effect of maintaining humidity in a space between the electrodes at a constant level. In such a case, such a space does not need to be partitioned by walls. When the humidity is maintained at a constant level, no friction occurs, and thus a temperature maintaining effect can further be achieved. Thus, the moisture control apparatus 1 according to the present embodiment can control the temperature and the humidity of the space.

The moisture control apparatus 1 according to the present embodiment can separate moisture from bacteria, germs, virus, and microorganism, for example. The bacteria, germs, virus, microorganism, and the like are activated upon bonding with free water. Thus, the moisture control apparatus 1 according to the present embodiment acts on moisture to separate the moisture from bacteria, germs, virus, microorganism, and the like. In this context, the moisture control apparatus 1 according to the present embodiment can be applied to infection prevention apparatuses, bacteriostatic apparatuses, sterilization apparatuses, and sterilizers.

Furthermore, for example, the moisture control apparatus 1 according to the present embodiment can reform abrasives (polishing agents) or abrasive grains used for chemical polishing, mechanical polishing, chemical-mechanical polishing, or magnetic polishing, and thus can improve the polishing quality. For example, for the chemical-mechanical polishing, excellent bonding between abrasive grains and machining fluid (which is one type of the polishing material) and the like are achieved, whereby polishing quality is improved. The magnetic polishing using magnetic abrasive grains can be applied to curved surfaces and complex shapes. The magnetic abrasive grains are a mixture of abrasive grains and a magnetic material. The mixture can be obtained by a chemical reaction. With the moisture control apparatus 1, an excellent mixed state of the magnetic abrasive grains and the like can be achieved, whereby the quality of the magnetic polishing can be improved.

For example, the moisture control apparatus 1 can be applied to infection prevention apparatuses, bacteriostatic apparatuses, sterilization apparatuses, sterilizers, redox apparatuses, moisture activating apparatuses, anti-corruption apparatuses, germ growth prevention apparatuses, anti-drying apparatuses, taste stabilizing apparatuses, taste-improving apparatuses, taste recovery apparatuses, freshness recovery apparatuses, and the like.

The moisture control apparatus 1 is, for example, applicable to at least one field of manufacturing, distribution, logistics, warehouse, sales, engineering, construction, civil engineering, machine engineering, electric engineering, electronic engineering, communications, optics, chemistry, petrochemistry, energy, stockbreeding, agriculture, commerce, fishery, food, restaurant business, cooking, services, medicine, health, welfare, and nursing care, but is not limited to these, and is applicable to any other like fields in which target objects are handled.

Figure 18:
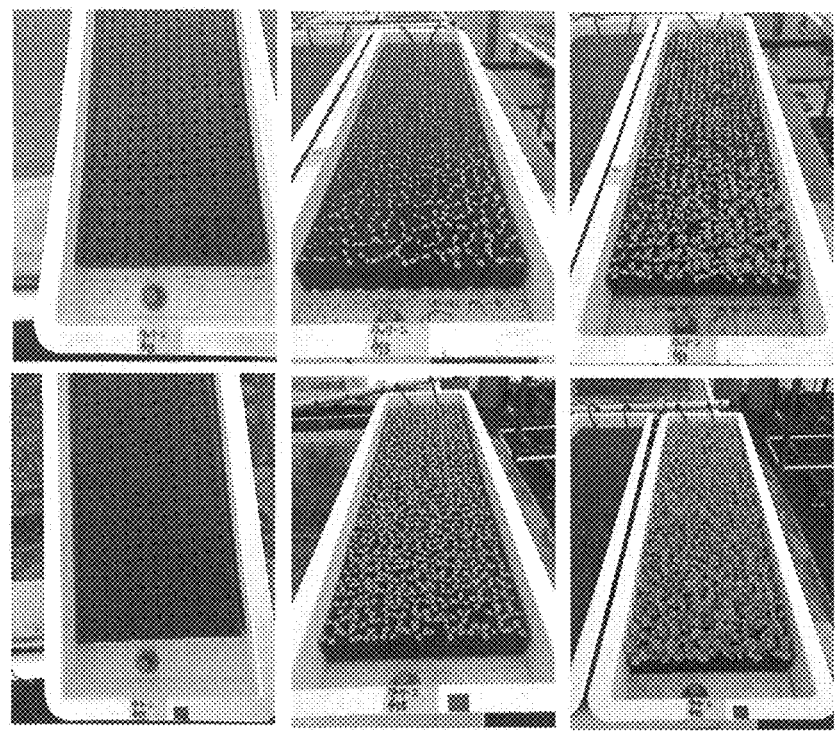
FIG. 18 illustrates results of comparison in hydroponics.

FIG. 18 illustrates results of comparison in hydroponics. The three photographs on the upper side show a conventional cultivation method, and the three photographs on the lower side show a cultivation method involving processing on water using the moisture control apparatus 1 according to the present embodiment. The photographs correspond to day 1, day 7, and day 12 in this order from the left side. The conventional cultivation method (the three photographs on the upper side in FIG. 9) resulted in the growth status of leafy vegetables varying among locations and production of algae. On the other hand, the cultivation method (the three photographs on the lower side) involving processing on water using the moisture control apparatus 1 according to the present embodiment resulted in a better growth status of leafy vegetable with the growth level uniform among locations, a higher growth rate, and a smaller amount of algae production.

Figure 19:
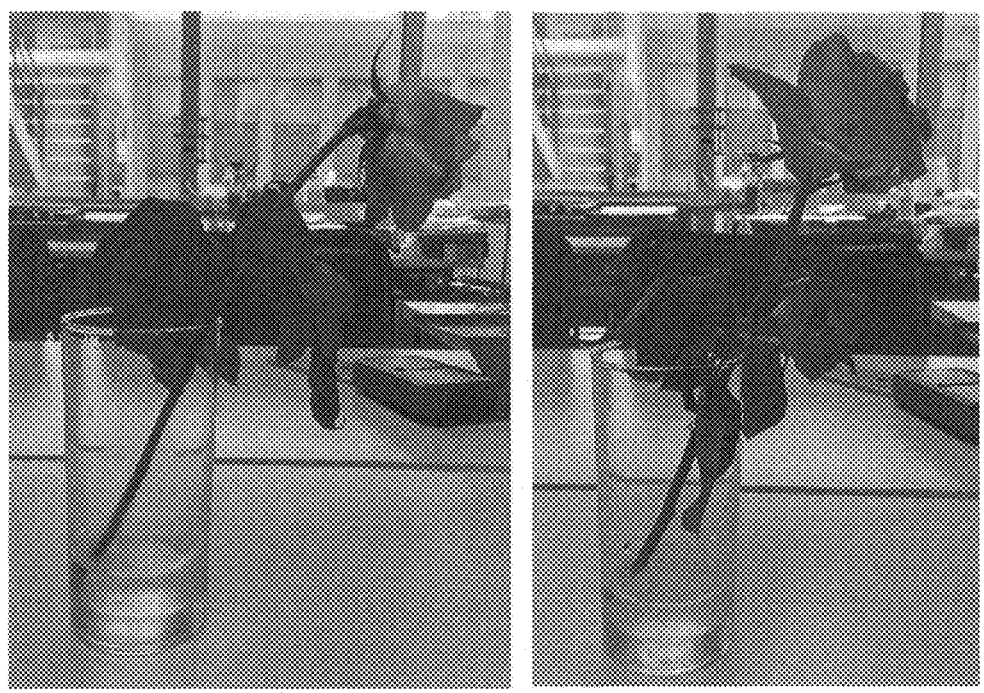
FIG. 19 illustrates a result of comparison in fresh flower preservation.

FIG. 19 illustrates a result of comparison in fresh flower preservation, and includes photographs showing day 26 from the start of the preservation. The right photograph shows a result in a case where the electrodes of the moisture control apparatus 1 according to the present embodiment are provided to apply the electromagnetic field, and the left photograph shows a result in a case where the processing is not performed. In the left photograph, the flower is withered, whereas in the right photograph, the flower is maintained in a lively state with no large change from the state at the point when the preservation has started. In FIG. 19, a rose in a blooming state is used. However, the effect can be similarly obtained for other flowers. When the preservation is implemented for a bud state, the bud state can be maintained. For example, the moisture control apparatus 1 according to the present embodiment applies an electromagnetic field in the bud state. The bud state is maintained as long as the electromagnetic field is applied, and the blooming starts at a normal rate once the power supply to the moisture control apparatus 1 is turned OFF. Thus, the flower can be preserved at its best. The electrodes can be arranged in the following manner. Specifically, a pair of flat plate electrodes may be arranged on the left and right or above and below the flower, or the flower may be placed on a pair of flat plate electrodes adjacently arranged on the same plane. When the electrodes are provided in a refrigerating warehouse for storing flowers, for example, a pair of electrodes may be arranged on the ceiling surface and a floor surface of the refrigerating warehouse, arranged on the ceiling surface and one of the wall surfaces, and on a pair of wall surfaces. The number, arrangement, and shape of the electrodes are not particularly limited. Specifically, the number of electrodes is not limited to one pair, and may be one, three or more, or two pairs or more, as can be seen in FIGS. 30 to 41 described later, for example.

The moisture control apparatus 1 according to the present embodiment may apply the electromagnetic field to a bulb and a seed to improve the germinating rate. With the moisture control apparatus 1 according to the present embodiment, the germinating rate, which is 70 to 85% under a normal condition, can be improved to about 98%. The same applies to hatchability of eggs. For example, the improvement effect can be achieved not only by directly applying the electromagnetic field using the pair of electrodes, but can also be achieved by supplying water processed by the moisture control apparatus 1 for a predetermined period of time.

The electromagnetic field may be applied with the pair of electrodes 13, 14 of the moisture control apparatus 1 according to the present embodiment installed to provide an effect of maintaining humidity in a space between the electrodes at a constant level. When the humidity is maintained at a constant level, no friction occurs, and thus a temperature maintaining effect can further be achieved. Thus, the moisture control apparatus 1 according to the present embodiment can control the temperature and the humidity of the space.

Figure 20:
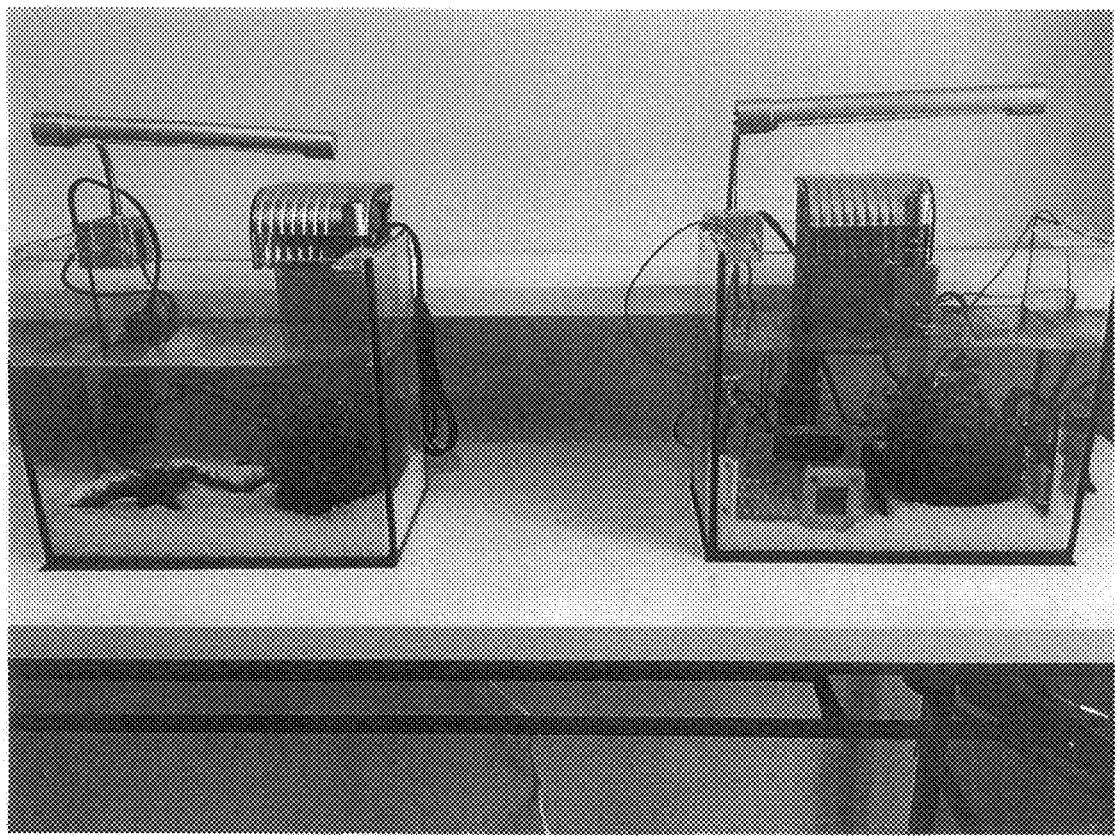
FIG. 20 illustrates results of comparison regarding antifouling effect for an aquarium.
Figure 20:
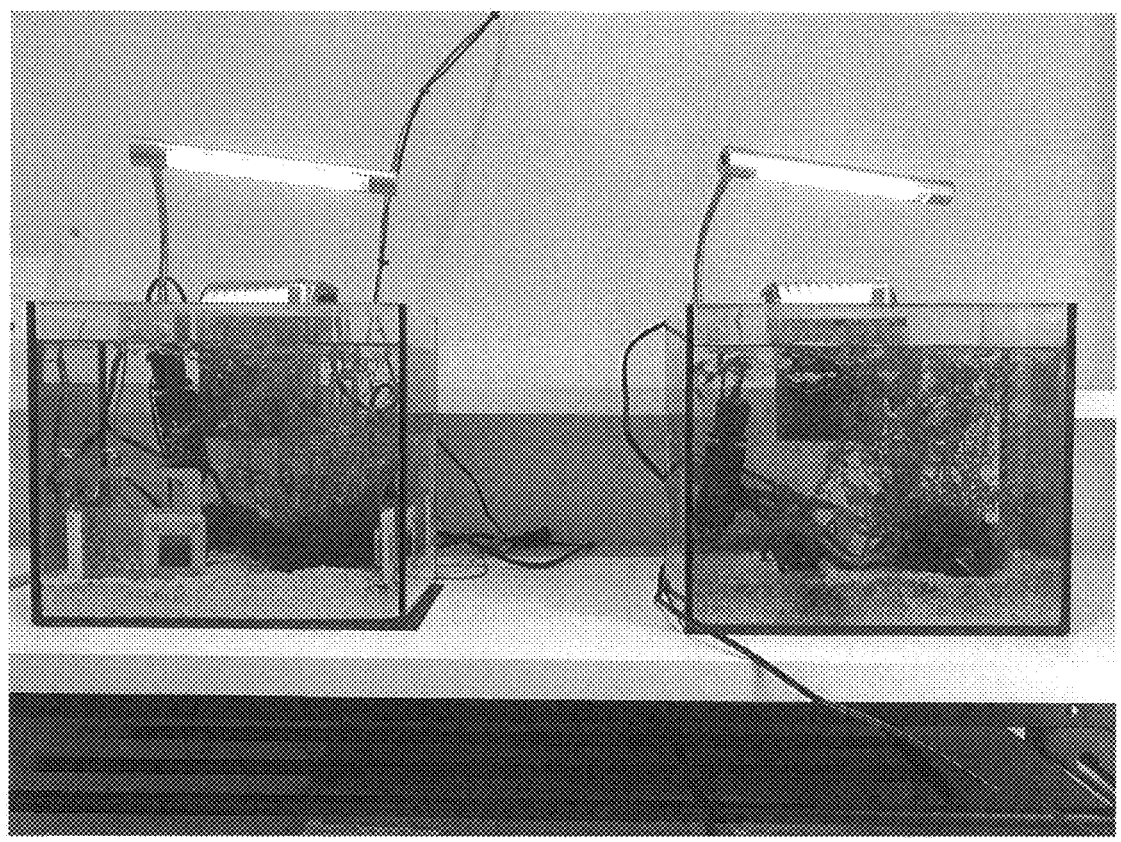

FIG. 20 illustrates results of comparison regarding antifouling effect for an aquarium. The upper photographs show states at the time of provision. The upper right photograph corresponds to an aquarium provided with the pair of electrodes 13 and 14 of the moisture control apparatus 1 according to the present embodiment, and the upper left photograph shows an unprocessed aquarium. The lower photographs show states at day 67. The lower left photograph shows the state with the pair of electrodes 13 and 14 of the moisture control apparatus 1 according to the present embodiment provided, and lower right photograph shows an unprocessed state. In the lower right photograph, contamination is obvious. On the other hand, there is almost no contamination in the lower left photograph. Note that the pair of electrodes were provided inside the water of the aquarium.

Figure 21:
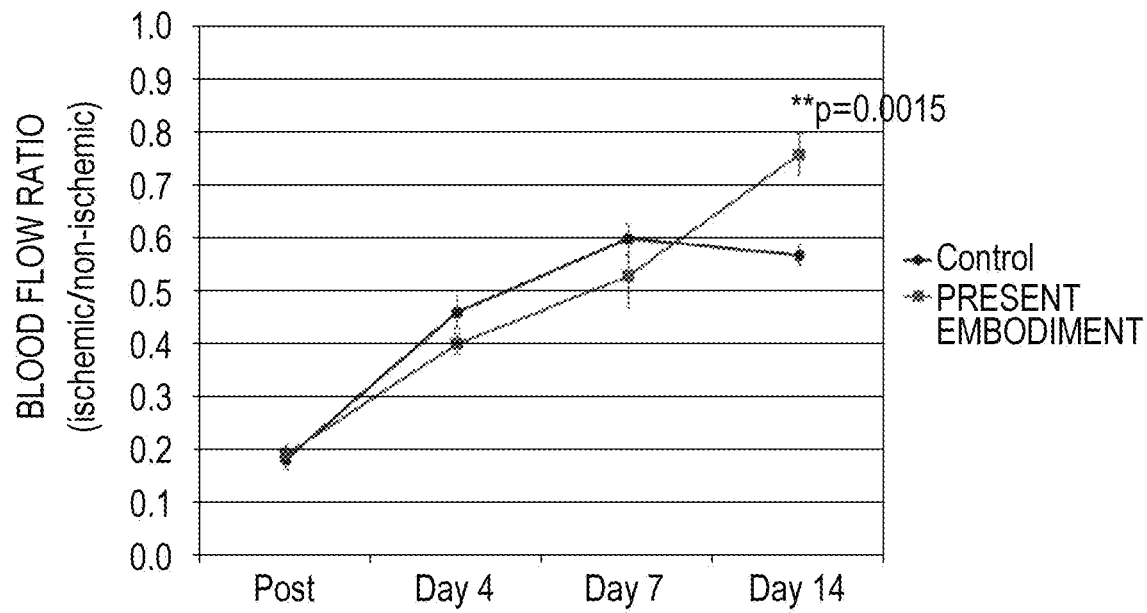
FIG. 21 is a graph showing a comparison in blood flow improvement.

FIG. 21 is a graph showing a comparison in blood flow improvement. A BALB/c male mouse that was eight-week old (at the time of model preparation) was used as a mouse lower limb ischemia model, and a lower limb ischemia mouse was prepared through the following procedure:
1) The mouse under 2%-isoflurane inhalation anesthesia was placed in the supine position.
2) The left femoral artery was exposed. The origin of the artery was ligated with silk threads.
3) A part immediately before the bifurcation of the femoral artery and the superficial epigastric artery was ligated.
4) After the ligation, the femoral artery was cut.

Mice of this model were grouped into those applied with electromagnetic waves with the electrodes of the moisture control apparatus 1 according to the present embodiment and those unprocessed, and compared with each other. The graph of blood flow ratio in FIG. 21, that is, Blood flow ratio=Blood flow of an ischemic limb/Blood flow of a normal limb, indicates that the moisture control apparatus 1 according to the present embodiment brings about advantageous effects after 14 days. For example, as examples of the electrode arrangement, a pair of electrodes can be provided on the ceiling surface and the floor surface inside the mouse cage, on a pair of facing side surfaces, or on one side surface and on the ceiling surface or the floor surface. With such an arrangement, the electrodes do not necessarily need to be fixed to the affected area, and thus the arrangement is effective for an actual treatment. The number, arrangement, and shape of the electrodes are not particularly limited. Specifically, the number of electrodes is not limited to one pair, and may be one, three or more, or two pairs or more, as can be seen in FIGS. 30 to 41 described later, for example.

Figure 22:
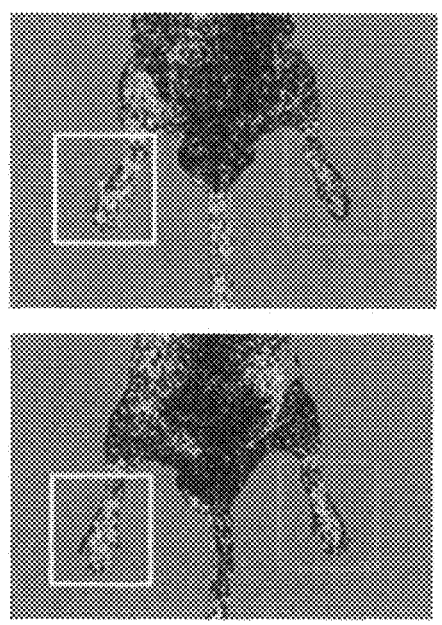
FIG. 22 includes blood flow images illustrating blood flow improvement.

FIG. 22 includes blood flow images showing blood flow improvement. FIG. 22 includes blood flow images as a result of measuring a blood flow rate in both limbs by using a blood flow imaging apparatus moor FLPI (Moor Instruments Ltd.). The lower photograph shows a model in which the electrodes of the moisture control apparatus 1 according to the present embodiment applied electromagnetic waves. The upper photograph shows an unprocessed model. The right leg was subjected to the lower limb ischemic processing, and the left leg was in the normal state. Comparison of the right leg, which was subjected to the lower limb ischemic processing, shows a wider white area in the lower photograph after 14 days, indicating improved blood flow.

Figure 23:
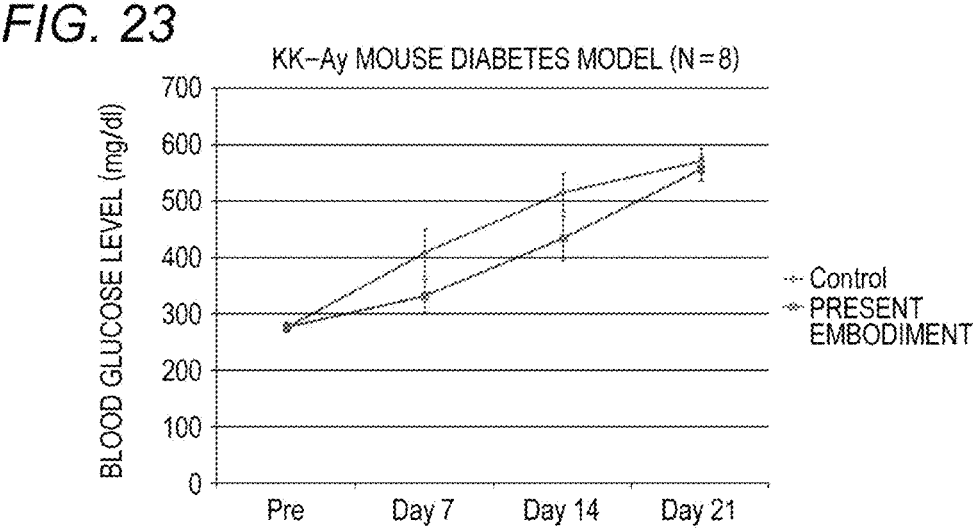
FIG. 23 is a graph showing comparison in improvement in blood glucose level for diabetes.

FIG. 23 is a comparison graph for improved blood glucose levels in diabetes. The experiment used mice, including genetically obese KK-Ay (yellow), KK (white), and normal C57BL/6J (black) female mice. The weights of KK-Ay and KK were about twice the weight of C57BL/6J and were 50 g or more. These mice are grouped into those applied with electromagnetic waves with electrodes of the moisture control apparatus 1 according to the present embodiment and those unprocessed, and compared with each other. The advantage of the moisture control apparatus 1 according to the present embodiment was found between day 7 and day 14 from the start of the test, in FIG. 23. For example, as examples of the electrode arrangement, a pair of electrodes can be provided on the ceiling surface and the floor surface inside the mouse cage, on a pair of facing side surfaces, or on one side surface and on the ceiling surface or the floor surface. With such an arrangement, the electrode does not necessarily need to be fixed to the affected area, and thus the arrangement is effective for an actual treatment. The number, arrangement, and shape of the electrodes are not particularly limited. Specifically, the number of electrodes is not limited to one pair, and may be one, three or more, or two pairs or more, as can be seen in FIGS. 30 to 41 described later, for example.

Figure 24:
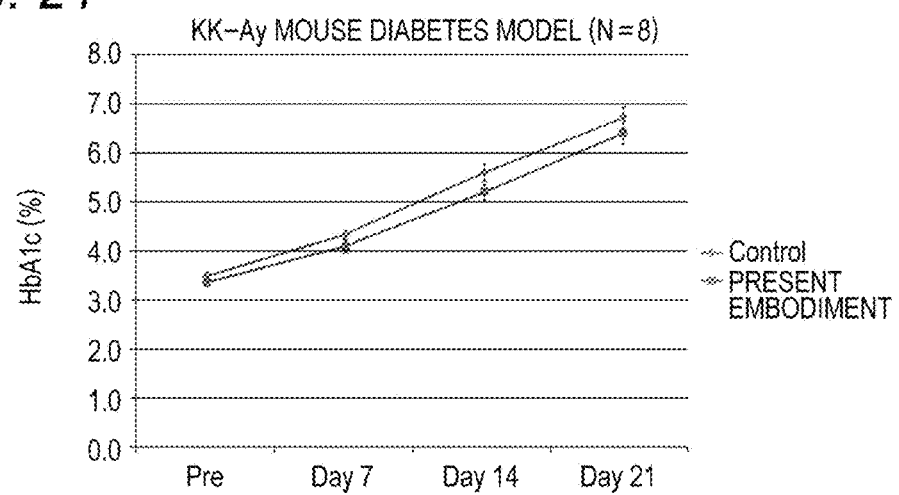
FIG. 24 is a graph showing comparison in improvement in HbA1c value for diabetes.

FIG. 24 is a graph showing comparison in improvement of HbA1c values for diabetes. Through the experiment as that in FIG. 23, comparison in improvement of the HbA1c values of mice was performed. Over the three-week investigation period, the HbA1c values obtained by using the moisture control apparatus 1 according to the present embodiment were below the values under the unprocessed condition.

With the blood flow improvement effect, the moisture control apparatus 1 according to the present embodiment is effective for improvement in symptoms of bed sores, prevention and improvement in symptoms of necrosis, and for improvement in symptoms of circulatory diseases. Furthermore, the moisture control apparatus 1 according to the present embodiment is effective for preservation of blood or blood components, improvement in symptoms of diabetes, improvement in symptoms of chronic kidney disease, improvement of dialysis, improvement in blood flow, revascularization, improvement in symptoms of peripheral neuropathy, improvement in symptoms of arthropathy or rheumatism, organ preservation, antitumor effect, improvement in symptoms of ischemia, improvement in symptoms of lymphatic edema, improvement in symptoms of bed sores, prevention or improvement of necrosis, improvement in symptoms of circulatory diseases, or infection control measures. For example, the moisture control apparatus 1 according to the present embodiment applied to the medical field is effective for dialysis, diabetes treatment, bed sore prevention, necrosis prevention, and prevention of circulatory disorder.

The moisture control apparatus 1 according to the present embodiment can be used for preservation of blood or blood components. Among the blood components, platelets can only be stored for four days, and thus blood donation is required when transfusion is required. The preservation of platelet is plagued by bacterial growth. The moisture control apparatus 1 according to the present embodiment has an anti-bacterial growth effect, and thus can be applied for the platelet preservation. Furthermore, the apparatus is not only applicable to platelets, and is also applicable to preservation of blood or blood components. The electrodes do not need to be provided for each blood container. For example, the pair of electrodes may be provided to face each other with a predetermined space for storing the blood container provided in between.

Figure 25:
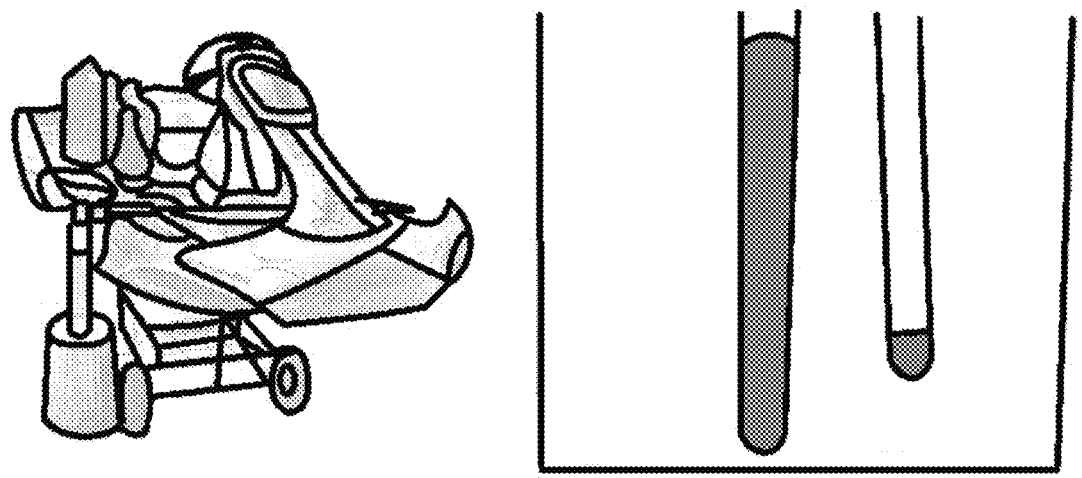
FIG. 25 illustrates a result of comparison in gasoline fuel efficiency improvement for a go-cart.

FIG. 25 illustrates a comparison result regarding gasoline fuel efficiency improvement for a go-cart. The left photograph shows the go-cart used for the experiment, and the right photograph shows a result of measuring a remaining amount of gasoline. Gasoline to which the electromagnetic field had been applied for an hour by the electrode of the moisture control apparatus 1 according to the present embodiment and the same type of gasoline unprocessed by the moisture control apparatus 1 were prepared. Each type of gasoline was supplied to the engine of the go-cart (cleaned inside), and the remaining amount of the gasoline was measured after the go-cart was idle for an hour. Results of the measurement show that the moisture control apparatus according to the present embodiment achieved a 5% increase in the fuel efficiency.

Table 12 lists results of experiment to examine the fuel consumption of an automobile. The measurement was performed using Honda L15A as the engine and using MOTEC for engine control, and under conditions of an engine speed of 2000 RPM and an oil temperature of 75° C.±5° C.

Control 1 in Item No. 1 was measured using unprocessed gasoline, with an automatic fuel adjustment function turned OFF, and in a load applied state. For Items Nos. 2 to 6, gasoline processed for 30 minutes in a plastic funnel sandwiched between flat plate electrodes was used. For Items Nos. 7 and 8, gasoline was processed for 30 minutes with a flexible electrode immersed in the gasoline. Control 2 in Item No. 9 was measured using unprocessed gasoline, with the automatic fuel adjustment function turned OFF, and in a no-load state. For Item No. 10, measurement was performed by using gasoline processed for 30 minutes in a glass container placed on parallel electrodes horizontally disposed, and with the automatic fuel adjustment function turned OFF, and in a no-load state. As can be seen in Table 12, the fuel consumption rate was improved by the moisture control apparatus 1 according to the present embodiment.

TABLE 12

| Item | Processing conditions | Fuel consumption rate (g/kWh) |
|---|---|---|
| 1 | Control 1 (with a load, automatic fuel adjustment function turned OFF) | 353.9 |
| 2 | A plastic funnel storing gasoline was sandwiched between flat plate electrodes. 0.15 Vpp, 47.57 kHz. | 341.6 |
| 3 | A plastic funnel storing gasoline was sandwiched between flat plate electrodes. 0.04 Vpp, 47 kHz. | 340.3 |
| 4 | A plastic funnel storing gasoline was sandwiched between flat plate electrodes. 0.08 Vpp, 47 kHz. | 344.6 |
| 5 | A plastic funnel storing gasoline was sandwiched between flat plate electrodes. 0.12 Vpp, 47 kHz. | 345.5 |
| 6 | A plastic funnel storing gasoline was sandwiched between flat plate electrodes. 0.3 Vpp, 47 kHz. | 346.2 |
| 7 | A flexible electrode was immersed in the gasoline. 0.03 Vpp, 47 kHz. | 345.7 |
| 8 | A flexible electrode was immersed in the gasoline. 0.15 Vpp, 47 kHz. | 345.3 |
| 9 | Control 2 (without load, automatic fuel adjustment function turned OFF) | 1680.3 |
| 10 | A glass container was placed on parallel electrodes horizontally disposed. (without load, automatic fuel adjustment function turned OFF) | 1515.8 |

Figure 26:
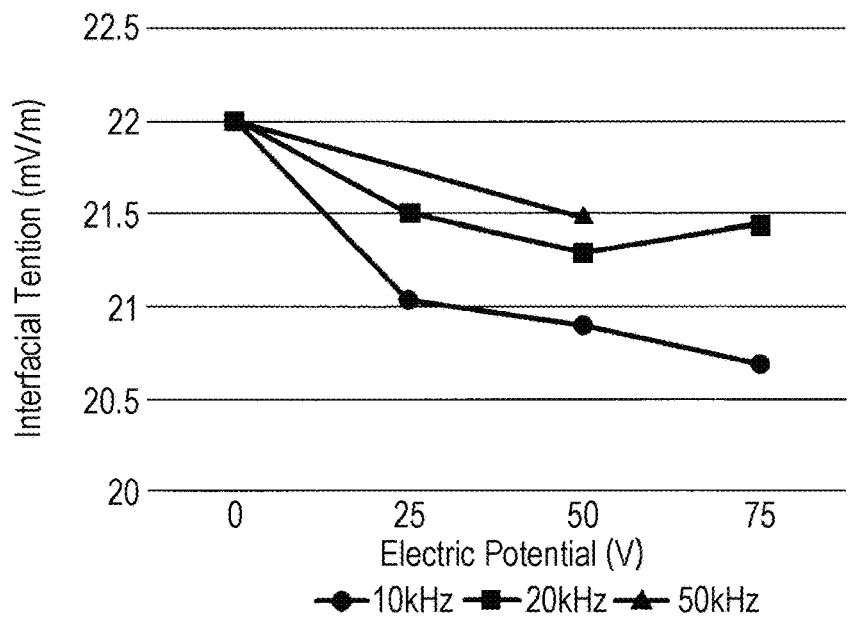
FIG. 26 is a graph of interfacial tension between cooking oil and water as a result of changing the frequency and voltage value (0 to 75 V) of the voltage applied.
Figure 27:
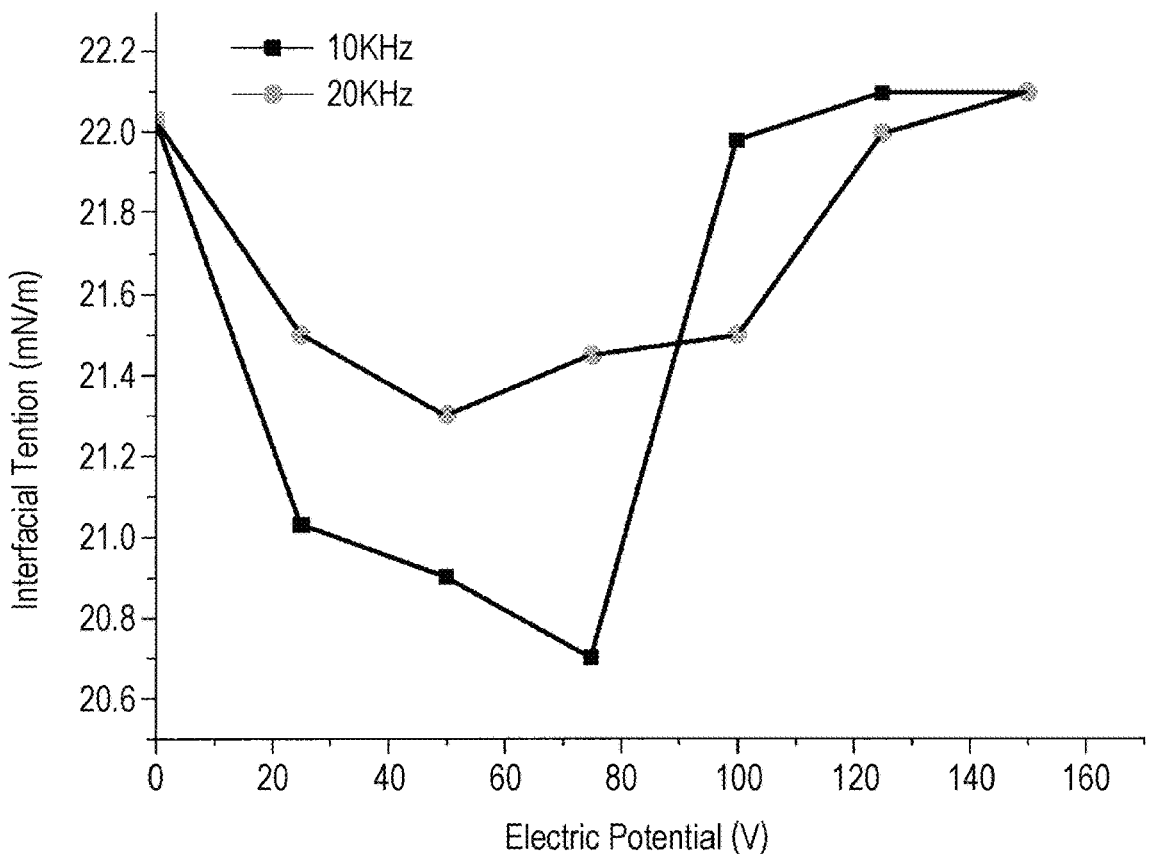
FIG. 27 is a graph of interfacial tension between cooking oil and water as a result of changing the frequency and voltage value (0 to 150 V) of the voltage applied to the electrode.

FIG. 26 and FIG. 27 are graphs showing reduction of interfacial tension between cooking oil and water achieved by the moisture control apparatus 1 according to the present embodiment. FIG. 26 is a graph of interfacial tension between cooking oil and water as a result of changing the frequency and the voltage value (0 to 75 V) of the applied voltage. FIG. 27 is a graph of interfacial tension between cooking oil and water as a result of changing the frequency and the voltage value (0 to 150 V) of the applied voltage. For FIG. 26 and FIG. 27, measurement different from that using the measurement apparatus described in the section [Reduction of interfacial tension] described above was conducted. Specifically, a pair of stainless electrodes were inserted into a container including water (lower layer) and cooking oil (upper layer) in a state of having their interfaces in contact with each other, and the interfacial tension between the cooking oil and the water was measured while applying AC voltage with various frequencies and voltage values. Face Automatic Surface Tensiometer (Kyowa Interface Science, Inc.) was used for measuring the interfacial tension. Here, a pair of flat plate electrodes were used as the electrode. However, this should not be construed in a limiting sense. For example, a curved electrode conforming to an inner wall of a cylindrical container may be used, or a flexible electrode such as stainless foil may be arranged along an inner surface of a container.

FIG. 26 is a graph showing the interfacial tension of the cooking oil and water, as a result of changing the frequency of the AC voltage applied to the electrode from 10 kHz to 50 kHz and changing the voltage from 0 V to 75 V. It can be seen in FIG. 26 that the interfacial tension between the cooking oil and water is associated with the frequency and voltage value of the AC voltage applied to the electrode. More specifically, the interfacial tension decreased with the frequency drop from 50 kHz to 20 kHz and then to 10 kHz, and increased with the increase in the voltage value from 0 V to 75 V. Thus, based on such association between the interfacial tension and the frequency and voltage value of the AC voltage, the moisture control apparatus 1 can control the interfacial tension by adjusting the applied voltage. For example, when the moisture control apparatus 1 is applied to a fryer, reduction of the interfacial tension results in the moisture contained in food turning into dispersible micro water droplets with a small particle diameter in the cooking oil upon being separated from the food as described above. Thus, even when the droplets evaporate in the heated cooking oil to be vaporized, resulting bumping is small. In such a situation, the magnitude of the bumping can be adjusted with the moisture control apparatus 1 controlling the interfacial tension. Thus, the voltage applied to the electrode can be set in accordance with various conditions of cooking using the fryer as well as various types, states, and amounts of food ingredients. Thus, even when the condition of the cooking using the fryer varies, the interfacial tension can be appropriately controlled by applying appropriate voltage to the electrode, whereby food cooked can have excellent mouthfeel and taste. This is also effective in a case where the feedback control is performed on the voltage applied to the electrode. The interfacial tension can be measured or estimated, and thus can be used as one of the control parameters.

FIG. 27 is a graph showing the interfacial tension between the cooking oil and water, as a result of changing the frequency of the AC voltage applied to the electrode from 10 kHz to 20 kHz and changing the voltage from 0 V to 160 V. FIG. 27 illustrates an example of measurement performed by a certain experiment apparatus. Of course, it is impossible to expand the measurement result to cover any kinds of measurement system. Still, the results at least indicate that the interfacial tension is associated with the frequency and the voltage value of the AC voltage applied to the electrode. The interfacial tension can be optimized by adjusting the frequency and the voltage value of the AC voltage applied to the electrode. As described above, the association between the effect of the moisture control apparatus 1 according to the present and the interfacial tension has been understood. Thus, the effect can be optimized based on the association with the interfacial tension, not only in the case of fryers, but also in cases where the present invention is applied to other targets, that is, used for cold storage, storage, and the like. The measurement of the interfacial tension described above is relatively easy. Thus, the voltage applied to the electrode can be more appropriately and more easily controlled with optimization of the moisture control apparatus 1 according to the present embodiment being analyzable based on the association with the interfacial tension.

Figure 28A:
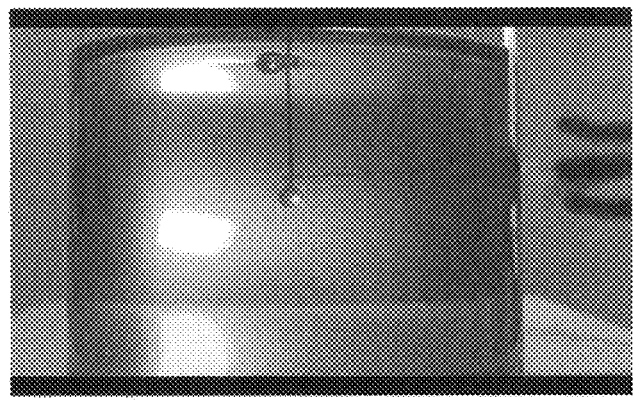
FIGS. 28A to 28C include photographs showing dropping of droplets in oil.
Figure 28B:
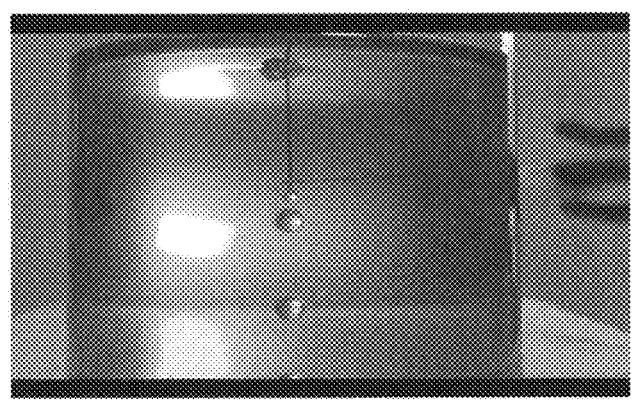
Figure 28C:
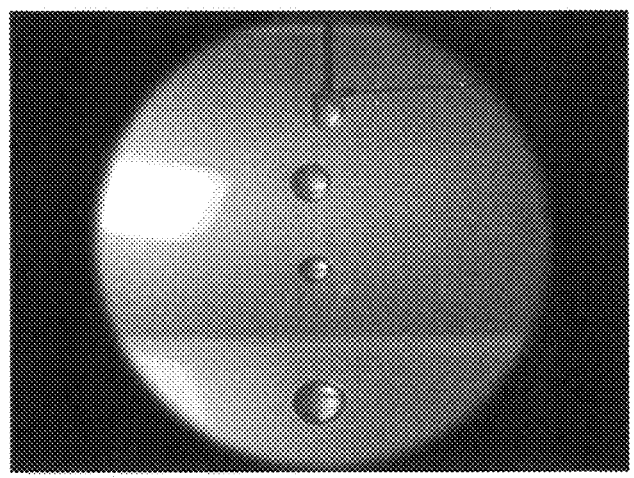

FIGS. 28A to 28C include photographs showing droplets dropping into oil. The photograph shows a state where saline is dropped into cooking oil from a thin tube (a metal straw with a diameter of 1.0 mm) with an annular electrode provided to surround an area around a tip of the thin tube, and with voltage of 100 V applied between the thin tube and the annular electrode. Without the voltage application, no droplet drops into the oil as illustrated in FIG. 28A. The voltage application leads to reduction of interfacial tension between the cooking oil and saline, resulting in droplets dropping into the oil as illustrated in FIG. 28B. FIG. 28C is an enlarged view showing the dropping state in FIG. 28B. It can be seen in FIG. 28C that fine bubbles are dispersed around the dropping droplets. The voltage application leads to the reduction of the interfacial tension, resulting in a smaller particle diameter of the droplets as well as generation of fine bubbles when the droplets drop.

Figure 29A:
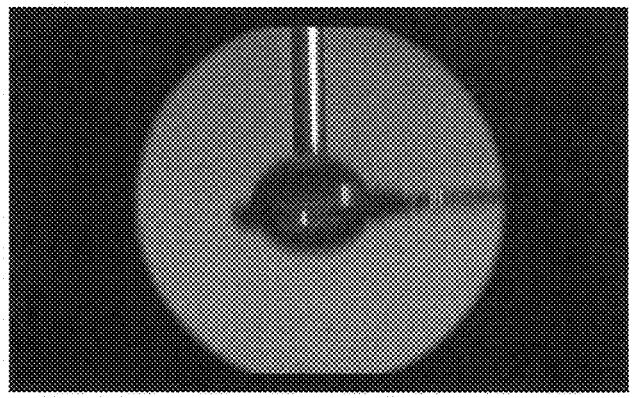
FIGS. 29A to 29C include photographs showing fine particles around droplets in oil.
Figure 29B:
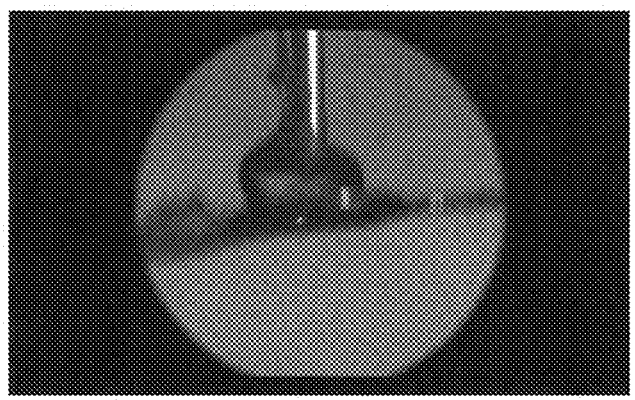
Figure 29C:
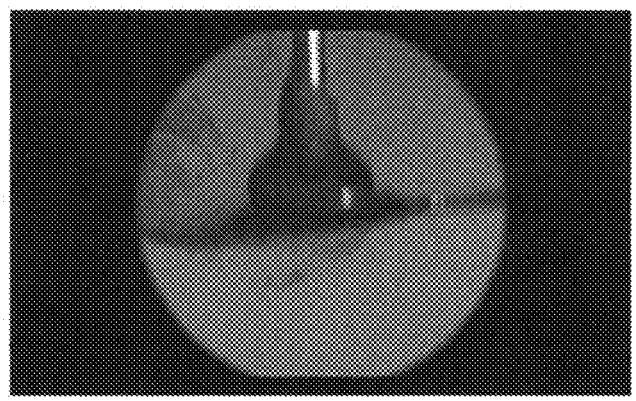

FIGS. 29A to 29C include enlarged views illustrating the experiment in FIGS. 28A to 28C. Droplets of saline drop into the cooking oil in response to the voltage application. The figure is a result of monitoring, with a high-speed camera, moment of the dropping of the droplet. FIG. 29A illustrates a state before the voltage application, FIG. 29B illustrates a state where the voltage application has started, FIG. 29C illustrates a state after the voltage application. FIG. 29A, FIG. 29B, and FIG. 29C are in a chronological order. Fine bubbles can be found as illustrated in FIG. 29B and FIG. 29C as a result of voltage application. In some parts, they cannot be clearly distinguished from gas generated from the electrode due to electrolysis.

Second Embodiment

A moisture control apparatus, a moisture control method, a program, a storage medium, a produced object, a product, an apparatus, and a facility according to a second embodiment will be described with reference to FIG. 30. FIG. 30 is a conceptual view of electrodes according to the second embodiment. For configurations that are the same as those in FIG. 1 to FIG. 29C, the same reference numerals are used and the description thereof are omitted. The moisture control apparatus according to the second embodiment is different from the moisture control apparatus according to the first embodiment in that two pairs of electrodes are provided.

A moisture control apparatus 1A includes controllers 10A and 10B as well as first electrodes 13 and 14 and second electrodes 15 and 16 as two pairs of electrodes. The controllers 10A and 10B each include an AC component voltage generation unit and a DC component voltage generation unit. In the actual circuit configuration of the controller 10, the AC component voltage generation unit and the DC component voltage generation unit may not be separately provided, and thus the circuit configuration having the functions of both units may be employed. The two controllers 10A and 10B may be configured as a single controller. The single controller may apply voltage to both of the first electrodes 13 and 14 and the second electrodes 15 and 16, as long as the first electrodes 13 and 14 and the second electrodes 15 and 16 generate similar electromagnetic waves.

The moisture control apparatus 1A is driven by the controllers 10A and 10B and an electric field is generated between the first pair of electrodes 13 and 14 and between the second pair of electrodes 15 and 16. In this case, the electrodes 13 to 16 each function as an antenna, and an electromagnetic field is generated with electromagnetic waves radiated between the first electrodes 13 and 14 and between the second electrodes 15 and 16. Thus, at least one of an electric field, a magnetic field, an electromagnetic field, and electromagnetic waves is generated between the electrodes 13 and 14 and the electrodes 15 and 16. As in the first embodiment, the electrodes 13 and 14 may also be vibrated by an electric, magnetic, or mechanical unit, so that sound waves and/or ultrasonic waves can be generated between the electrodes. With the water molecules vibrated by predetermined sound waves and/or ultrasonic waves, the water molecules can be aligned without applying voltage between the electrodes.

A processing target object is disposed between the first electrodes 13 and 14 and between the second electrodes 15 and 16. The processing target object is not particularly limited as long as the object is at least one of solid, liquid, and gas, as in the first embodiment. When the moisture control apparatus 1A according to the present embodiment is provided to a refrigerator, for example, the first electrodes 13 and 14 may be provided on side surfaces in the refrigerator, and the second electrodes 15 and 16 may be provided on the ceiling surface, the bottom surface, or the tray. FIG. 30 illustrates an example where the first electrodes 13 and 14 and the second electrodes 15 and 16 are orthogonally arranged. However, the present invention is not limited to this, and the first electrodes 13 and 14 and the second electrodes 15 and 16 may be in any arrangement as long as at least part of the electromagnetic field generated by the first electrodes 13 and 14 and the electromagnetic field generated by the second electrodes 15 and 16 acts on the processing target object.

The controllers 10A and 10B perform feedback control on at least one of the value of the current and the voltage applied to the electrode, the frequency of the current and/or the voltage, and the phase of the current and/or the voltage, based on a detection signal from an unillustrated detector. The detector includes at least one of a voltage sensor configured to detect the voltage applied to the electrode, a current sensor configured to detect the current applied to the electrode, a frequency sensor configured to detect the frequency of the voltage and/or current applied to the electrode, a magnetic field sensor configured to detect a magnetic field between the electrodes 13 and 14 and between the electrodes 15 and 16, an electric field sensor configured to detect an electric field between the electrodes 13 and 14 and between the electrodes 15 and 16, a phase detection sensor for voltage, a phase detection sensor for current, and a phase detection sensor for voltage and current.

At least one of the control target values in the controllers 10A and 10B, which is the current value, the voltage value, their frequencies, and their phases, is set in accordance with the type and/or the state of the target object. For example, the current and/or voltage applied from the controller 10A to the first electrodes 13 and 14 as well as the frequency and the phase of the current and/or voltage may be respectively the same as the current and/or voltage applied from the controller 10B to the second electrodes 15 and 16 as well as the frequency and the phase of the current and/or voltage. For example, various combinations may be employed including a combination with voltage and frequency being different therebetween, a combination with only the frequency being different, and a combination with frequency and the phase being different therebetween.

The control target value may be remotely set through an unillustrated communication device. The control parameters and/or the control amount of the controllers 10A and 10B can also be remotely controlled. Thus, the controllers 10A and 10B of a plurality of the moisture control apparatuses 1A can be collectively managed by the server 40 at a remote location, whereby the controllers 10A and 10B can be appropriately controlled. However, the control mode for the controllers 10A and 10B is not limited to the remote control from the server 40. The controllers 10A and 10B of each moisture control apparatus 1A can be individually controlled with the control target value and/or the control parameter directly set to each of the controllers 10A and 10B, for example.

FIGS. 31A, and 31B are conceptual views of electrodes according to a modification of the second embodiment. FIG. 31A illustrates an example where a single electrode is used. FIG. 31B illustrates an example where a single electrode and two electrodes facing this electrode are used. In the example described in the first embodiment, a pair of electrodes are used. In the example described in the second embodiment, two pairs of electrodes are used. However, the present invention is not limited to this and a single electrode may be used, and an odd number of electrodes such as three electrodes may be used. For example, as illustrated in FIG. 31A, the electromagnetic waves can be generated with a single electrode 17. For example, as illustrated in FIG. 31B, when three electrodes are used, two electrodes 19 and 20 may face a single electrode 18, or three electrodes may generate different types of electromagnetic waves. Thus, the number and arrangement of electrodes can be set as appropriate and are not limited.

Third Embodiment

A moisture control apparatus, a moisture control method, a program, a storage medium, a produced object, a product, an apparatus, and a facility according to a third embodiment of the present invention will be described with reference to FIGS. 32A to 33D. FIGS. 32A to 32C are diagrams illustrating waveforms obtained by using voltage at different frequencies according to the third embodiment. FIGS. 33A to 33D are diagrams illustrating waveforms obtained by using voltage in different phases according to the third embodiment. For configurations that are the same as those in FIG. 1 to FIG. 31B, the same reference numerals are used and the description thereof are omitted. A moisture control apparatus 1B according to the third embodiment is different from the moisture control apparatuses according to the first and the second embodiments in that a pair of electrodes are different from each other in the electromagnetic waves they generate.

In FIGS. 32A to 32C, an electrode 21A that is one of a pair of electrodes 21A and 21B generates electromagnetic waves (P wave) at a frequency of 50 kHz and the other electrode 21B generates electromagnetic waves (Q wave) at a frequency of 47 kHz. The P wave and the Q wave are represented by the following formulae corresponding to a position where both waves are V(t)=0 at time t=0 (the position just in the middle of the electrodes 21A and 21B, for example). In the formulae, A represents the amplitude of the electromagnetic waves.

$P$ wave: $V(t)=A \sin(2\pi f_1 t), f_1=50$ kHz $Q$ wave: $V(t)=A \sin(2\pi f_2 t), f_2=47$ kHz Thus, the electromagnetic wave that is the sum of the P and Q waves are applied between the pair of electrodes 21A and 21B as illustrated in FIG. 32C.

In FIG. 33A and FIG. 33B, an electrode 22A that is one of a pair of electrodes 22A and 22B generates electromagnetic waves (P wave) at a frequency of 50 kHz and the other electrode 22B generates electromagnetic waves (Q wave) at a frequency of 30 kHz. Phases $\alpha$ of the waveforms match ($\alpha$=0). The P wave and the Q wave are represented by the following formulae corresponding to a position where both waves are V(t)=0 at time t=0 (the position just in the middle of the electrodes 21A and 21B, for example). In the formulae, A represents the amplitude of the electromagnetic waves.

$$P \text{ wave}: V(t)=A \sin(2\pi f_1 t), f_1=50 \text{ kHz}$$

$$Q \text{ wave}: V(t)=A \sin(2\pi f_2 t), f_2=30 \text{ kHz}$$

Thus, the electromagnetic wave that is the sum of the P and Q waves are applied between the pair of electrodes 22A and 22B as in FIG. 33B.

In FIG. 33C and FIG. 33D, an electrode 23A that is one of a pair of electrodes 23A and 23B generates electromagnetic waves (P wave) at a frequency of 50 kHz and with a phase α=0 and the other electrode 23B generates electromagnetic waves (Q wave) at a frequency of 30 kHz and with a phase α=π/2. Thus, the phases of the waveforms are set to π/2. The P wave and the Q wave are represented by the following formulae corresponding to a position where both waves are V(t)=0 at time t=0 (the position just in the middle of the electrodes 21A and 21B, for example). In the formulae, A represents the amplitude of the electromagnetic waves.

$$P \text{ wave}: V(t)=A \sin(2\pi f_1 t), f_1=50 \text{ kHz}$$

$$Q \text{ wave}: V(t)=A \sin(2\pi f_2 t+\pi/2), f_2=30 \text{ kHz}$$

Thus, the electromagnetic wave that is the sum of the P and Q waves are applied between the pair of electrodes 23A and 23B as in FIG. 33D.

In FIGS. 32A to 32C, 33A, and 33B, the electrodes generate electromagnetic waves at different frequencies. In FIGS. 33C and 33D, the electrodes generate electromagnetic waves at different frequencies and with different phases. However, the present invention is not limited to these. For example, peak-to-peak voltage of the electromagnetic waves can be adjusted by adjusting the AC component voltage applied to the electrodes. The DC component voltage as offset voltage for the AC component voltage may be applied by adjusting the DC component voltage applied to the electrodes. The DC component voltage applied may be different between the electrodes. Furthermore, the AC component voltages applied to the electrodes may be different from each other in the peak-to-peak voltage value, frequency, and phase.

Fourth Embodiment

Figure 34:
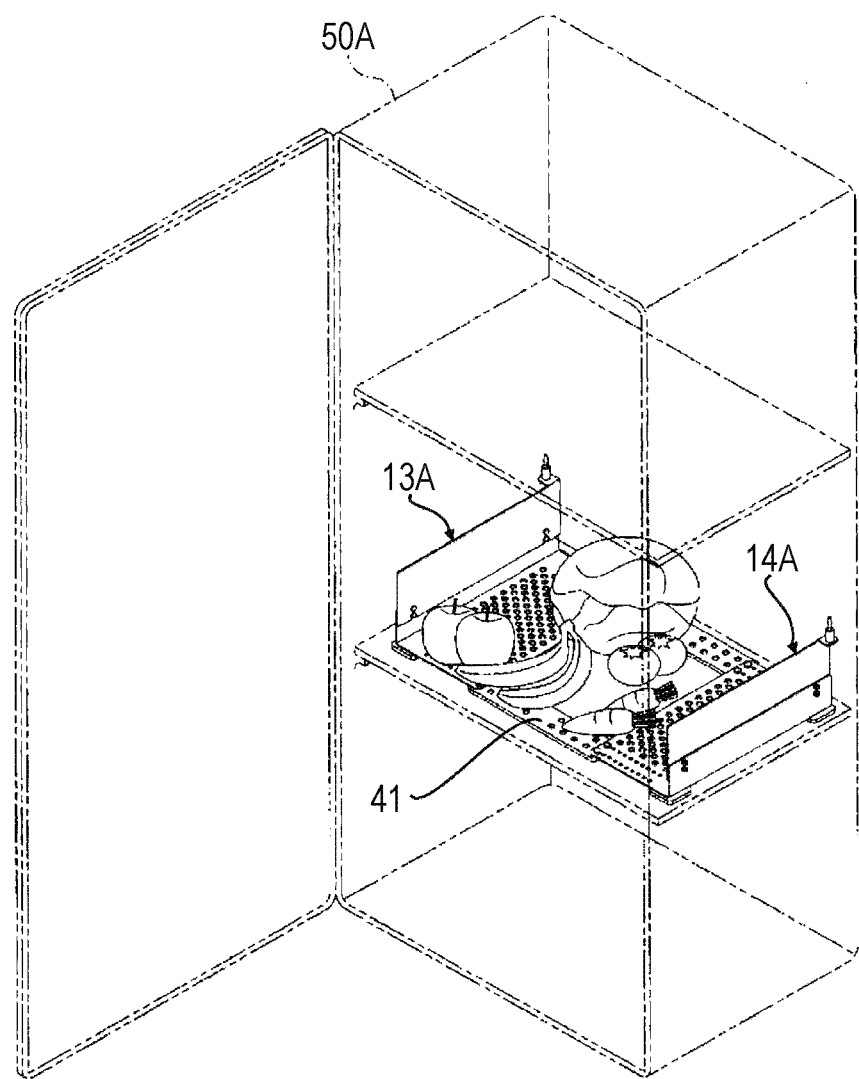
FIG. 34 illustrates an example where electrodes 13 and 14 according to a fourth embodiment are provided to a refrigerator.
Figure 35:
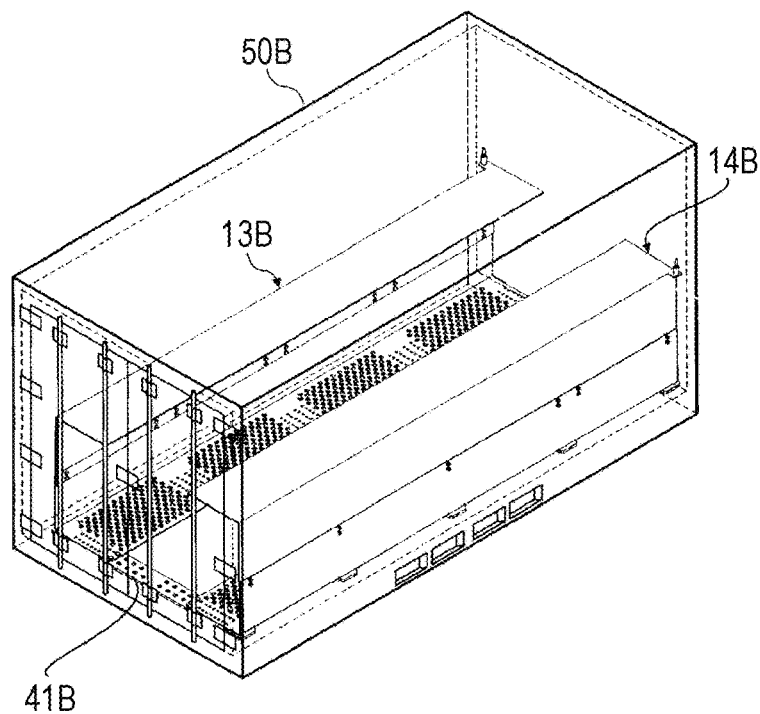
FIG. 35 illustrates an example where the electrodes 13 and 14 according to the fourth embodiment are provided to a container.
Figure 36:
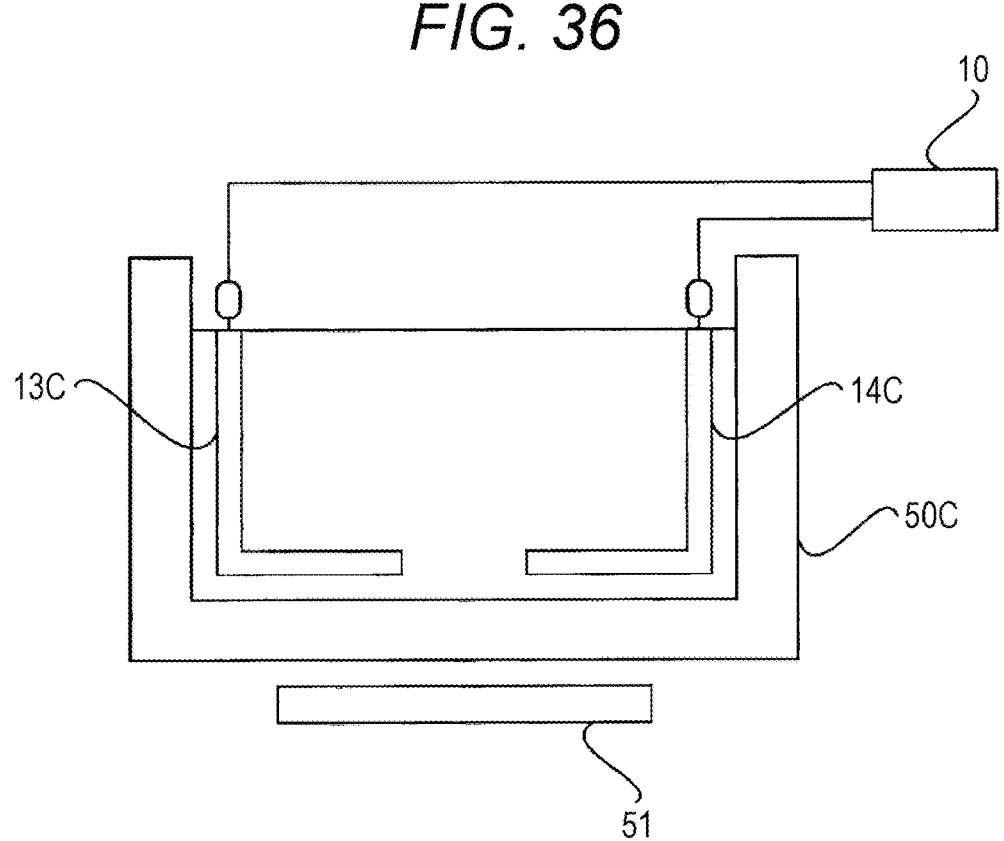
FIG. 36 illustrates an example where the electrodes 13 and 14 according to the fourth embodiment are provided to an existing fryer.

A moisture control apparatus, a moisture control method, a program, a storage medium, a produced object, a product, an apparatus, and a facility according to a fourth embodiment of the present invention will be described with reference to FIG. 34 to FIG. 41. FIG. 34 illustrates an example where electrodes 13A and 14A are provided to an existing refrigerator. FIG. 35 illustrates an example where the electrodes 13B and 14B are provided to an existing container. FIG. 36 illustrates an example where the electrodes 13C and 14C are provided to an existing fryer. For configurations that are the same as those in FIG. 1 to FIG. 33D, the same reference numerals are used and the description thereof are omitted. In the moisture control apparatus according to the fourth embodiment, the electrodes 13 and 14 are specifically arranged by way of example. The configurations of the electrodes 13 and 14 are the same as those in the first to the third embodiments.

In FIG. 34, the electrodes 13A and 14A are provided to an existing refrigerator. The electrodes 13A and 14A provided to the refrigerator serving as a housing 50A are formed of conductive plate members (for example, copper, iron, stainless steel, or aluminum) having a substantially L-shaped cross section, and have a plurality of holes (for example, polygonal such as hexagonal holes or circular holes) on bottom plates, although the electrodes are not limited to these. The electrodes 13A and 14A are connected to each other via a connector 41. For example, the connector 41 is a substantially rectangular thin plate made of an insulating material such as fluorine resin such as polytetrafluoroethylene (Teflon (registered trademark), for example). The refrigerator serving as the housing 50A includes various types of refrigerators such as a household refrigerator and a large commercial refrigerator.

The shape of the electrode is not limited to the substantially L shape, and may be a flat plate shape or a thin film shape, for example. In such a case, the electrodes 13A and 14A may be provided on inner walls of the refrigerator serving as the housing 50A to face each other. Alternatively, the electrodes 13A and 14A may be arranged to face the ceiling surface, the floor surface, or a tray. Alternatively, the electrodes 13A and 14A may each be provided to the door-side surface and the back-side surface. The number of electrodes may be any number of at least 1, and may be 2, 4, or 6, for example.

When the electrodes 13A and 14A provided to the refrigerator serving as the housing 50A apply electromagnetic fields to food inside the refrigerator, the water particles as moisture such as free water contained in the food are attracted to each other to be in the pearl-chain structure. The water molecules thus regularly arranged do not bond with other components while being held in the object, whereby a food product can be maintained to be in a fresh and moist state.

In FIG. 35, electrodes 13B and 14B are provided to an existing container. The electrodes provided to the container serving as a housing 50B are formed of conductive plate members (for example, copper, iron, stainless steel, or aluminum) having a substantially L-shaped cross section, and have a plurality of holes (for example, polygonal such as hexagonal holes or circular holes) on bottom plates, although the electrodes are not limited to these. The electrodes 13B and 14B are connected to each other via a connector 41B if necessary. For example, the connector 41B is a substantially rectangular thin plate made of an insulating material such as fluorine resin such as polytetrafluoroethylene (Teflon (registered trademark), for example). The container serving as the housing 50B, illustrated to be a relatively large container in FIG. 35, includes various types of container such as a small portable container and a large cargo container.

The shape of the electrode is not limited to the substantially L shape, and may be a flat plate shape or a thin film shape, for example. In such a case, the electrodes 13B and 14B may be provided on inner walls of the refrigerator serving as the housing 50B to face each other. Alternatively, the electrodes 13B and 14B may be arranged to face the ceiling surface, the floor surface, or a tray. Alternatively, the electrodes 13B and 14B may each be provided to the door-side surface and the back-side surface. The number of electrodes may be any number of at least 1, and may be 2, 4, or 6, for example.

When the electrodes 13B and 14B provided to the container serving as the housing 50B apply electromagnetic fields to food inside the container, the water particles as moisture such as free water contained in the food are attracted to each other to be in the pearl-chain structure. The water molecules thus regularly arranged do not bond with other components while being held in the object, whereby a food product can be maintained to be in a fresh and moist state. The container provided with the electrodes 13B and 14B may be provided in a refrigerating warehouse, a freezer warehouse, a freshness maintaining warehouse, or the like to be managed within a predetermined storage temperature range. Furthermore, the container provided with the electrodes 13B and 14B can maintain freshness of the food product, while being provided in a warehouse without a special freshness maintaining function.

In FIG. 36, electrodes 13C and 14C are provided in an oil tank of an existing fryer (housing 50C). The electrodes 13C and 14C provided to the fryer serving as the housing 50C are formed of conductive plate members (for example, copper, iron, stainless steel, or aluminum) having a substantially L-shaped cross section, and have a plurality of holes (for example, polygonal such as hexagonal holes or circular holes) on bottom plates, although the electrodes are not limited to these. The electrodes 13C and 14C have bottom surfaces provided along the bottom surface of the oil tank of the fryer. A heating unit 51 is provided on the outer side of the oil tank of the fryer, that is, on the outer side of the bottom surface of the oil tank in the example illustrated in FIG. 36. The electrodes 13C and 14C are each electrically connected to the controller 10, and the controller 10 applies the output voltage to the electrodes 13C and 14C.

When the electrodes 13C and 14C applies the electromagnetic field into the oil tank of the fryer, the interfacial tension of the oil/water interface is reduced, and the free water contained in the food is in the pearl-chain structure due to the electromagnetic field applied, so that the moisture is less likely to be separated from the food. With the moisture contained in the food thus controlled to suppress bumping, an effect of suppressing entrance of oil into the food can be obtained. Furthermore, with this effect, the food cooked can have superb mouthfeel and taste.

In the example described in the fourth embodiment, voltage and/or current is constantly applied to the electrodes 13 and 14. However, the present invention is not limited to this. The voltage and/or current may be applied only at a predetermined timing or only for a predetermined period of time, instead of being constantly applied, to the electrodes 13 and 14 in the housing 50 in which the object is placed. When the housing 50A is a refrigerator, for example, the freshness of food in the refrigerator can be constantly maintained with an electromagnetic field application pattern repeating: applying the electromagnetic field to the food in the refrigerator from the electrodes 13A and 14A for an hour; applying no voltage and/or current to the electrodes 13A and 14A for 47 hours; and applying the electromagnetic field to the food in the refrigerator for another hour. Accordingly, the power consumption can be reduced. This is assumed to be the effect that application of the electromagnetic field to the food in the refrigerator by the electrodes 13A and 14A for about an hour results in water particles as moisture such as free water contained in the food being attracted to each other to be in the pearl-chain structure, which is to be maintained thereafter for a predetermined period of time without the electromagnetic field. The time during which the electromagnetic field is applied to food in the refrigerator by the electrodes 13A and 14A and the time during which no voltage and/or current is applied to the electrodes 13A and 14A thereafter can be set as appropriate based on the type and the state of the food in the refrigerator, storage temperature/humidity, and the like. A period during which the electromagnetic field is applied may be set at a timing when a new food product is placed in the refrigerator. The placement of the new food product in the refrigerator can be detected by a camera inside the refrigerator or opening/closing of the door.

Also in the example where the housing 50B is a container, when the electrodes 13B and 14B apply the electromagnetic field to food in the container for about an hour, water particles as moisture such as free water contained in the food are attracted to each to be in the pearl-chain structure. Once the pearl-chain structure of the water molecules is achieved, this state is maintained for a predetermined period of time even in a state where the electromagnetic field is no longer applied. Thus, by repeating the period during which the electromagnetic field is applied to the food in the container by the electrodes 13B and 14B, a predetermined period during which no electromagnetic field is applied, and again the period during which the electromagnetic field is applied, the freshness can be maintained with a reduced power consumption. When the power supply is a battery in particular, this reduced power consumption results in a longer freshness maintained period per charging. The electromagnetic field application period is not limited to an hour, and the no electromagnetic field application period can also be set as appropriate. These periods can be adjusted as appropriate based on the type and the state of the food in the container, storage temperature/humidity of the container, and the like. A period during which the electromagnetic field is applied to an object in the container may be set at a timing when a new food product is placed in the container. The placement of a new object in the container can be detected by, for example, a camera in the container, a signal from the man-machine interface 31, information in a management database of a warehouse storing the container, and the like, for example.

For example, also in an example where the housing 50C is a fryer, the electromagnetic field does not need to be constantly applied into the oil tank of the fryer from the electrodes 13C and 14C. After a period during which the electromagnetic field is applied into the oil tank of the fryer from the electrodes 13C and 14C, a predetermined period during which no electromagnetic field is applied may be provided, followed by the period during which the electromagnetic field is applied again. Also in this case, the effects that the moisture contained in the food is controlled to suppress bumping to suppressed penetration of oil into the food and that the cooked food thus can have superb mouthfeel and taste can be maintained. The period during which the electromagnetic field is applied to the oil tank of the fryer and the period during which no electromagnetic field is applied can be set as appropriate based on the food cooked, the type of the oil, the temperature of the oil, and the like.

Figure 37A:
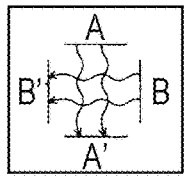
FIGS. 37A to 37D illustrate another embodiment of the electrode.
Figure 37A:
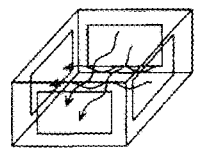
Figure 37B:
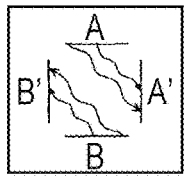
Figure 37B:
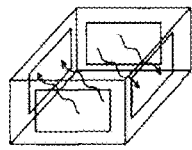
Figure 37C:
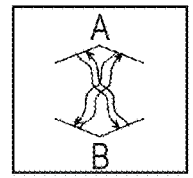
Figure 37C:
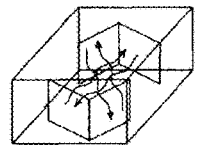
Figure 37D:
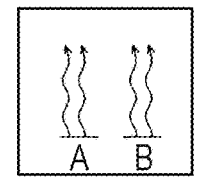
Figure 37D:
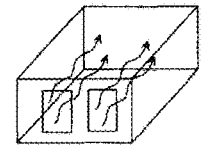

FIG. 37A to FIG. 41 illustrate examples of electrodes with various shapes. The shape, the arrangement, and the voltage application pattern of the electrodes according to the present embodiment are not limited to those in FIG. 1 to FIG. 41, and include modifications other than these and combinations of various embodiments. FIGS. 37A to 37D illustrate an alternative embodiment of the shape, arrangement, and voltage application pattern of two pairs of electrodes A, A', B, and B' or a pair of electrodes A and B. In FIG. 37A, voltage is applied to each of the pair of flat plate electrodes A and A' facing each other and the pair of flat plate electrodes B and B' facing each other. In FIG. 37B, voltage is applied to each of the pair of flat plate electrodes A and A' provided on adjacent surfaces and the pair of flat plate electrodes B and B' provided on adjacent surfaces. In FIG. 37C, voltage is applied to bent electrodes A and B facing each other. In FIG. 37D, a flat plate electrode A and a flat plate electrode B are provided side by side on one side, and voltage is applied to the flat plate electrode A and the flat plate electrode B.

Figure 38A:
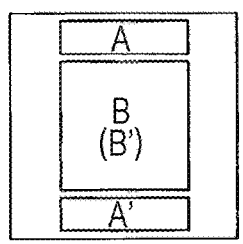
FIGS. 38A to 38C illustrate another embodiment of the electrode.
Figure 38A:
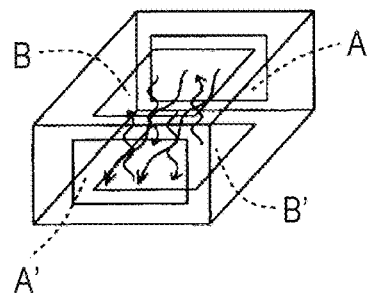
Figure 38B:
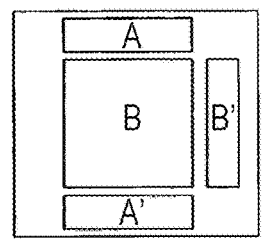
Figure 38B:
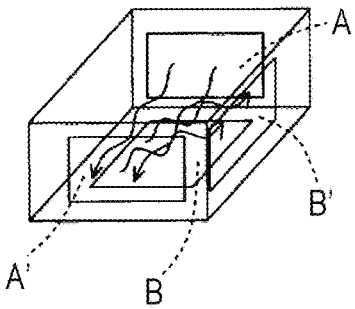
Figure 38C:
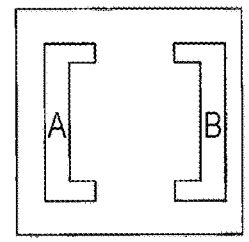
Figure 38C:
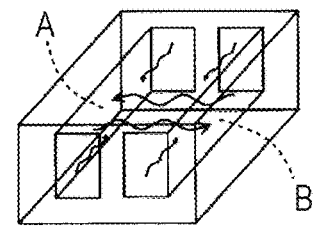

FIGS. 38A to 38C illustrates yet another embodiment of the shape, arrangement, and voltage application pattern of two pairs of electrodes A, A', B, and B' or a pair of electrodes A and B. In FIG. 38A, voltage is applied to each of a pair of flat plate electrodes A and A' facing each other and flat plate electrodes B and B' facing each other. In FIG. 38B, voltage is applied to each of a pair of flat plate electrodes A and A' facing each other and a pair of flat plate electrodes B and B' provided on adjacent surfaces. In FIG. 38C, voltage is applied to square U-shaped electrodes A and B facing each other.

Figure 39A:
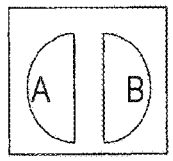
FIGS. 39A to 39D illustrate another embodiment of the electrode.
Figure 39A:
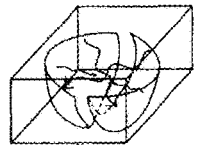
Figure 39B:
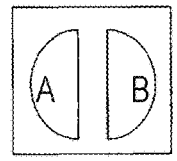
Figure 39B:
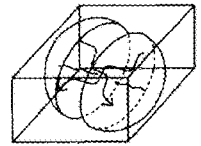
Figure 39C:
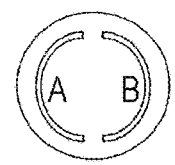
Figure 39C:
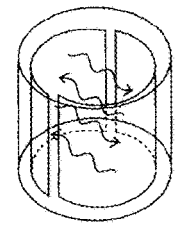
Figure 39D:
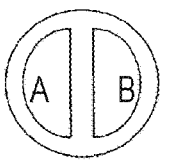
Figure 39D:
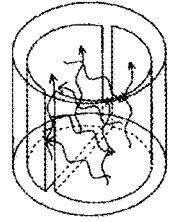

FIGS. 39A to 39D illustrate yet still another embodiment of shapes, arrangements, and voltage application patterns of a pair of curved electrodes A and B. In FIG. 39A, voltage is applied to electrodes A and B with a shape obtained by cutting a hemisphere in half. In FIG. 39B, voltage is applied to hemispherical electrodes A and B facing each other. In FIG. 39C, voltage is applied to a pair of electrodes A and B with shapes obtained by cutting a cylinder in half along the height direction. In FIG. 39D, voltage is applied to a pair of electrodes A and B with shapes obtained by cutting a bottomed cylinder in half along the height direction.

Figure 40:
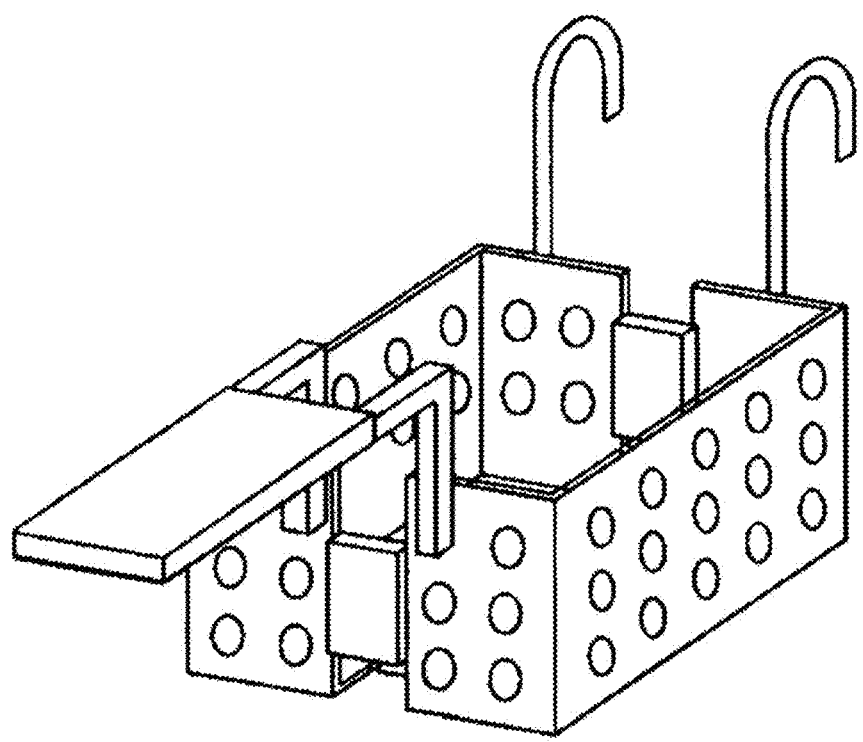
FIG. 40 illustrates another embodiment of the electrode.
Figure 41:
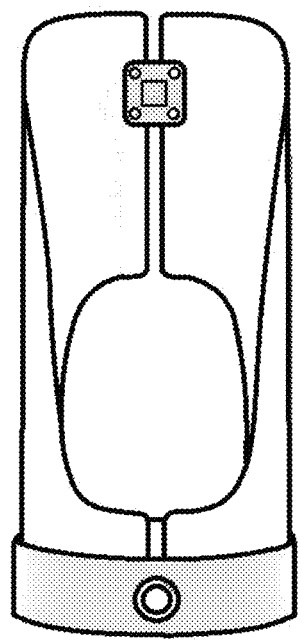
FIG. 41 illustrates another embodiment of the electrode.

FIG. 40 illustrates an electrode used for a fryer. The electrode is divided in two in the width direction, and the electrodes divided are integrated while being electrically insulated from each other. Voltage is applied between this pair of electrodes. In FIG. 41, the pair of electrodes that have a shape along a cylindrical shape and have a plurality of notches forming a mesh are provided on a base member (a black portion on the bottom surface) while being insulated from each other. Voltage is applied between this pair of electrodes.

Fifth Embodiment

Figure 42:
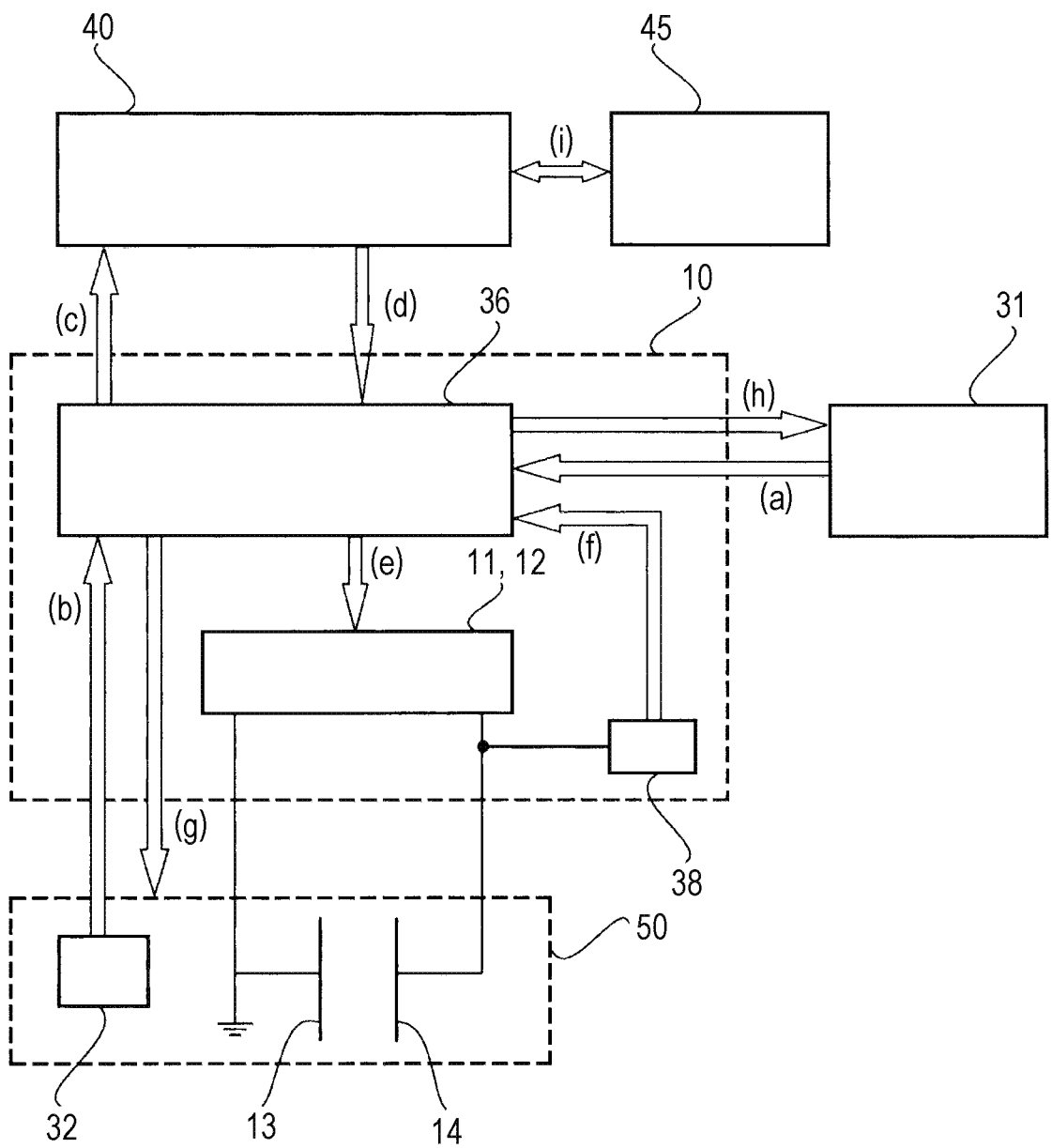
FIG. 42 is a block diagram illustrating a moisture control apparatus 1 according to a fifth embodiment.

A moisture control apparatus, a moisture control method, a program, a storage medium, a produced object, a product, an apparatus, and a facility according to a fifth embodiment of the present invention will be described with reference to FIG. 42. FIG. 42 is a block diagram of the moisture control apparatus 1. For configurations that are the same as those in FIG. 1 to FIG. 41, the same reference numerals are used and the description thereof are omitted.

FIG. 42 is a block diagram corresponding to FIG. 1. Note that the communication unit 35, the storage unit 37, the external power supply 39, and the like are omitted. Specifically, although the CPU 36 actually communicates with a server and the like via the communication unit 35, inputs and outputs data to and from the storage unit 37, and receives power from the external power supply 39, these operations are omitted in FIG. 42. In FIG. 1, the controller 10 is illustrated to be outside the housing 50. However, this should not be construed in a limiting sense, and the controller 10 may be provided inside the housing 50.

Flows (a) to (h) in FIG. 42 will be described in this order. In the flow (a), settings of the controller 10 are input through an input on the man-machine interface 31. The settings include a setting on ON/OFF and an operation mode of the controller 10, a type and/or a state of an object, output voltage and/or output current of the AC component voltage generation unit 11 and the DC component voltage generation unit 12, and the like. Examples of the operation mode include an automatic mode, an object input mode, a manual setting mode, and the like. For example, in the automatic mode, the controller 10 is automatically controlled so that an appropriate state of the object is achieved based on a detection signal from the object detection sensor 32, a detection signal from the detector 38, and a control parameter and/or a control value from the server 40, as described later. In the object input mode, for example, the controller is appropriately controlled based on the object, with the type and/or the state of the object input through the man-machine interface 31. In the manual setting mode, for example, the output voltage and/or output current of the AC component voltage generation unit 11 and the DC component voltage generation unit 12 is manually set. The following description is given assuming that the automatic mode is set, for example, unless stated otherwise. In the flow (a), when the housing 50 further has an automatic adjustment function, a housing setting value for the housing 50 may be able to be input through the man-machine interface 31.

In the flow (b), information about an object is collected from the object detection sensor 32 in response to an instruction from the CPU 36. In the example where the housing 50 is a refrigerator, the information about an object collected by the object detection sensor 32 includes an image from a camera in the refrigerator, a detection signal related to moisture in a food product from a moisture amount sensor, a detection signal from a temperature sensor and/or a humidity sensor (including a detection signal from a sensor built in the refrigerator), and the like. In the example where the housing 50 is a container, the information about an object collected by the object detection sensor 32 includes an image from a camera in the container, a detection signal from a temperature sensor and/or a humidity sensor in the container, a signal from a GPS provided to the container (the GPS may be provided to the controller 10), and the like. In the example where the housing 50 is a fryer, the information about an object collected by the object detection sensor 32 includes an image from a camera capturing an image of a food product cooked, a detection signal related to the moisture of the food product from a moisture amount sensor, a detection signal related to the temperature of the food product, a detection signal related to the temperature of the oil of the fryer, information about the type of the oil of the fryer, information indicating a replacement timing of the oil of the fryer, and the like.

In the flow (c), the information about the object collected by the object detection sensor 32 in response to an instruction from the CPU 36 is transmitted to the server 40 via the communication unit 35. When the setting input in the flow (a) is the object input mode, for example, information about the type and the state of the object input through the man-machine interface 31 is transmitted to the server 40, for example.

When the setting input in the flow (a) is the manual setting mode, for example, the information about the output voltage and/or output current of the AC component voltage generation unit 11 and the DC component voltage generation unit 12 is transmitted to the server 40. Then, after predetermined correction is performed in the server 40, a predetermined control parameter and a control value may be transmitted from the server 40 to the CPU 36. For example, the output voltage and/or output current of the AC component voltage generation unit 11 and the DC component voltage generation unit 12 manually set for the information collection in the server 40, may be transmitted to the server 40, and the CPU 36 may calculate the control value. For example, when the correction of the control value or the information collection are not required in the server 40, the information about the output voltage and/or output current does not need to be transmitted to the server 40 in the flow (c).

In the server 40, a control parameter and/or a control value suitable for the type and the state of the object is calculated. When calculating the control parameter and/or the control value, the server 40 may refer to information other than the type and the state of the object by communicating with an external server and a database 45. The other information includes season, weather, weather forecast, date and time, location, supply and demand forecast, warehousing and storage status of a refrigerator, a transport path of a container and traffic condition thereof, a status of a group of containers related to the container, inventory control information, store congestion, economic indicators, information on the Web, and the like.

Among information about the object collected by the object detection sensor 32, the image from the camera enables the type and the state of the object to be determined by image recognition in the server 40. For this image recognition, AI using deep learning can be used, for example, so that the type and the state of the object can be accurately recognized. Specifically, the type and the state of the object can be accurately recognized based on the image from the camera, by using a neural network trained by the image of a food product from the camera and data about the actual type and the state of the food product. The server can communicate with another controller 10 to accumulate a large amount of image recognition data, whereby the image recognition accuracy for various objects can be increased. When the controller 10 includes an AI program, the CPU 36 may perform the image recognition, and transmit the result of the image recognition to the server 40 in the flow (c). When the image recognition is thus performed by the controller 10, the communication amount of data transmission in the flow (c) can be reduced.

In the flow (d), the control parameter and/or the control value calculated in the server 40 is transmitted to the CPU 36 of the controller 10.

In the flow (e), the CPU 36 uses the control parameter and/or the control value transmitted from the server 40 to control the output voltage and/or output current of the AC component voltage generation unit 11 and the DC component voltage generation unit 12.

In the flow (f), the CPU 36 performs feedback control on at least one of the values of the current and voltage applied to the electrodes 13 and 14, their frequencies, and their phases, based on the detection signal detected by the detector 38. The detection signal detected by the detector 38 includes at least one of voltage applied to the electrode, the current applied to the electrode, the frequency and/or the phase of the voltage and/or current applied to the electrode, the magnetic field between the electrodes 13 and 14, the electric field between the electrodes 13 and 14, and the sound waves and/or the ultrasonic waves between the electrodes 13 and 14. The control value fed back in this case may be a control value calculated by the CPU 36 or may be a control value calculated by the server 40.

When the control value fed back is the control value calculated by the CPU 36, the control target value is transmitted from the server 40 to the CPU 36 in the flow (d). When the manual mode is set, the setting value as the control target value is input in the flow (a). The control target value may be set variably over time based on the information about the object collected by the object detection sensor 32. When the control value fed back is a control value calculated by the server 40, the detection signal as a result of the detection by the detector 38 is transmitted to the server 40 in the flow (c) for calculating the control value fed back by the server 40. Then, the server 40 calculates the control value fed back, and the control value is transmitted from the server 40 to the CPU 36 in the flow (d).

Although the example of using the detector 38 is described in the present embodiment, control not using the detector 38 may be employed. In such a case, the flow (f) is omitted, and the output voltage and/or output current of the AC component voltage generation unit 11 and the DC component voltage generation unit 12 is controlled in the flow (e). For the control in this case, various control such as sensor-less control and open loop control can be applied.

In the flow (g), the CPU 36 may transmit a control command to the housing 50 when the housing 50 has the automatic adjustment function. When the housing 50 is a refrigerator, the control command is a setting value of temperature and/or humidity in the refrigerator, for example. When the housing 50 is a container having a temperature/humidity adjustment function, the control command is a setting value of the temperature/humidity for the container, for example. When the housing 50 is a container and is stored in a warehouse with adjustable temperature/humidity, as described later, in the flow (i), information about the adjustment of the temperature/humidity of the container is transmitted to a management server of the warehouse that is the external server and the database 45, for appropriately adjusting the state of the temperature/humidity of all the containers also including other containers. When the housing 50 is a fryer, the control command is a temperature setting value of oil in the oil tank, for example, and may be used for notifying the oil replacement timing if necessary. When the housing 50 has no automatic adjustment function, the flow (g) is not a necessary element. In such a case, the information about the control command from the CPU 36 is displayed on the man-machine interface 31 in the flow (h).

In the flow (h), the man-machine interface 31 displays, for example, the control status of the output voltage and/or output current of the AC component voltage generation unit 11 and the DC component voltage generation unit 12 as an example of the control status in the CPU 36, information about the type and the state of the current target object, the status of the housing 50 (detection information from the object detection sensor 32), and information about the control command from the CPU 36 to the housing 50 if the housing 50 has no automatic adjustment function. In addition to these pieces of information, the man-machine interface 31 can display information transmitted from the server 40 in the flow (d) in addition to the control parameter and/or the control value, when required or in response to an operation on the man-machine interface 31. Examples of such information include season, weather, weather forecast, date and time, location, supply and demand forecast, warehousing and storage status of a refrigerator, a transport path of a container and traffic condition thereof, a status of a group of containers related to the container, inventory control information, store congestion, economic indicators, information on the Web, and the like. An operator can appropriately produce and manage the object by referring to such pieces of information.

The man-machine interface 31 may be integrated with the controller 10. The man-machine interface 31 and the controller 10 may be separately provided. The machine interface 31 as well as some of the functions of the controller 10 may be provided separately from the controller 10. In such a case, the man-machine interface 31 may be a mobile terminal having a communication function, examples of which including a smartphone, a mobile phone, a tablet terminal, or a PC. When the machine interface 31 as well as some of the functions of the controller 10 are provided separately from the controller 10, the man-machine interface 31 and at least one of the functions of the communication unit 35 and the storage unit 37, and the arithmetic function of the CPU 36 or some of such functions may be provided separately from the controller 10. Furthermore, the man-machine interface 31 as well as the functions of the object detection sensor 32 or the detector 38 or some of their functions can be integrated. For example, the camera function built in a smartphone, a mobile phone, a tablet terminal or a PC may be used as the object detection sensor 32.

In the flow (i), the server 40 communicates with the external server and the database 45 to exchange information required for object management or to collect data. The server 40 can communicate with a required external server through the Internet. Thus, when the housing 50 is a container, for example, a management database or a management server for a warehouse managing the container can be accessed, for example.

An operation of the present embodiment is described based on a configuration example in a case where the housing 50 is a refrigerator. In this example, a tablet terminal is used as the man-machine interface 31, and the refrigerator includes an inside camera, a temperature/humidity sensor, and an automatic temperature/humidity adjustment function. An example is described where the "automatic mode" is selected as the operation mode and "low" is selected as the refrigerator temperature using the tablet terminal, and this information is transmitted to the CPU in the flow (a).

The camera in the refrigerator serving as the object detection sensor 32 captures an image in a range including a food product preserved between the electrodes, and this information is transmitted to the server 40 in the flows (b) and (c). Then, in the server 40, the type and the state of the target food product is identified by AI-based image recognition, for example. The range of image capturing by the camera in the refrigerator preferably covers the entirety of the stored food product, and a plurality of cameras can be provided if necessary. Furthermore, information detected by the temperature/humidity sensor in the refrigerator serving as the object detection sensor 32 is transmitted to the server 40 in the flows (b) and (c). The server 40 uses the type and the state of the food product identified by the image recognition and the information about the temperature and the humidity in the refrigerator transmitted thereto, to calculate the control parameter and/or the control value related to the output voltage and/or output current of the AC component voltage generation unit 11 and the DC component voltage generation unit 12 based on the electromagnetic field to be generated by the electrodes 13 and 14. The control parameter and/or the control value varies depending on the type and the state of the food product preserved, that is, varies among a case where leafy vegetable is preserved, a case where raw sea bream is stored, a case where cooked (boiled) sea bream is preserved.

In the flow (d), the control parameter and/or the control value is transmitted to the CPU 36, and the output voltage and/or output current of the AC component voltage generation unit 11 and the DC component voltage generation unit 12 is appropriately controlled based on the control parameter and/or the control value. Furthermore, in the flow (f), the feedback control is performed on the output voltage and/or output current of the AC component voltage generation unit 11 and the DC component voltage generation unit 12, based on the detection value from the detector 38. In the flow (g), the temperature and humidity of the refrigerator are appropriately controlled based on the information ("low" refrigerator temperature) input in the flow (a), the information calculated by the server 40, and the like.

In the flow (h), various pieces of information related to the food product stored can be displayed on the tablet terminal together with the information transmitted from the server 40. An example of the information that can be displayed on the tablet terminal is at least one of the type and the state of the food product preserved, a preserved date, best before date, notification on a food product that is close to the best before date, menu of a dish prepared using the food product preserved, a recipe, a shopping list, and the like. In the flow (i), data required for the calculation in the server 40 may be acquired. The information similar to that obtained by the server can be acquired by the communication function of the tablet terminal. Thus, a URL and the like may be transmitted in the flows (d) and (h), whereby the communication amount in the flows (d) and (h) can be reduced.

Next, an operation of the present embodiment is described based on a configuration example in a case where the housing 50 is a container. In this example, a tablet terminal is used as the man-machine interface 31, the container is provided with the GPS, and the management database and the management server are provided to the warehouse in which the container is stored. An example is described where information including the "automatic mode" as the operation mode and "apple harvested on Z (day), Y (month), X (year) (just harvested)" as the type and the state of the object is transmitted to the CPU in the flow (a).

The GPS serving as the object detection sensor 32 transmits information about the position of the container to the server 40 in the flows (b) and (c) together with the information about the type and the state of the object. Thus, the server 40 recognizes the position of the container, and stores information indicating that the container including the "apple harvested on Z (day), Y (month), X (year)" was transported by land from the harvested location and stored in a predetermined warehouse. The server 40 can also access (the flow (i) described above) the management database of such a warehouse, and thus can recognize data about the management status of the container in the warehouse.

The server 40 uses information (including the information indicating the position of the container, the type and the state of the object, the status in the warehouse, the location, the season, weather, weather forecast, and information acquired in the flow (i) such as a status of a group of containers related to the container) to calculate the control parameter and/or the control value related to the output voltage and/or output current of the AC component voltage generation unit 11 and the DC component voltage generation unit 12 based on the electromagnetic field to be generated from the electrodes 13 and 14. Thus, the server 40 can calculate the control parameter and/or the control value appropriate for storing the "apple harvested on Z (day), Y (month), X (year)" in a predetermined warehouse.

In the flow (d), the control parameter and/or the control value is transmitted to the CPU 36, and the output voltage and/or output current of the AC component voltage generation unit 11 and the DC component voltage generation unit 12 is appropriately controlled based on the control parameter and/or the control value. Furthermore, in the flow (f), feedback control is performed on the output voltage and/or output current of the AC component voltage generation unit 11 and the DC component voltage generation unit 12 based on the detection value from the detector 38. In the example described herein, the container has no temperature control function, and thus the flow (g) is omitted.

In the flow (h), the tablet terminal can display various types of information about the object stored in the container, together with the information transmitted from the server 40. An example of the information that can be displayed on the tablet terminal is at least one of the type and the state of the food product stored in the container, a route and history of transportation, a future distribution schedule, the warehouse currently storing the object, the management status in the warehouse, when the object is ripe, best before date, and other information related to the container. In the flow (i), information required for managing the container is directly transmitted from the server 40 to the management server of the management database for the warehouse currently storing the container, to be used for managing the warehouse.

Next, an operation of the present embodiment is described based on a configuration example in a case where the housing 50 is a fryer. In this example, a tablet terminal is used as the man-machine interface 31, a camera of the tablet terminal is used instead of a camera of the object detection sensor, and an automatic adjustment function for the temperature of the oil of the fryer is provided. An example is described where the "automatic mode" is selected as the operation mode and "automatic" is selected as the oil temperature using the tablet terminal, and information indicating these is transmitted to the CPU in the flow (a).

An image of a food product cooked with the fryer is captured using the camera of the tablet terminal instead of the camera of the object detection sensor 32, and information of the image is transmitted to the server 40 in the flow (c). A camera built in the fryer may be used as the object detection sensor 32, instead of the camera of the tablet terminal. The image of the food product may only be captured at an initial timing when the cooked food is changed. The information about the oil temperature from the fryer serving as the object detection sensor 32 is also transmitted to the server 40 in the flows (b) and (c). Furthermore, a sensor that measures the amount of moisture in the food product, a sensor that measures the temperature of the food product, and the like may be provided, and information from these sensors may be transmitted to the server 40 in the flows (b) and (c) if necessary.

The server 40 determines the type and the state of the target food product through the image recognition using AI, for example. The server 40 sets the temperature of the oil of the fryer and calculates the control parameter and/or the control value related to the output voltage and/or output current of the AC component voltage generation unit 11 and the DC component voltage generation unit 12 based on the electromagnetic field to be generated from the electrodes 13 and 14, by using the type and the state of the food product determined by the image recognition, various pieces of information transmitted in the flow (c), and information acquired in the flow (i) such as the season, weather, weather forecast, date and time, location, and store congestion. The control parameter and/or the control value as well as the temperature of the oil of the fryer varies in accordance with the type and the state of the cooked food product, that is, among a case where fried shrimps are cooked, a case where fried potatoes are cooked, and a case where deep-fried chicken is cooked.

In the flow (d), the control parameter and/or the control value is transmitted to the CPU 36, and the output voltage and/or output current of the AC component voltage generation unit 11 and the DC component voltage generation unit 12 is appropriately controlled based on these. In the flow (f), feedback control is performed on the output voltage and/or output current of the AC component voltage generation unit 11 and the DC component voltage generation unit 12 based on the detection value from the detector 38. In the flow (g), the temperature of the oil of the fryer is appropriately controlled based on the information calculated by the server 40.

In the flow (h), the tablet terminal can display various types of information related to the food product to be cooked together with the information transmitted from the server 40. An example of the information that can be displayed on the tablet terminal is at least one of the type and the state of the food product cooked, the temperature of the oil of the fryer, the number of cooked dishes, a history of the cooked food products, and a food product scheduled to be cooked next. In the flow (i), data required for the calculation in the server 40 is acquired. Information similar to that acquired by the server can be acquired by a communication function of the tablet terminal. Thus, a URL and the like may be transmitted in the flows (d) and (h), whereby the communication amount in the flows (d) and (h) can be reduced.

Sixth Embodiment

Figure 43A:
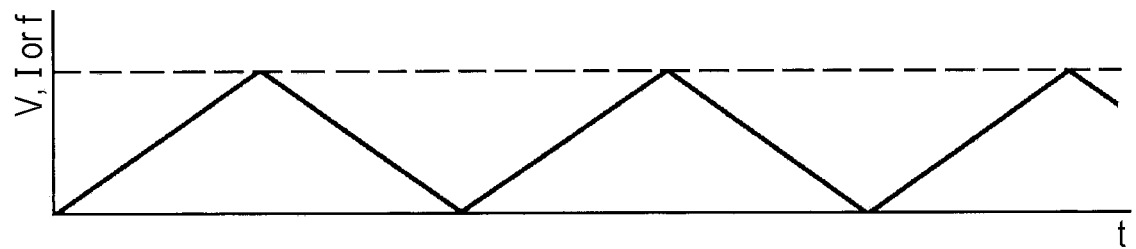
FIGS. 43A to 43C are graphs showing sweeping of a voltage value, a current value, and frequency according to a sixth embodiment.
Figure 43B:
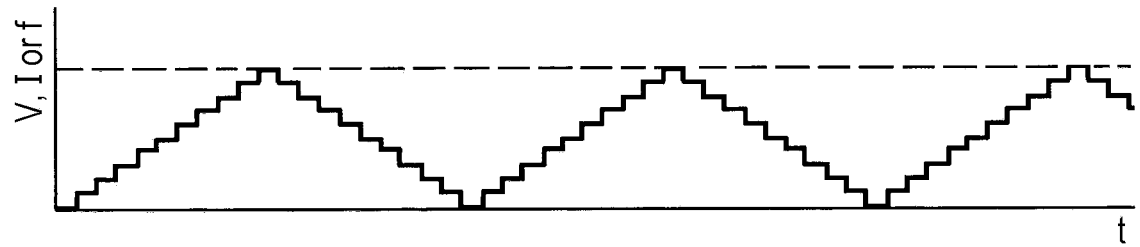
Figure 43C:
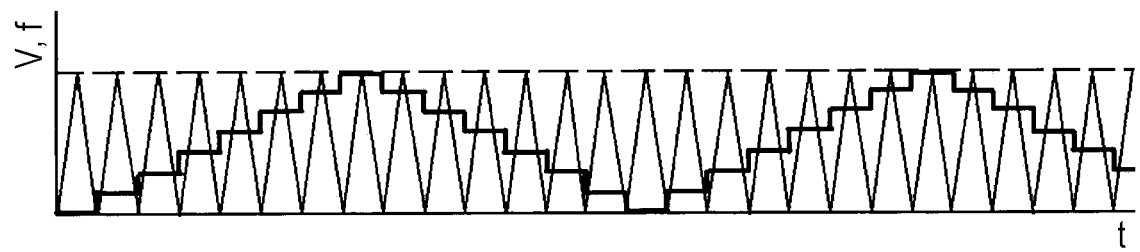

A moisture control apparatus, a moisture control method, a program, a storage medium, a produced object, a product, an apparatus, and a facility according to a sixth embodiment will be described with reference to FIGS. 43A to 43C. For configurations that are the same as those in FIG. 1 to FIG. 42, the same reference numerals are used and the description thereof are omitted. In the moisture control apparatuses 1 according to the first to the fifth embodiments, the current value or voltage value and the frequency of the current or voltage are set to be predetermined values. In the sixth embodiment, the current value or voltage value and/or the frequency are changed within a predetermined range with a predetermined pattern, and thus are swept. FIG. 43A illustrates an example where the voltage value, current value, or frequency is linearly and continuously swept. FIG. 43B illustrates an example where the voltage value, current value, or frequency is swept linearly and stepwise. In FIG. 43C, for example, the voltage value is changed stepwise, and the frequency is swept linearly and continuously, or the frequency is changed stepwise and the voltage value is swept linearly and continuously, whereby electromagnetic waves with an appropriate current value or a voltage value and/or an appropriate frequency can be automatically generated for any target. Thus, an appropriate current value, voltage value, or frequency is generated at a predetermined timing within a sweeping range. Note that FIG. 43C is merely an example, and thus should not be construed in a limiting sense. In FIG. 43C, while one value is fixed, the other value changes from 0 to the peak and then from the peak to 0. However, this should not be construed in a limited sense. For example, a change may be repeated in which one value increases from 0 to the peak while the other value is fixed, and then decreases from the peak to 0 when the other value changes stepwise and is fixed at a certain value. In FIG. 43C, while one value changes stepwise, the other value changes from 0 to the peak continuously and frequently. However, this should not be construed in a limiting sense. For example, while one value changes gently and continuously, the other value may change from 0 to the peak continuously and frequently.

The sweeping pattern is not limited to those illustrated in FIGS. 43A to 43C. For example, in addition to the linear or stepwise change, a curved changed, sinusoidal change, smooth analog change, discrete change, random change, and the like may be employed, for example. An AC voltage value, a DC voltage value, an AC current value, a DC current value, a frequency, and the like may be changed. In such a case, the values may be changed one by one, a plurality of the values may be changed in an interlocked manner (see, for example, the example of FIG. 43C), or a plurality of the values may be simultaneously changed. The sweep range may be within a range defined in the first to the fifth embodiments, for example, or may be expanded to be even wider than such a range.

For any target, an appropriate current value, voltage value, or frequency is generated at a predetermined timing within a sweeping range. Furthermore, through feedback by the object detection sensor 32 and the like, the controller 10 may recognize the state of the target and analyze the state in association with the pattern of the sweep change or the analysis may be performed on the server side, so that an appropriate (or optimum) current value, voltage value, or frequency can be automatically detected. The detected appropriate value may be shared with another controller 10 through a server, in addition to being used by the controller 10 for the control thereafter.

In the first embodiment, FIGS. 5 to 25 and Tables 1 to 9 illustrate specific effects obtained by applying the electromagnetic field by the moisture control apparatus 1 according to the present embodiment. These effects can be similarly obtained in the second to the sixth embodiments.

The first to the sixth embodiments described above are not intended to limit the present invention to these embodiments. The present invention is equally applicable to any other embodiments within the scope of the appended claims. The first to the sixth embodiments can be changed as appropriate and some of these embodiments can be used in combination as appropriate.

The present application is based on Japanese Patent Application No. 2017-100354 filed on May 19, 2017, Japanese Patent Application No. 2017-126102 filed on Jun. 28, 2017, Japanese Patent Application No. 2017-151155 filed on Aug. 3, 2017, Japanese Patent Application No. 2017-153591 filed on Aug. 8, 2017, Japanese Patent Application No. 2017-255302 filed on Dec. 31, 2017, Japanese Patent Application No. 2018-021666 filed on Feb. 9, 2018, and Japanese Patent Application No. 2018-143020 filed on Jul. 30, 2018. The description, the scope of claims, and the drawings of Japanese Patent Application No. 2017-100354, Japanese Patent Application No. 2017-126102, Japanese Patent Application No. 2017-151155, Japanese Patent Application No. 2017-153591, Japanese Patent Application No. 2017-255302, Japanese Patent Application No. 2018-021666, and Japanese Patent Application No. 2018-143020 are incorporated herein by reference.

The invention claimed is:

1. A control apparatus, comprising:
at least one electrode configured to direct an electromagnetic field toward an object; and
a controller configured to control an interfacial tension between a moisture phase and another phase in the object, by controlling a voltage applied to the at least one electrode, wherein
the controller is further configured to:
receive information of a type or a state of the object from (a) input information input from a man-machine interface or (b) detection information from an object detection sensor,
before the voltage is applied to the at least one electrode, control the electromagnetic field generated by the at least one electrode by selecting
a voltage value of the voltage from a range of 0 to 2,000 V, and
a frequency of an alternating current (AC) component of the voltage from a range of 0 Hz to 1 MHz according to a control parameter suitable for the type or the state of the object based on a relationship between electromagnetic field conditions and a degree of decrease in the interfacial tension, and
control the interfacial tension according to the electromagnetic field generated by the at least one electrode.

2. The control apparatus according to claim 1, wherein the controller is further configured to change the voltage value of the voltage or a current applied to the at least one electrode within a predetermined range smoothly or stepwise.

3. The control apparatus according to claim 1, wherein the controller is further configured to change the frequency of the AC component of the voltage or a current applied to the at least one electrode within a predetermined range smoothly or stepwise.

4. The control apparatus according to claim 1, wherein a conductivity of the object is increased by the application of the voltage or a current to the at least one electrode.

5. The control apparatus according to claim 1, wherein the interfacial tension is reduced by the application of the voltage or a current to the at least one electrode.

6. The control apparatus according to claim 1, wherein moisture particles are obtained by the application of the voltage or a current to the at least one electrode.

7. The control apparatus according to claim 1, wherein water molecules in moisture in the object are orientated in a substantially same direction by the application of the voltage or a current to the at least one electrode.

8. The control apparatus according to claim 1, wherein moisture elements in the object in a bonded state are in a pearl-chain structure.

9. The control apparatus according to claim 1, wherein the control apparatus is applicable to any object containing moisture.

10. The control apparatus according to claim 1, wherein an effect of improving the property of the object opposed to the at least one electrode is maintained for a predetermined period after the object has been removed from a space opposed to the at least one electrode.

11. The control apparatus according to claim 1, wherein a potential is substantially uniform over a waterdrop or particles of water in a bonded state in the object.

12. The control apparatus according to claim 1, wherein the voltage or a current applied to the at least one electrode further includes a DC component in addition to the AC component.

13. The control apparatus according to claim 1, wherein the at least one electrode comprises a plurality of electrodes, and
the voltage or a current applied to at least one of the plurality of electrodes is different from that applied to another of the plurality of electrodes in at least one of
a voltage value or current value,
a frequency of the voltage or the current, or
a phase of the voltage or the current.

14. The control apparatus according to claim 1, wherein a DC component of the voltage applied to the at least one electrode is 100 V or lower.

15. The control apparatus according to claim 1, wherein the object includes at least one of solid, liquid, or gas.

16. The control apparatus according to claim 1, wherein the voltage or a current applied to the at least one electrode is at least one voltage or current selected from the group consisting of:
   (1) voltage or current that reduces the interfacial tension of the object;
   (2) voltage or current that prevents food and drink or a liquid from becoming rotten;
   (3) voltage or current that contributes to at least one of fresh flower preservation, drinking water preservation, hydroponic cultivation promotion or environmental improvement, germination rate improvement, hatching rate improvement, aquarium antifouling or purification, water quality improvement, rock sugar growth promotion, fuel reforming, or fuel efficiency improvement;
   (4) voltage or current that contributes to at least one of preservation of blood or blood components, improvement in symptoms of diabetes, improvement in symptoms of chronic kidney disease, improvement in artificial dialysis, improvement of blood flow, revascularization, improvement in symptoms of peripheral neuropathy, improvement in symptoms of arthropathy or rheumatism, organ preservation, antitumor effect, improvement in symptoms of ischemia, improvement in symptoms of lymphatic edema, improvement in symptoms of bed sores, necrosis prevention or improvement, improvement in symptoms of circulatory diseases, or infection control;
   (5) voltage or current that improves efficiency of at least one of charging or discharging of a capacitor, a generator, or a power transmission facility;
   (6) voltage that promotes emulsification or generation of an emulsion or voltage or current that achieves a longer emulsion state maintained period;
   (7) voltage or current that increases the effect of an air purifier or an ionizer;
   (8) voltage or current that separates atoms or molecules into types;
   (9) voltage for controlling temperature or humidity in a space;
   (10) voltage or current that separates moisture from at least one of bacteria, germs, viruses, or microorganisms; and
   (11) voltage or current that facilitates chemical polishing, mechanical polishing, chemical-mechanical polishing, or magnetic polishing.

17. The control apparatus according to claim 1, wherein the controller is further configured to control at least one of
   a current applied to the at least one electrode,
   the frequency of the voltage or the current, or
   a phase of the voltage or the current.

18. The control apparatus according to claim 17, wherein the controller is further configured to perform feedback control on the at least one of
   the voltage applied to the at least one electrode,
   the current applied to the at least one electrode,
   the frequency of the voltage or the current, or
   the phase of the voltage or the current.

19. The control apparatus according to claim 18, wherein the controller is further configured to perform the feedback control on a detection value detected in the at least one electrode.

20. The control apparatus according to claim 18, wherein a wire for supplying the voltage to the at least one electrode and a wire for feedback are formed as a single cable.

21. The control apparatus according to claim 17, wherein the controller is further configured to set the voltage, the current, the frequency, and the phase as a control target based on the type or state of the object.

22. The control apparatus according to claim 17, wherein the controller is further configured to be remotely operated and/or remotely controlled.

23. The control apparatus according to claim 17, wherein the controller is configured to perform at least one of DC-DC conversion, DC-AC conversion, AC-DC conversion, or AC-AC conversion.

24. The control apparatus according to claim 17, wherein the controller is configured to be driven by a battery.

25. The control apparatus according to claim 17, wherein the controller is further configured to communicate with a server to receive the control parameter and/or a control value from the server.

26. The control apparatus according to claim 17, wherein the controller is connected to a sensor configured to detect at least one of
   the type of the object,
   the state of the object,
   a state of an electric field,
   a state of a magnetic field,
   a state of the electromagnetic field,
   a state of electromagnetic waves,
   a state of sound waves,
   a state of ultrasonic waves,
   a state of the current, or
   a state of the voltage.

27. The control apparatus according to claim 17, wherein the controller is connected to the man-machine interface.

28. The control apparatus according to claim 1, wherein the at least one electrode has a plate shape, a bar shape, a spherical shape, a semi-spherical shape, a cylindrical shape, a semi-cylindrical shape, a conical shape, a semi-conical shape, a substantially L shape, a substantially rectangular U shape, a polygonal shape, a polygonal columnar shape, a polygonal conical shape, a curved shape, a bend shape, a foil shape, a film shape, or a layer shape.

29. The control apparatus according to claim 1, wherein the at least one electrode includes electrodes all made of a same material or the electrodes including at least one of the electrodes made of a different material, and
electromagnetic waves generated from the at least one electrode are adjusted by selecting the material of the at least one electrode.

30. The control apparatus according to claim 1, wherein the at least one electrode is insulated.

31. The control apparatus according to claim 1, wherein the control apparatus is applicable to an existing facility.

32. The control apparatus according to claim 1, wherein the control apparatus is further configured to be moved, conveyed, or carried around.

33. The control apparatus according to claim 1, wherein the at least one electrode includes two or more electrodes, and the controller is further configured to set at least one of
the voltage applied to each electrode of the two or more
electrodes,
a current applied to the each electrode,
the frequency of the voltage or the current, or
a phase of the voltage or the current.

34. A moisture control method performed by the control apparatus according to claim 1, the moisture control method comprising:
applying the voltage or a current including a DC component and/or the AC component to the at least one electrode that generates the electromagnetic field to control the interfacial tension between the moisture phase and the another phase in the object disposed to face the at least one electrode.

35. The moisture control method according to claim 34, wherein
the voltage value of the voltage or current applied to the at least one electrode changes within a predetermined range smoothly or stepwise.

36. The moisture control method according to claim 34, wherein
the frequency of the AC component of the voltage or current applied to the at least one electrode changes within a predetermined range smoothly or stepwise.

37. The moisture control method according to claim 34, wherein
a conductivity of the object is increased by the applying of the voltage or current to the at least one electrode.

38. The moisture control method according to claim 34, wherein
the interfacial tension is reduced by the applying of the voltage or current to the at least one electrode.

39. The moisture control method according to claim 34, wherein
moisture particles are obtained by the applying of the voltage or current to the at least one electrode.

40. The moisture control method according to claim 34, wherein
water molecules in moisture in the object are orientated in a substantially same direction by the applying of the voltage or current to the at least one electrode.

41. The moisture control method according to claim 34, wherein
the moisture elements in the object in a bonded state are in a pearl-chain structure.

42. The moisture control method according to claim 34, wherein
the moisture control method is applicable to any object containing moisture.

43. The moisture control method according to claim 34, wherein
an effect of improving the property of the object opposed to the at least one electrode is maintained for a predetermined period after the object has been removed from a space opposed to the at least one electrode.

44. The moisture control method according to claim 34, wherein
a potential is substantially uniform over a waterdrop of molecules of water in a bonded state in the object.

45. The moisture control method according to claim 34, wherein
the voltage or current applied to the at least one electrode includes the DC component in addition to the AC component.

46. The control apparatus according to claim 1, wherein bubbles are further added to the object.

47. The control apparatus according to claim 1, wherein the control apparatus is applied to at least one field of manufacturing, distribution, logistics, warehouse, sales, engineering, construction, civil engineering, machine engineering, electric engineering, electronic engineering, communications, optics, chemistry, petrochemistry, energy, stockbreeding, agriculture, commerce, fishery, food, restaurant business, cooking, services, medicine, health, welfare, and nursing care.

48. The control apparatus according to claim 1, wherein the object is at least one object selected from the group consisting of:
(1) agricultural products, fresh flowers, livestock products, fishery products, processed food products, health food products, beverages, alcoholic beverages, dry food products, broth, soup, seasonings, or other food items,
(2) resin, rubber, glass, lenses, pottery, wooden materials, cement, concrete, minerals, paper, inks, dyes, fibers, ceramics, abrasives, cleaners, additives, printed circuit boards, plating products, refining products, paints, India ink, water-repellent products, chemical products, fertilizers, animal feeds, microorganisms, water, cloth, gunpowder, or other like products,
(3) gasoline, light oil, heavy oil, kerosene, petroleum, or other fuels,
(4) blood, vaccines, medicines, organs, cells, ointments, dialysis machines, therapy equipment, or other medical products,
(5) cosmetics, detergents, soap, shampoo, hair-care products, or other commodities,
(6) apparatuses for power generation, power storage, power transmission, or combustion,
(7) quality-maintained, dried, preserved, frozen, or thawed products,
(8) emulsions, objects resulting from oxidation or reduction, water absorption, or extraction,
(9) abrasives or abrasive grains used for polishing including at least one of chemical polishing, mechanical polishing, chemical-mechanical polishing, or magnetic polishing, and
(10) equipment including health appliances, exercise machines, muscle-building machines, or playground equipment.

49. A product, an apparatus, or a facility comprising the control apparatus according to claim 1.

50. A product, an apparatus, or a facility including at least one of a refrigerator, a freezer, a refrigerating warehouse, a freezer warehouse; a storage house, a warehouse, a refrigerator car, a freezing car, a cooler box, a container for transport, a container for storage, a showcase, a shelf, a drawer, a fryer, a cultivation container, a fuel tank, a personal computer, a mobile phone, a chair bed, furniture, bedding, home appliances, various manufacturing equipment in a factory, processing equipment, medical equipment, health equipment, beauty equipment, cooking equipment, polishing equipment, vehicles, semiconductor cleaning equipment, and equipment for controlling vapor resulting from cooling during a refining step, a baking step, and a drying step,
the product, apparatus, or facility comprising the control apparatus according to claim 1.

* * * * *